United States Patent
Ohgoshi et al.

(10) Patent No.: US 6,915,570 B1
(45) Date of Patent: Jul. 12, 2005

(54) RESIN ROLLER AND DEVICE AND METHOD FOR MANUFACTURING THE RESIN ROLLER

(75) Inventors: Hiroshi Ohgoshi, Shiga (JP); Toshiyuki Komatsu, Tokyo (JP); Koji Sezaki, Tokyo (JP); Hidenari Tsunemi, Shiga (JP); Kenji Kobayashi, Shiga (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,562
(22) PCT Filed: May 17, 2000
(86) PCT No.: PCT/JP00/03168

§ 371 (c)(1),
(2), (4) Date: Feb. 5, 2002

(87) PCT Pub. No.: WO00/71324

PCT Pub. Date: Nov. 30, 2000

(30) Foreign Application Priority Data

| May 19, 1999 | (JP) | 11-139253 |
| May 19, 1999 | (JP) | 11-139254 |
| Jun. 4, 1999 | (JP) | 11-157267 |
| Jun. 4, 1999 | (JP) | 11-157340 |
| Jun. 4, 1999 | (JP) | 11-157360 |
| Aug. 18, 1999 | (JP) | 11-231370 |

(51) Int. Cl.$^7$ .................. B21K 1/02; B29C 40/00
(52) U.S. Cl. ............ 29/895.32; 29/527.3; 264/328.2; 264/262; 264/276; 264/278; 492/56; 492/47
(58) Field of Search .................. 264/328.2, 278, 264/276, 262, 263; 492/59, 48, 47, 45; 29/895.32, 527.3, 557, 895.3; 425/125, 129.1

(56) References Cited

U.S. PATENT DOCUMENTS 3,619,446 A * 11/1971 Nauta .................. 264/102
3,941,635 A * 3/1976 Tavelle et al. ............ 156/86

(Continued)

FOREIGN PATENT DOCUMENTS

| DE | 39 12 093 | 10/1990 |
| EP | 0 671 253 | 9/1995 |

(Continued)

OTHER PUBLICATIONS

Patent Abstracts of Japan, vol. 1997, No. 09, Sep. 30, 1997 and JP 09 123308, May 13, 1997.

(Continued)

*Primary Examiner*—Marc Jimenez
(74) *Attorney, Agent, or Firm*—Westerman Hattori Daniels & Adrian, LLP

(57) ABSTRACT

A resin roller (10) is produced by disposing a core body (21) in a forming metal mold (1) having a cylindrical metal mold (13) and core supporting members (14) furnished at both edge parts of the cylindrical metal mold (13) as well as causing the core supporting members (14) to hold the both edge parts, and pouring a forming resin into the metal mold and solidifying it. The resin roller (10) has the core body (21) of the same outer diameter over a full length and a cylindrical resin-formed body (12), sealing members (24, 26) are furnished around the core body (21) in the vicinity of both edge parts of the resin-formed body (12), and the core body is disposed such that the sealing members (24, 26) contact edge faces (14a) at sides of a roller forming space of the core supporting members (14).

5 Claims, 36 Drawing Sheets

U.S. PATENT DOCUMENTS

| | | | |
|---|---|---|---|
| 4,113,825 A | | 9/1978 | Hill et al. |
| 4,312,444 A | | 1/1982 | Mushovic |
| 4,313,981 A | * | 2/1982 | Namiki ........................ 427/409 |
| 4,325,170 A | * | 4/1982 | Verboom et al. ............... 492/7 |
| 4,892,696 A | * | 1/1990 | Murakami et al. ........... 264/219 |
| 5,033,380 A | * | 7/1991 | Sonobe et al. ........... 101/350.1 |
| 5,089,201 A | * | 2/1992 | Takahashi ................... 264/135 |
| 5,493,777 A | | 2/1996 | Burke |
| 5,660,092 A | * | 8/1997 | Scholz et al. ................ 82/1.11 |
| 5,753,165 A | * | 5/1998 | Watanabe et al. ........... 264/138 |
| 5,934,663 A | * | 8/1999 | Saito et al. ................. 271/109 |
| 6,141,873 A | * | 11/2000 | DelRosario et al. ... 29/895.211 |
| 6,163,016 A | * | 12/2000 | Johnson et al. ............. 219/424 |
| 6,440,347 B1 | * | 8/2002 | Izawa et al. ................ 264/262 |

FOREIGN PATENT DOCUMENTS

| | | |
|---|---|---|
| JP | 1-117149 | 5/1989 |
| JP | 1-135608 | 5/1989 |
| JP | 1-98312 | 6/1989 |
| JP | 2-175119 | 7/1990 |
| JP | 3-161311 | 7/1991 |
| JP | 4-320813 | 11/1992 |
| JP | 9-288436 | 11/1997 |

OTHER PUBLICATIONS

Patent Abstracts of Japan, vol. 1996, No. 10, Oct. 31, 1996 and JP 08 142108, Jun. 4, 1996.

* cited by examiner

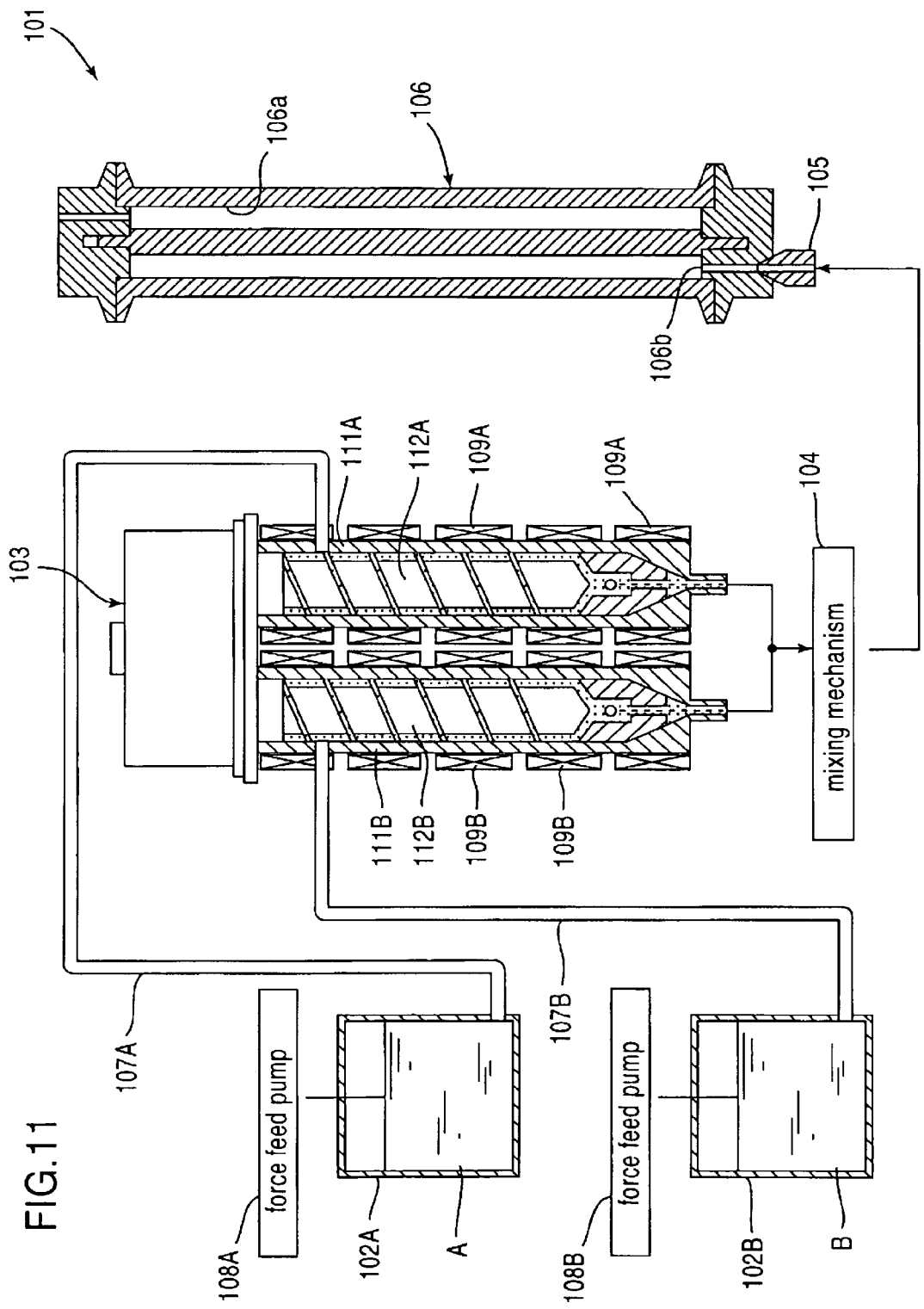

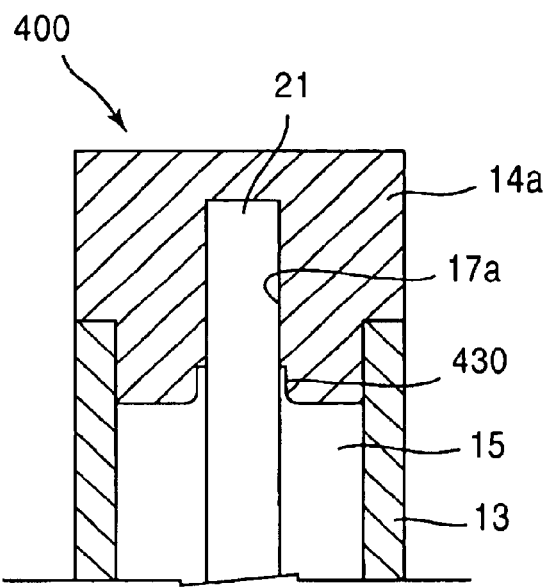
FIG.19a
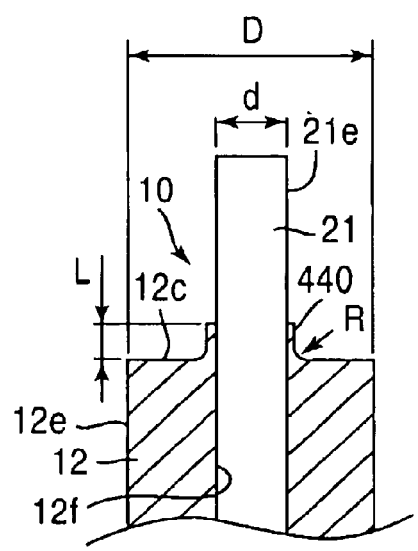
FIG.19b
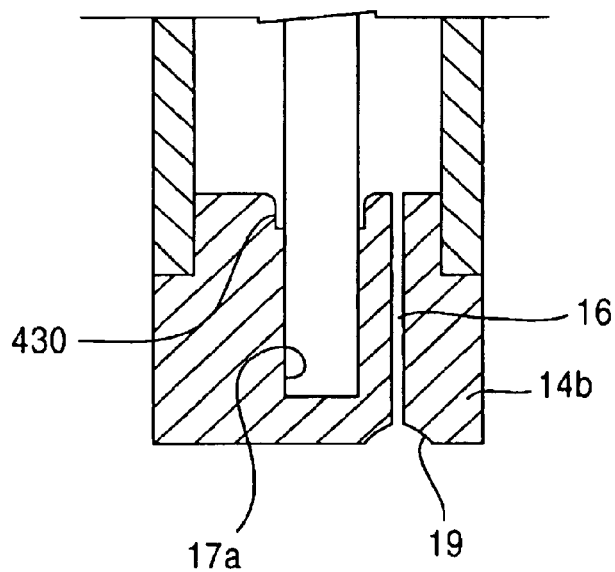

FIG.20a
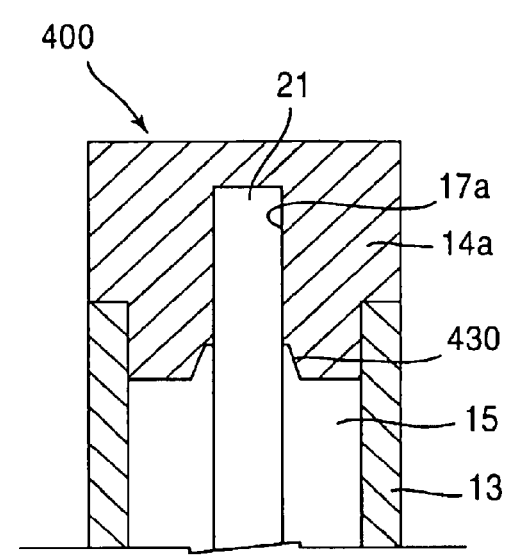
FIG.20b
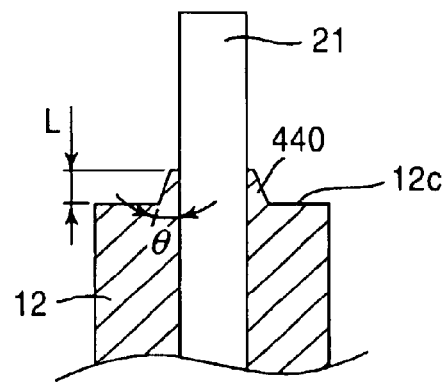
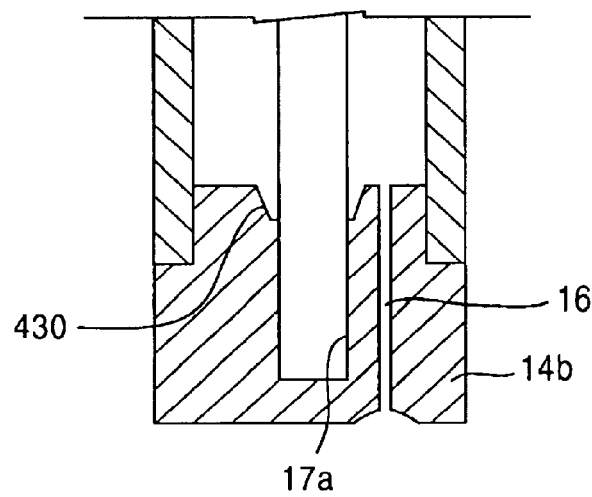

FIG.21a
FIG.21b
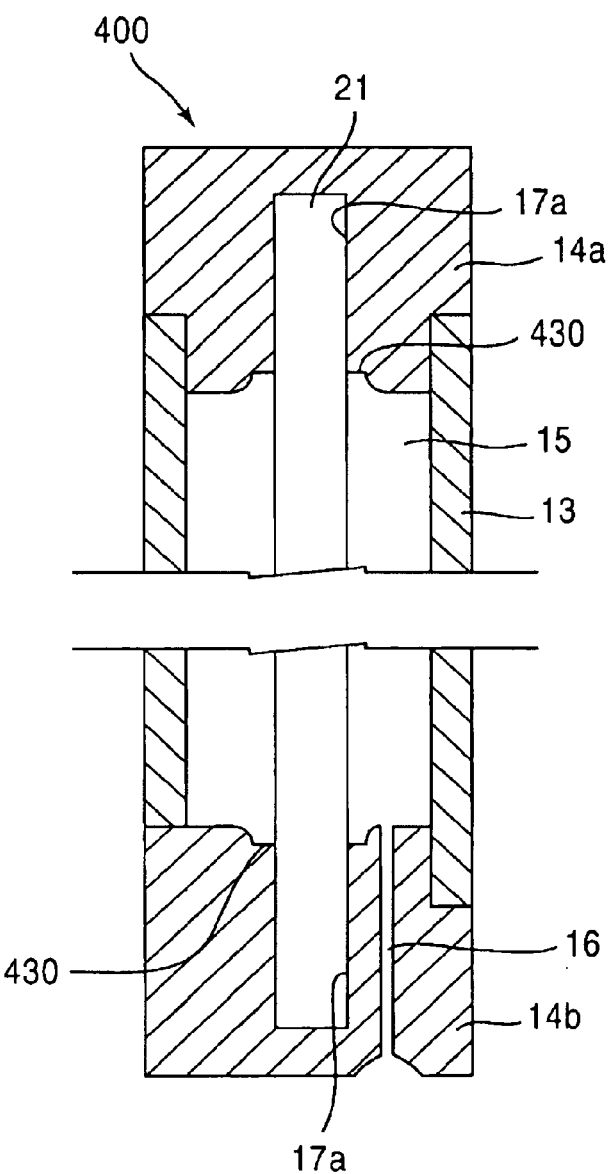
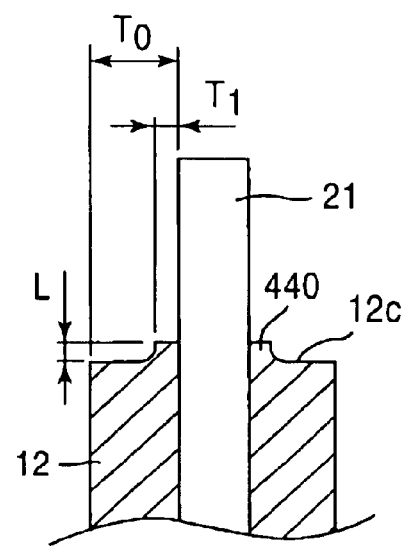

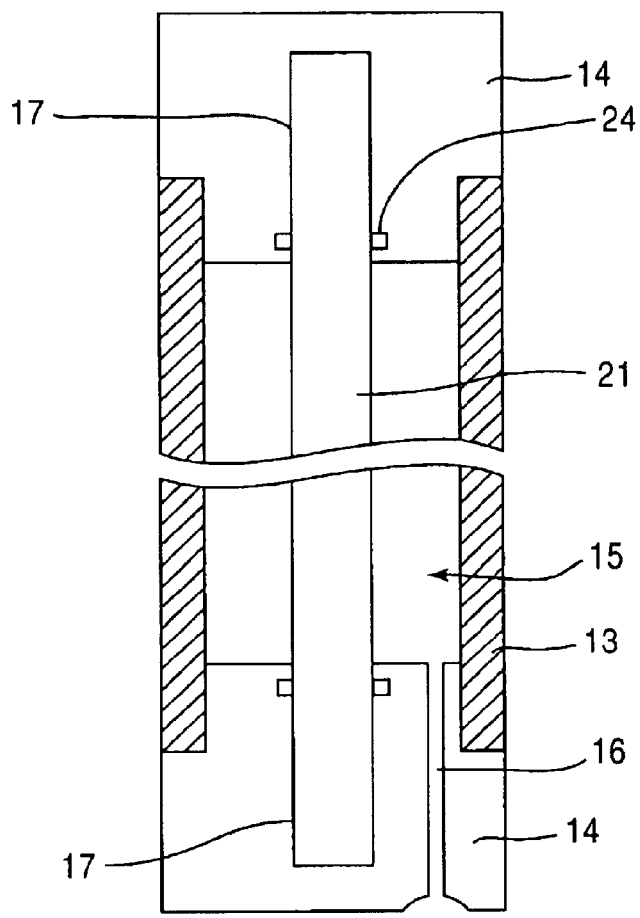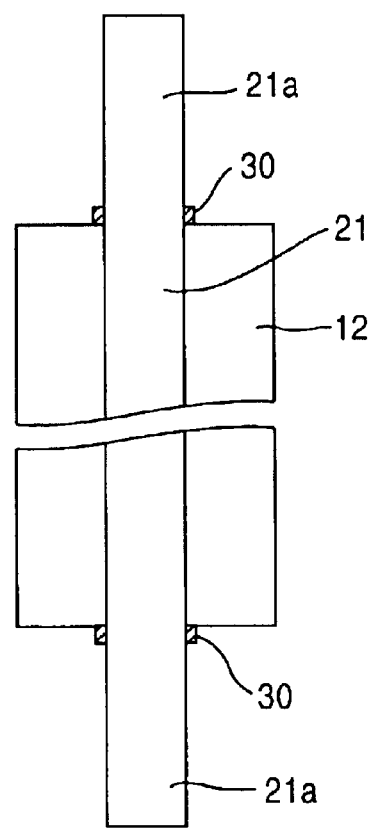
FIG.26a PRIOR ART
FIG.26b PRIOR ART

RESIN ROLLER AND DEVICE AND METHOD FOR MANUFACTURING THE RESIN ROLLER

TECHNICAL FIELD

The present invention relates to a resin roller such as a film developing roller, an electrically charging roller, or a transcribing roller to be incorporated into various kinds of devices employing an electrophotographic system of a laser printer, copier or facsimile apparatus. Further, the present invention relates to an apparatus of producing the resin roller. Still further, the invention relates to an injection molding apparatus of the resin roller as well as a forming metal mold.

TECHNICAL BACKGROUND

Many kinds of devices employing electrophotographic systems of a laser printer, copier or facsimile apparatus are incorporated with a roller such as a film developing roller, an electrically charging roller, or a transcribing roller. One example of these rollers is shown in FIG. 24.

A roller 10 has a core body 21 and a cylindrical forming body 12 fabricated with a resin. A metal mold for forming the roller 10 has, as shown in for example FIG. 25, a cylindrical metal mold 13 and core supporting members 14 located at upper and lower both edges of the cylindrical metal mold 13 for supporting a core 21 inserted inside of the cylindrical metal mold 13 and sealing both edges of the cylindrical metal mold 13. The lower core supporting member 14 is defined with a resin injecting inlet 16 for injecting a resin material into a roller forming space 15, while the resin injecting inlet 16 is urged outside of the metal mold with a resin injecting nozzle 18 of a forming machine from a semi-circular nozzle touch portion 19, so that the resin material is introduced into the roller forming 15.

After completion of filling the resin into the metal mold, the resin in the roller forming space 15 is hot-set. Hot-setting the resin, the core supporting members 14 are removed upward and downward respectively along an axial direction from the cylindrical metal mold 13. Subsequently, the core body 21 is extruded from the cylindrical metal mold 13 to take out a formed product (roller) held within the cylindrical metal mold 13.

The core supporting member 14 is provided with concave parts 17 for supporting the core body 21 at edges 21a, and in order to make easy insertion of the edge 21a of the core supporting member 14 into the concave part 17 or taking variation within dimensional tolerance of the edge of the core body into consideration, spaces of 10 to 20μare provided between the concave part 17 and the core supporting member 14. So, if the resin is poured into the metal mold at high pressure or if a pressure in the mold is high when the resin is expanded at hot-setting, a defect is present that the resin leaks out of the metal mold from the spaces. The leaked resin is adhered to the edges 21a of the core body 21 or to an interior of the concave part 17 of the core supporting member 14, and it should be removed after formed products have been released from the mold.

In case the core body 21 used to the resin roller is, as shown in FIG. 25, differs an outer diameter in the center part of the core body 21 and an outer diameter in the edge part 21a of the core body 21, and the outer diameter in the center part of the core body 21 is larger than that of the edge part, a method is to attach sealing members 24 (for example, O-ring) to the core supporting member 14 so as to contact side faces of the center part of the core body 21 for preventing the resin leakage.

However, the core body 21 being different in the outer diameters in the center part and in the center part thereof has disadvantages of high processing cost and high material cost of the core body 21, and accordingly a cost of the core body 21 is expensive.

In order to lower the cost of the core body 21 and make thickness of an elastic layer large for aiming at reducing rubber elastic hardness of the formed body 12 (elastic layer), such a core body 21 is sometimes used which uses core body 21 being the same in the center part of the core body 21 and the outer diameter in the edge part 21a of the core body 21.

In this case, as illustrated in FIG. 26, used is the core supporting member 14 which is buried with sealing members 24 (for example, O-ring) opening in the concave part 17 thereof. But there is a defect that the sealing members 24 buried in the core supporting member 14 are broken while repeatedly attaching the core body 21 to the concave parts 17, so that an effect for avoiding the resin leakage is decreased.

Further, for adopting a structure of burying the sealing members in the core supporting member 14, taking strength of burying grooves into consideration, it is necessary to bury the sealing members in depth of around 0.5 to 1 mm from the side edge face of a resin formed product of the core supporting member 14. Therefore, until around 0.5 to 1 mm from the side edge face of the resin formed product of the core supporting member 14, the resin leakage cannot be stopped with the sealing members 24, and the resin leakage 30 by the amount thereof occurs.

When using the core body 21 which is the same in the outer diameter in the center part of the core body 21 and the outer diameter in the edge part 21a thereof, a problem is to shorten a life of the sealing member and cause the resin leakage in parts from a resin formed edge part to the sealing member.

Thus, it is indispensable to frequently exchange the sealing members owing to the short life thereof and remove the leakage resin at edge parts, and in turn a cost-up of the resin roller is invited.

Next, reference will be made to using methods of the roller by use of an example of the resin roller for a photographic film developing process, referring to FIG. 27.

In various kinds of devices of the electrophotographic system, there is a system known as a photographic film developing process for visualizing electrostatic latent images, which supplies a nonmagnetic unary developer 55 on an image carrier 51 of a photosensitive body 50 of carrying the electrostatic latent image, adhering said developer to the electrostatic latent image on the surface of the image carrier, and contacting a developing resin roller 10a to the image carrier 51.

Using the nonmagnetic unary developer 55, this system is cheap in comparison with a system supplying the magnetic developer by use of the conventional magnetic roller. In a case of using a magnetic binary developer, a carrier itself has a short life, for example, it must be periodically exchanged per 10000 or 20000 copies, taking trouble for exchanging the carrier. On the other hand, the above mentioned system does not have such a defect. Further, in a case of using the magnetic binary developer, since the magnetic developer itself contains a magnetic substance near a different color, it is technically difficult to make the magnetic developer a color toner, but since the resin roller of the invention is employed to the nonmagnetic developing system using the nonmagnetic developer, such a problem is absent.

Typical shapes of the resin roller are shown in FIGS. 28, 29 and 30. The resin roller 10a has a core body 21, a cylindrical resin layer 12a formed with a resin around the core body 21, and a surface layer 12b covering the periphery of the resin layer 12a.

A method for the resin roller 10a to send the nonmagnetic unary developer, depends on an electrically absorbing force, and since a property necessary as the developing roller makes the developer frictional electrification between the developing surface and a regulating blade 52 for regulating a piling thickness of the developer on the surface of the developing roller, the developer is easily cracked owing to pressurization, and such a developing roller 10a is served which covers a soft resin layer 12a on the core body 21 for avoiding the developer from cracking.

The resin layer 12a is often exposed at the surface, but for controlling electric charging of the developer or transferring performance, it is provided on the surface with a thin surface layer 12b.

Further, explanation will be made to a producing method of the resin roller 10a.

At first, a metal mold 120 for forming the resin layer 12a of the resin roller 10a has, as shown in for example FIG. 31, a cylindrical metal mold 13 and the core supporting members 14, 14 located at upper and lower both edges of the cylindrical metal mold 13 for supporting a core 21 inserted inside of the cylindrical metal mold 13 and sealing both edges of the cylindrical metal mold 13. The lower core supporting member 14 is defined with a resin injecting inlet 16 for injecting a resin material into a roller forming space 15 formed within the cylindrical metal mold 13, while the resin injecting inlet 16 is urged outside of the metal mold with a resin injecting nozzle 18 of a forming machine from a semi-circular nozzle touch portion 19, so that the resin material is introduced into the roller forming space 15.

After completion of filling the resin into the metal mold 120, the whole of the mold 120 is heated to hot-set the resin in the roller forming space 15. Hot-setting the resin, the core supporting members 14, 14 are removed upward and downward respectively along the axial direction from the cylindrical metal mold 13. Subsequently, the core body 21 is extruded from the cylindrical metal mold 13 to take out a formed product (roller) 10b held within the cylindrical metal mold 13.

After that, the resin layer 12a of the roller main body 10b produced by the above forming method is coated on the peripheral surface thereof with a treated liquid mixed with a resin material through a spray method, a dipping method or a roll coater method, and dried to form a surface layer 12b.

The roller main body 10b produced by the above forming method has swelling parts at edge parts of the resin layer 12a as shown in FIG. 32 when releasing from the metal mold. A mechanism of the swelling phenomenon at the edge is explained that the swelling is generated by thermal expansion and shrinkage owing to temperature difference between temperatures at pouring the resin into the metal mold 120 and after releasing from the mold, the amount of shrinkage in the axial direction is larger than that in the peripheral direction, and the formed resin is adhered to the core body 21. Even if the swelling part at the edge part of the resin layer 12a is cut in round slice in the peripheral direction, the edge part after cutting apparently swells similarly.

The cylindrical metal mold 13 and the core supporting members 14, 14 have tolerances of respective parts and assembling spaces, and so-called parting lines occur. If the spaces become large owing to such as abrasion in the respective parts when setting up the metal mold, the resin flows into the spaces and burrs are created at the edges of the resin layer 12a as shown in FIG. 33.

The corner 74 of the resin roller 10a is obtained by forming the surface layer 12b around the resin layer 12a of the resin roller 10a in the above mentioned method, and as shown in FIG. 34, actually the film thickness of a resin forming the surface layer 12b is small.

When the resin roller 10a contacts and slides with the image carrier as the sensitive substance, since the corner of the resin roller 10a contacts the periphery of the image carrier at larger force than that exerting in the center part of the resin roller 10a and the film thickness of the surface layer 13b is smaller than that in the center part, the surface layer 12b of the corner of the resin roller 10a is easily worn, and in turn this abrasion causes the surface layer 12b to peel off, and as a time passes, the surface layer 12b gradually widens to peel in the surface of the resin roller 10a.

For resolving those occasions, there is a method of uniformly machining or polishing the surface of the resin roller prior to coating the surface layer, but it takes many processing steps, and besides the resin layer is soft, and in particular the corner could not be precisely machined or polished.

Another method is to machine or polish the only corner, but some of elastic resins such as, above all, silicone forming the resin layer have viscosity or stickiness particular to these resins, so that processing parts are nappy or ragged, and the surface cannot be processed to be smooth. There is another available method which carries out the process of immersing or coating water or oil to the processing part of the resin roller while machining or polishing, but after processing, it is further necessary to remove water or oil.

Next, an apparatus of producing the roller will be explained in detail. The apparatus of producing the roller is mainly structured with, as shown in FIG. 35, for example, a cylindrical metal mold 61 and the core supporting members 62a, 62a located at upper and lower both edges of the cylindrical metal mold 61 for supporting a core 21 inserted inside of the cylindrical metal mold 61 and sealing both edges of the cylindrical metal mold 61.

The lower core supporting member 62b is defined with a straight resin injecting inlet 64 for injecting the resin material into a roller forming space 63 formed within the cylindrical metal mold, while the resin injecting inlet is provided on the way with a closure mechanism 68 for regulating a resin fluid. If a resin injecting nozzle (not shown) at the side of the forming machine is urged to a nozzle touch portion 65 formed to be semi-circular with a part opening toward outside of the metal mold of a resin injecting inlet 64, so that the resin material is introduced into the roller forming space 63.

On the other hand, the upper core supporting member 62a is defined with a straight air vent hole 66, and a closure mechanism 67 is provided as crossing with the air vent hole 66 for closing the resin fluid.

The summary of the method of forming the roller by use of this producing apparatus is as follows.

At first, the core body 21 inserted within the cylindrical metal mold 61 is held at its upper and lower edges by the upper and lower core supporting members 62a, 62b, and subsequently a hot-setting liquid resin is filled into the roller forming space 63 through the resin injecting inlet 64, and on completion of filling, the closure mechanism 68 in the lower core supporting member 62b is operated to check a counter flow of the resin expanding within the cylindrical metal mold when hot-setting.

In contrast, the air vent hole 66 provided in the upper core supporting member 62a releases the closure mechanism 67 during filling the resin to exhaust the air in the roller forming space via the air vent hole 66 outside of the metal mold, and on completion of filling the resin, the closure mechanism is closed, and under this condition, the resin staying in the roller forming space is hot-set.

On completion of hardening the resin, the core supporting members 62a, 62b are removed upward and downward from the cylindrical metal mold 61 along the axial direction, and finally a formed product held within the cylindrical metal mold 61 is taken out by extruding the core body 21 with respect to the cylindrical metal mold 61. This is a method of producing rollers by means of this kind of the conventional apparatus.

However, the conventional roller producing apparatus and method are involved with many problems.

For example, in the conventional roller producing method, a metal mold device composed of the core supporting member and the cylindrical metal mold is charged with a thermosetting resin, and then the upper and lower closure mechanisms are closed to make the forming space a closed space. The closed space is filled with the thermosetting resin to form an elastic layer (formed body), and at this time the resin hot-set within the closed metal mold is generated with cubical expansion. Since the filled thermosetting liquid resin is non-compressive, an internal pressure within the metal mold by the cubic expanded resin is considerably high. A magnification of this internal pressure is normally more than 100 kg/cm$^2$, though depending on air tightness of the closure mechanism provided in the core supporting member, and so the metal mold must have sufficient pressure resistant strength. Accordingly, thickness of the cylindrical metal mold is large, and load should be large for connecting the cylindrical metal mold and the core supporting member.

If the internal pressure within the metal mold is large, the resin flows into the parting line between the cylindrical metal mold and core supporting member, and this becomes a burr appearing at the roller peripheral part, so that a secondary process as a polishing is necessary to remove burrs. Further, the resin often leaks from the closure mechanism 68 provided in the lower core supporting member 62b, so that a work is demanded to remove the resin adhered to the metal mold after having formed to cause the working efficiency to go down.

A problem is present when taking out the formed product from the metal mold. If the internal pressure within the metal mold is large, as the surface of the elastic layer is closely adhered to the inner surface of the metal mold, when releasing from the mold after completion of hardening, resistance against releasing from the mold is still large even if the elastic layer is shrunk with enough cooling time, and scratches often appear on the surface of the elastic layer by releasing from the mold. For avoiding these occasions, the cylindrical metal mold is carried out with a fluorine coating treatment, or a plating treatment for heightening smoothness, but with such only measures, the mold releasing property is not yet sufficient, and actually a mold releasing agent is coated on the inside of the metal mold per each time.

Next, referring to FIG. 36, explanation will be made to another conventional method of making rollers using the thermosetting liquid resin. This method comprises mixing silicone-based liquid base polymer (main agent), a cross linking agent, a catalyst and if necessary an electrically conductive agent within a vacuum agitating-defoaming device, rendering this to be one liquid state, storing it in a container 81, subsequently transferring a thermosetting liquid resin 82 in the container 81 by use of a force feed pump 83 to an injection device 84, sending to a cylinder 86, measuring a predetermined amount, and injecting into a cavity of a roller forming metal mold 88 via an injecting nozzle 87, thereby to form a roller main body. Herein, a cooling device 90 is necessary to normally keep cooled at about 10° C. or lower the transferring course comprising the container 81, injecting device 84, injecting nozzle 87 and transferring tube 89. In the illustrated example, a cooling liquid is circulated and supplied from the cooling device 90 through pipes 91a, 91b, 91c, 91d so as to cool each of the parts. The cooling device is provided because if this is absent, a bridging reaction of the thermosetting liquid resin progresses, and the liquid resin is adhered to and solidified on the inner walls of the transferring course comprising the container 81, injecting device 84 and transferring tube 89, and obstacles transferring of the liquid resin, so that the apparatus is frequently necessarily disassembled to clean to remarkably decrease productivity.

Since this cooling system heightens production cost, there is an attempt of adding a hardening retard agent to the liquid resin for avoiding the cost-up, and lengthening a pot life, but as a progressing risk of the bridging reaction of the liquid resin staying in the container 81 is high, a problem occurs in variation of quality between rollers at a beginning period of and after the injection forming.

However, in the conventional roller producing method employing the above mentioned cooling system, (1) since the thermosetting liquid resin is cooled down at about 10° C. or lower and increases viscosity, an injecting pressure is heightened to fill it into the cavity, it is necessary to design the thickness of the roller forming metal mold to be durable against the injecting pressure, and (2) if injecting the once cooled liquid resin, a problem arises that a heating load is increased when hot-setting, and a hardening reaction time is extended.

FIG. 37 is a schematically cross sectional view showing another example of the conventional injection forming apparatus (metal mold). In the same, reference numeral 41 designates the cylindrical metal mold, 42 shows the core body inserted inside of the cylindrical metal mold 41, 43, 44 are the core supporting members, 45, 46 are cover members screwed inside with thread, and 47 is a pin. A sequence of forming the elastic roller by use of the injection forming metal mold is as follows. At first, the cylindrical metal mold 41 is inserted with the core body 42, both edge parts 42a, 42b thereof are fitted in core supporting holes 43a, 44a provided in the cylindrical metal molds 43, 44, these core supporting members 43, 44 are engaged in the cylindrical metal mold 41, subsequently screwing cover members 45, 46 on the cylindrical metal mold 41 to protect them and to form the roller forming space 48 for closing the injection forming metal mold.

Next, an attaching hole 49 defined in the cover member 46 is attached with the resin injecting nozzle (not shown), the resin material is injected and filled into the roller forming space 48 through the resin injecting inlet 44b penetrating the core supporting member 44, an attaching hole 150 penetrating the cover member 45 is closed with a pin 47 to shut a vent hole 151, and the cylindrical metal mold 41 is heated to hot-set the resin material. Herein, as the heating means, listed are means contacting a heating mechanism (not shown) to an outside surface of the cylindrical metal mold 41, or means moving the injection forming metal mold into a blast furnace (not shown) to heat it.

After hot-setting, the cylindrical metal mold 41 is cooled, and the metal mold is opened in a sequence reversal to the above mentioned for releasing the formed product from the mold, and by repeating the above mentioned sequence, a new formed product is made.

However, the forming apparatus having the conventional injection forming metal mold as mentioned above has the following problems. One of them is difficult to automatize the steps of fitting the core supporting members 43, 44 in the cylindrical metal mold 41 and mounting the cover members 45, 46 by screwing in the production process, and must depend on manual operation. For example, when screwing the cover members 45, 46 on the cylindrical metal mold 41, if a tightening load is too large, the core body 42 receives excessive load and is easily bent, and if it is too small, the resin material leaks out owing to pressure of the filled resin to generate burrs in a formed product, resulting in decreasing the formability of the roller. Therefore, the tightening load should be adjusted, but automatization of this adjustment is difficult, not depending on the manual operation, and even if the automatization of this kind of steps is possible, since facility investment of the automatized mechanism is very expensive, so that it cannot cope with recent fierce low cost competitions. In particular, in case of mass production using the production apparatus of a plurality of rollers, this problem is remarkable and very much labor is demanded.

In addition, since the prior forming apparatus has such a complicated structure of the metal mold, when getting rid of the adhered and solidified resin after hot-setting, a maintenance working for dissolving and cleaning the roller producing apparatus is troublesome, taking much labor and inviting cost-up.

However, as shown in FIG. 38, when taking out the formed product from the cylindrical metal mold 13 upward or downward along the axial direction, owing to friction between an outer periphery 12e of a resin formed product 12 and an inside 13a of the cylindrical metal mold 13, force is exerted in the axial direction between an outer periphery 21e of the core body 21 and an inside periphery 12f of the resin-formed body 12, and when the formed body is extracted from the cylindrical metal mold 13, a relative position between the core body 21 and the resin-formed body 12 often gets out of position. In particular, force is concentrated to a part X of an edge 12c of the resin-formed body 12 and the core body 21 contacting, and as seen in FIG. 38B, the edge of the resin-formed body 12 and the core body 21 separate, and this portion serves as a trigger to often develop to a whole separation of the resin-formed body 12 and the core body 21. Therefore, a further method is to coat the cylindrical metal mold 13 on the inside with a mold releasing agent for reducing friction between the outer periphery 12e of the resin-formed body of the product and the inside 13a of the cylindrical metal mold, thereby lowering the shifting force exerting in the axial direction between the outer periphery 21e and the inner periphery 12f of the resin-formed body contacting the same. This method increases a step of coating the mold releasing agent, resulting in cost-up.

Silicone based addition type liquid rubber material enabling to be liquid-injected inherently ordinarily used as the resin material for forming the elastic layer; polyether based addition type liquid rubber material which hydrosilyl-hardens terminal allylated polyoxyalkylene based polymer or terminal allylated polyolefin based polymer with poly siloxane based hardening agent; polyolefin based addition type liquid rubber material; urethane based liquid rubber material; EPDM rubber enabling to be injection-formed; millable silicone rubber; or NBR rubber are low in density of polar group contributing to the adhesion or scarcely contain the polar group, thereby to be difficult to adhere a metal made core body. Also in a case of using primer for improving the adhesion of the resin-formed body 12 to the core body 21, depending on the coating of primer to the metal core body 21, influences of adhesion checking substance (for example, a cutting oil) remaining on the metal core body or variation in histories of temperature and moisture after drying, differences arise in a film forming property of the primer component or the adhesion thereof with metal, or residual degree of functional group, so that the adhesion between the resin-formed body 12 and the metal core body 21 might vary. If an injection pressure is high in the metal mold during forming, the primer on the surface of the metal core 21 is forced out by the resin flowing and the primer does not fully display effect, and even if the primer is coated, a sufficiently satisfied adhesion cannot be obtained. Besides, of course a step of coating the primer is added to invite cost-up.

Thus, when taking out the formed product from the cylindrical metal mold 13 upward or downward along the axial direction, owing to friction between an outer periphery 12e of a resin formed product 12 and an inside 13a of the cylindrical metal mold 13, force is exerted in the axial direction between an outer periphery 21e of the core body 21 and an inside periphery 12f of the resin-formed body 12, and a relative position between the core body 21 and the resin-formed body 12 often gets out of position. There is a method of in advance coating the primer to the core 21 for heightening the adhesive strength between the core 21 and the resin-formed body 12, but this method is involved with problems of increasing a primer coating step and that the liquid rubber material used as a resin forming material is inherently weak in the adhesive force with the metal core 21. Therefore, by decrease in the rate of good products by getting out of a relative position between the core 21 and the resin-formed body 12 or addition of the primer coating step, the cost-up is caused in the production of resin rollers.

Accordingly, it is an object of the invention to offer a resin roller enabling to check resin leakage from a formed roller, though using a core body having the same outer diameter in the edge portion as a center part thereof.

It is another object of the invention to offer a resin roller improving durability in a surface layer and in turn having a long life.

It is a further object of the invention to offer a roller producing apparatus which is easy to release from a mold, obtains rollers without scratches or burrs, enables to use a metal mold having a structure of thin thickness and light weight and to shorten a cooling time-before releasing the mold, and a method thereof.

It is a still further object of the invention to offer a roller producing apparatus which does not employ a cooling step of a liquid resin being a technical common knowledge in the prior art, restrains heating load and shortens a hardening reaction time for decreasing energy loss, is excellent in productivity and less to vary product quality, and a method thereof.

It is a yet further object of the invention to offer an apparatus of injection-forming rollers which largely reduces manually operating steps, easily accomplishes automatization of opening and closing the metal mold, lighten maintenance work, and enables to make rollers at low cost.

It is another object of the invention to offer a resin roller which enables to prevent peeling in a part contacting the edge faces of the resin-formed body and the core body for checking getting out of a relative position between the resin-formed body and the core body in the formed resin roller, and a forming metal mold therefor.

DISCLOSURE OF THE INVENTION

The resin roller of the invention is produced by disposing a core body in a forming metal mold having a cylindrical metal mold and core supporting members furnished at both edge parts of the cylindrical metal mold as well as causing the core supporting members to hold said both edge parts, and pouring a forming resin into the metal mold and solidifying it, and is characterized in that the resin roller has the core body of the same outer diameter over a full length and a cylindrical resin- formed body, sealing members are furnished around the core body in the vicinity of both edge parts of the resin-formed body, and the core body is disposed such that the sealing members contact edge faces at sides of a roller forming space.

In another embodiment, the core body is defined with grooves for attaching E-rings and when the E-ring is attached in the groove and the core body is disposed in the metal mold, the sealing members are provided to the core body such that the sealing members respectively contact the E-ring and the edge faces of the core supporting members.

In another embodiment, the cylindrical member is attached to the core body and when the core body is disposed in the metal mold, the sealing members are provided to the core body such that the sealing members respectively contact the cylindrical metal mold and the core supporting members.

In another embodiment, the sealing members are provided to the core body and when the core body is disposed within the metal mold, the edge faces of the sealing members contact the edge faces of the core supporting members.

In another embodiment, the core body is defined with grooves for attaching the sealing members, and when the core body is disposed within the metal mold, the sealing members are disposed such that the sealing members contact the edge faces of the core supporting members in the grooves.

In another embodiment of the invention, the resin roller has the core body of the same outer diameter over a full length and a cylindrical resin-formed body provided at the center part of the core body, and is characterized in that the sealing members are disposed around the core body in the vicinity of both edges of the resin-formed body, and edge faces of the sealing members are the same as edge faces of the resin-formed body or project.

A method of producing the resin roller according to the invention comprises the step of disposing the core supporting members at both edge parts of the cylindrical metal mold and holding the core body with both core supporting members, and the step of pouring the forming resin into the roller forming space formed between the cylindrical metal mold and the core supporting members and solidifying the forming resin to form a resin-formed body around the core body, and is characterized by disposing the sealing members around the core body in the vicinity of the edge parts of the resin-formed body, elastically contacting the sealing members to the sides of the roller forming space of the core supporting members, and, under this condition, pouring the forming resin into the roller forming space.

By the way, in case a measure against the resin leakage for the core supporting members and the core body is required to both edges of the core body, the same sealing method is not necessarily selected.

Further, the resin roller according to the invention is characterized in that the resin roller is formed in the roller main body by providing a cylindrical resin layer around the core body, and the roller main body is chamfered or rounded at corners of edge parts of the resin layer, and the resin layer is formed on the surface with a surface layer.

In an embodiment, the hardness of the resin layer is 25° or lower (JIS-A).

In another embodiment, a dimension of the part for chamfering or rounding the corner of the resin layer is 1 to 40 times of a swelling amount of the edge part having a larger diameter than the center part of the formed roller main body.

A method of producing the resin roller according to the invention is characterized by comprising the step of disposing the core body in the forming metal mold, pouring the thermosetting liquid resin into the metal mold for hot-setting, and forming the roller main body furnished with a cylindrical resin layer around the core body, the step of releasing the roller main body from the metal mold, followed by chamfering or rounding the corners of the edge parts of the resin layer, and the step of forming the surface layer around the resin layer.

In an embodiment, the step of chamfering or rounding the corners of the edge parts of the resin layer comprises a step of heating the corners to fuse and remove the resin at the corners.

In another embodiment, the step of chamfering or rounding the corners of the edge parts of the resin layer comprises a step of coating a solvent to the corner for dissolving and removing the resin at the corner.

In another embodiment, the hardness of the resin layer is 25° or lower (JIS-A).

In another embodiment, when the swelling amount of the edge part in comparison with that of the center part of the formed roller body is 1, the swelling amount of the part for chamfering or rounding is 1 to 40 times of said swelling amount in the diameter direction as well as the axial direction.

In another embodiment, the thermosetting liquid resin contains, as main components, (A) polymer containing at least one alkenyl group in molecule and a repeating unit composing a main chain being mainly oxy alkylene unit or saturated hydrocarbon unit, (B) a hardening agent containing at least two hydrosilyl group in molecule, (C) catalyst made hydrosilyl, and (D) conductivity giving agent.

Further, the roller producing apparatus of the invention is to produce a roller composed of the core body and a resin-made elastic layer covering around the core body by use of a metal mold having a structure disposed with the core supporting members holding the roller forming space therebetween at both ends of the cylindrical metal mold inserted inside with the core body, and is characterized in that the core supporting member is provided with a mold inner pressure adjusting mechanism.

In an embodiment, the mold inner pressure adjusting mechanism provided in the core supporting member is equipped with a volume-variable spare room communicating with the roller forming space.

In another embodiment, an inner diameter D of the cylindrical metal mold, an outer diameter d of the roller, an outer diameter ds and thickness of the elastic layer are prescribed such that a value of cross sectional shrinkage factor $\alpha$ defined with $(D2-d2)/(D2-d_s2)$ is 0.02 to 0.06, and the thickness of the elastic layer expressed with $(d-ds)/2$ is 1 mm or more.

In another embodiment, for forming the resin roller, the core supporting member is provided with a mold inner pressure adjusting mechanism, and a mold inner pressure during hot-setting is adjusted to be 100 kg/cm² or lower.

A further method of the invention is to produce a roller for an electrophotographic apparatus composed of a main body formed with a curing type liquid resin and support shafts for supporting both edges of the main body, and is characterized by preparing a roller forming metal mold provided with a space for forming a roller main body as well as provided with a resin injecting inlet for filling a hardening type liquid resin in the roller forming space, storing separately a hardening type liquid resin containing a cross linking agent and another hardening type liquid resin containing a catalyst, respectively measuring to be set amounts thereof, and as mixing both hardening liquid resins, injecting a mixture into the forming space from the resin pouring inlet so as to effect a hardening reaction for forming the roller main body.

The roller producing apparatus depending on such a method is characterized by providing a roller forming metal mold formed with a space for forming a roller main body as well as provided with a resin injecting inlet for filling the hardening type liquid resin in the roller forming space, containers for storing separately a hardening type liquid resin containing a bridging agent and another hardening type liquid resin containing a catalyst, an injecting device furnished with measuring mechanisms for respectively measuring both resins to be set amounts, and a mixing mechanism for mixing both measured liquid resins, injecting, as mixing both resins, a mixture into the forming space from the resin pouring inlet so as to effect a hardening reaction for forming the roller main body.

In an embodiment, a temperature adjusting instrument is provided, and it is preferable to adjust temperature of the hardening type liquid resin at injecting to be within a range of 20 to 70° C., and to adjust viscosity of the hardening type liquid resin at injecting to be 5000 poise.

When controlling the electric conductivity of the roller, it is desirable to add the conductivity giving agent of the same amount to the hardening type liquid resin containing the bridging agent and the other hardening type liquid resin containing the catalyst.

It is preferable that the composition of the hardening type liquid resin has polymer containing at least one alkenyl group in molecule and a repeating unit composing a main chain being mainly oxy alkylene unit or saturated hydrocarbon unit, and the bridging agent has at least two hydrosilyl group in molecule.

An apparatus of injection-forming roller of the invention is characterized by having a cylindrical metal mold inserted inside with the core body and core supporting members detachably fitted to both edge parts in the axial direction of the cylindrical metal mold as holding both edges of the inside inserted core body, and is composed by disposing heating mechanisms for hot-setting the resin material introduced in a roller forming space around the injection forming metal mold having the roller forming space, said core supporting member having a 1st obliquity tilting at a fixed angle with respect to an axial and vertical direction in the outer wall face, and said heating mechanism having an inner wall face contacting to hold the injection forming metal mold under a condition of closing the heating mechanism and having a 2nd obliquity pressing the 1st obliquity to the inner wall face, whereby the injection forming metal mold is tightened and held.

More specifically, it is preferable that the core supporting member has a 1st obliquity at the outer periphery, while the heating mechanism has pawl members with the 2nd obliquity pressing the 1st obliquity to the inner wall face under the condition of closing the heating mechanism.

Another specific structure is preferable in that a brim part having the 1st obliquity is expanded at an outer periphery of the fitting position of the core supporting member and the cylindrical metal mold, and the brim part is engaged with the inner wall face of the heating mechanism under the condition of closing the heating mechanism, while the groove with the 2nd obliquity pressing the 1st obliquity is formed in concave shape.

Preferably, a heat resistant elastic member such as rubber is interposed between the 1st obliquity and 2nd obliquity, and desirably the tilt angle of the 1st obliquity is set in a range of 5 to 30°.

Further, a resin roller of the invention is formed with a cylindrical resin-formed body around the core body, and is characterized in that the resin-formed body is formed as standing along the core body toward the edge of the core body.

The resin roller is produced by disposing the core body in the forming metal mold having a cylindrical metal mold and core supporting members furnished at both edge parts of the cylindrical metal mold as well as causing the core supporting members to hold said both edge parts, and pouring the resin into the metal mold and solidifying it.

In an embodiment, the standing state of the resin-formed body reduces a diameter in arc toward the edge of the core body.

In another embodiment, the standing state of the resin-formed body reduces a diameter linearly toward the edge of the core body.

In another embodiment, the standing state of the resin-formed body reduces a diameter stepwise toward the edge of the core body.

Incidentally, in the inventive resin roller, it is not necessary that the resin-formed body is formed as standing at both edge parts. If either one of the edges is formed to stand, it is sufficient to form one of the edges positioning forward to stand when extracting a formed product from the metal mold. Besides, if both edges are formed to stand, it is not necessary to form both edges in the same shape.

The inventive resin roller forming metal mold holds the cylindrical metal mold and the core body furnished at both edge parts of the cylindrical metal mold and inserted inside of the cylindrical metal mold, and is characterized in that a ring shaped concave groove is formed at an opening edge of a core holding hole provided in the core supporting member, said groove being larger in diameter than an outer diameter of the core body to be inserted in said core holding hole.

In an embodiment of the resin roller forming metal mold, the ring shaped concave groove reduces the diameter as advancing an inner part of the core holding hole.

BRIEF DESCRIPTION OF THE DRAWINGS

FIG. 11 is a schematic view showing a structure of the apparatus for explaining the method of producing the roller according to the invention;

FIG. 19 shows another embodiment, in which A is a vertically cross sectional view of the forming metal mold and B is a cross sectional view of an elementary part showing a standing state in the resin roller to be formed by the metal mold;

FIG. 20 shows another embodiment, in which A is a vertically cross sectional view of the forming metal mold and B is a cross sectional view of an elementary part showing a standing state in the resin roller to be formed by the metal mold;

FIG. 21 is a further embodiment, in which A is a vertically cross sectional view of the forming metal mold and B is a cross sectional view of an elementary part showing a standing state in the resin roller to be formed by the metal mold;

FIG. 26 is a cross sectional views showing states of resin injecting in the core body and the forming metal mold in the prior art;

MOST PREFERRED EMBODIMENT OF THE INVENTION

Embodiment 1

The resin roller of the invention will be explained with reference to the attached drawings.

Figure 1:
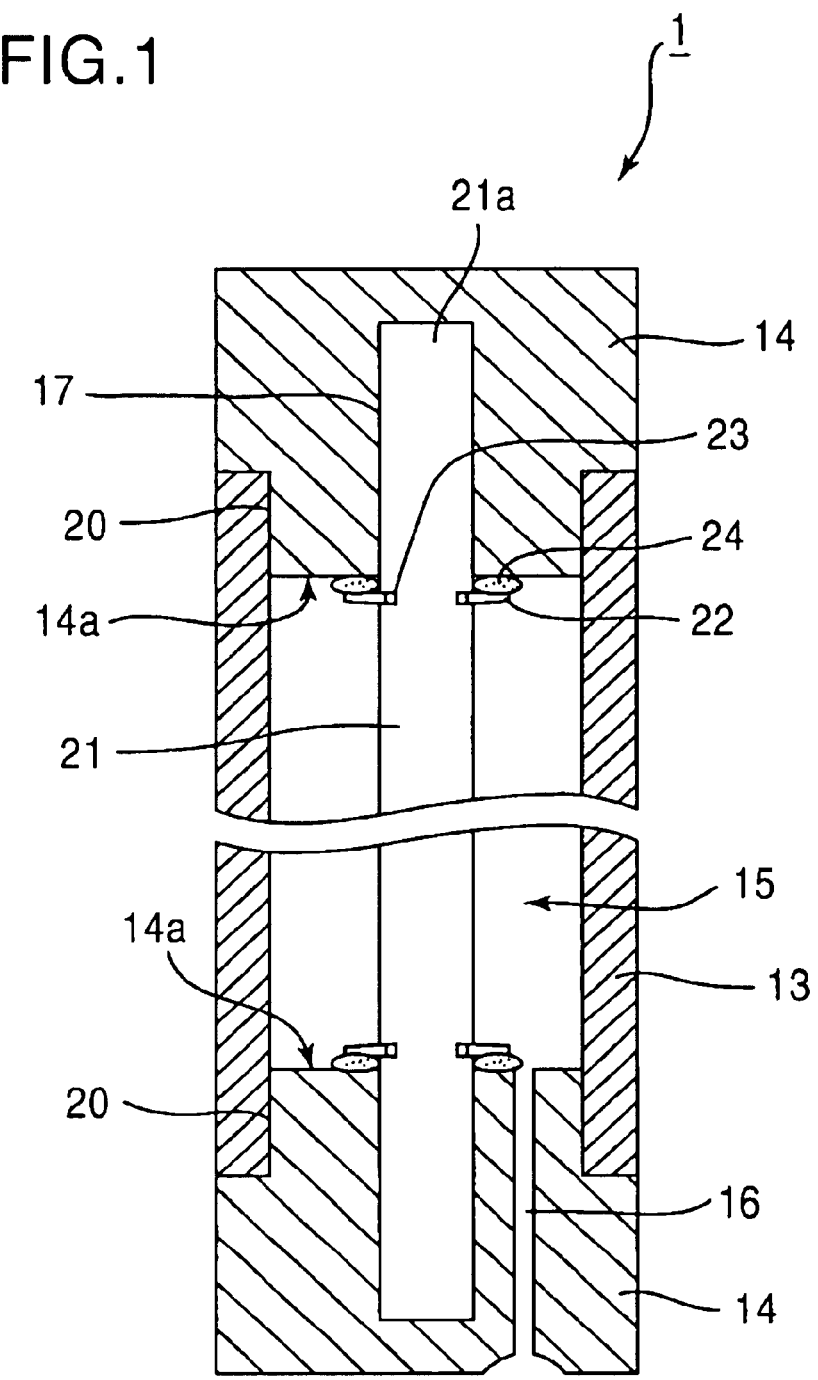
FIG. 1 is a cross sectional view showing a forming metal mold of the resin roll in an embodiment of the invention.

As shown in FIG. 1, the forming metal mold 1 has the cylindrical metal mold 13 and a pair of core supporting members 14, 14 disposed at both ends of the cylindrical metal mold 13, and the cylindrical metal mold 13 and the pair of core supporting members 14 define the roller forming space 15. One of the core supporting members 14 is provided with the resin injecting inlet 16.

The core body 21 has the same outer diameter over a lengthwise direction, and is located at ends 21a in concave parts 17 formed in the core supporting members 14. After forming, a cylindrical formed body 12 is produced which is composed of resin at the center part of the core body 21.

Figure 6A:
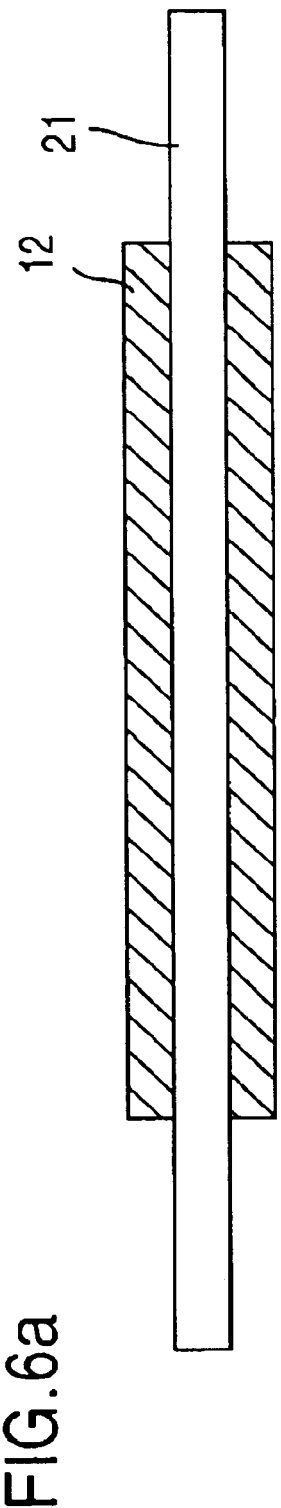
FIG. 6 is cross sectional views showing the core bodies and the resin rollers used in the invention.
Figure 6B:
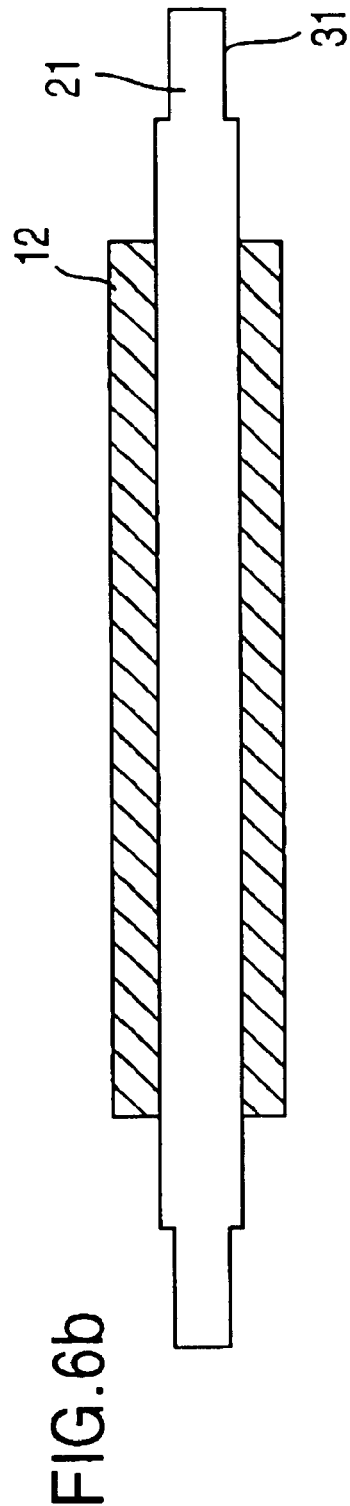
Figure 6C:
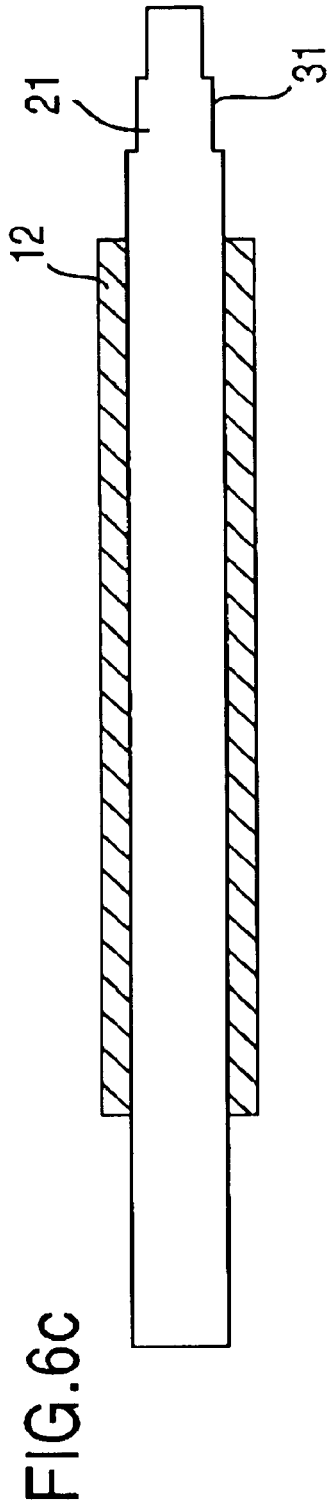

Shapes of the core body 21 are pertinent to those shown in FIGS. 6A to 6C, and for the core body 21 of the resin roller, known optional materials, for example, metal materials or conductive resin materials are applicable as the core body 21 of the invention.

By the way, the core body 21 shown in FIG. 6A is a bar like material having the same outer diameter, the core body 21 shown in FIG. 6B is formed at both ends with engaging parts 31 for attaching to a machine, and the core body 21 shown in FIG. 6C is formed at one end with an engaging part 31 of plural steps.

As to optional dimensions of known resin rollers, the forming metal mold, the core body 21 and the sealing members are applicable, and generally, a diameter is 10 to 30 mm and a length is 200 to 400 mm.

The cylindrical metal mold 13 and the core supporting member 14 are composed of known arbitrary materials for thermosetting liquid resin, preferably pre-hardened steel, quenched steel, non-magnetic steel, carbon tool steel, or corrosion resistant steel (stainless steel).

The core supporting members 14 have steps 20 for holding cylindrical metal mold 13 at the periphery thereof and the concave parts 17 at the center parts thereof, and the pair of core supporting members 14, 14 are located in opposition to both ends of the cylindrical metal mold 13, while the cylindrical metal mold 13 is fitted at both ends to steps 20 of the core supporting members 14. Thus, the forming metal mold 1 is composed. The core body 21 is inserted at its ends in the concave parts 17 formed in the core supporting members 14, and is disposed in the forming metal mold 1.

As shown in FIG. 1, the core body 21 is provided with grooves 23 for holding E-rings 22, and the sealing members 24 are furnished to contact the E-rings 22 held in the grooves 23 and contact edge faces 14a of the roller forming space 15 of the core supporting members 14.

Figure 4:
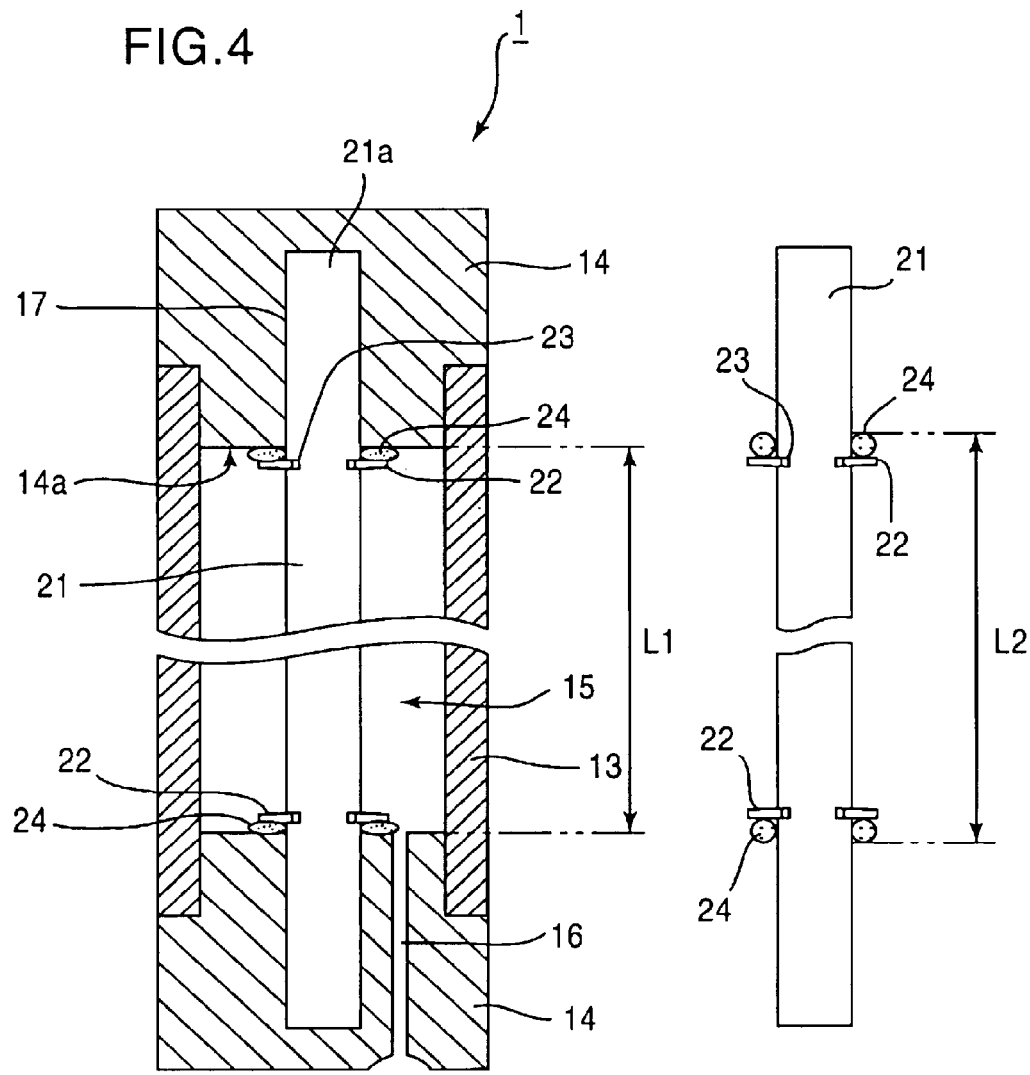
FIG. 4 is cross sectional views showing the relation between the forming metal mold and attaching positions of the sealing members.

As to positions for providing the E-rings 22 and the sealing members 24, as illustrated in FIG. 4, if a distance L2 between ends of the sealing member s 24 at both edges is made larger than a distance L1 between ends of the pair of core supporting members 14, 14 under a condition of setting up the forming metal mold 1, so that the sealing members 24 are compression-deformed owing to pressure when incorporating the core supporting members 14 to the cylindrical metal mold 13, this manner is more preferable for increasing the sealing effect.

As to the quality of the sealing member, available are resin materials as polyethylene, polypropylene, polyamide, polycarbonate or polyimide, such resin materials of said resin materials rendered to be conductive as needed, or metal materials as aluminum, brass, iron, and of course such materials should be selected which are not fused and deformed when hot-setting after pouring.

Especially, as materials effective against compressive deformation by the setting force of the core supporting member 14 and the resin leakage, available are elastic resin materials as polyvinylchloride, silicone, polyurethane, EPDM or NBR, such resin materials of said resin materials rendered to be conductive as needed, or metal materials as copper, brass or phosphor bronze.

The sealing member 24 is manufactured by injecting formation or extruding formation, punching process of a sheet or plate, forging or casting, and shapes have preferably inner diameters closing to the core body 21, thickness of 0.1 to 3 mm and length of 0.1 to 20 mm, more preferably thickness being 0.1 to 2 mm and length being 1 to 5 mm. Cross sectional shapes are circular, semi-circular, oval or square.

The above materials are made sheets, and if necessary, a tape coated with an adhesive on the rear side is wound on the sheet to make a sealing member 24. Otherwise, if a thermal shrinkage tube produced with a thermally shrinking resin material is applied to the core body 21, and heated and shrunk, it can be attached to a desired position.

Using mass-produced O-rings, the sealing members 24 are cheaply got and further cost-down is possible. For example, using O-rings on the market, if the outer diameter of the core body 21 is 5 to 10 mm, a diameter in cross section of the O-ring is ordinarily 1.9 mm, and if the distance L2 between the ends of the pair of sealing members 24 is determined such that the O-ring is compressed by 0.5 mm by the setting force of the core supporting member 14, a result is more preferable.

EMBODIMENT 2

Figure 2:
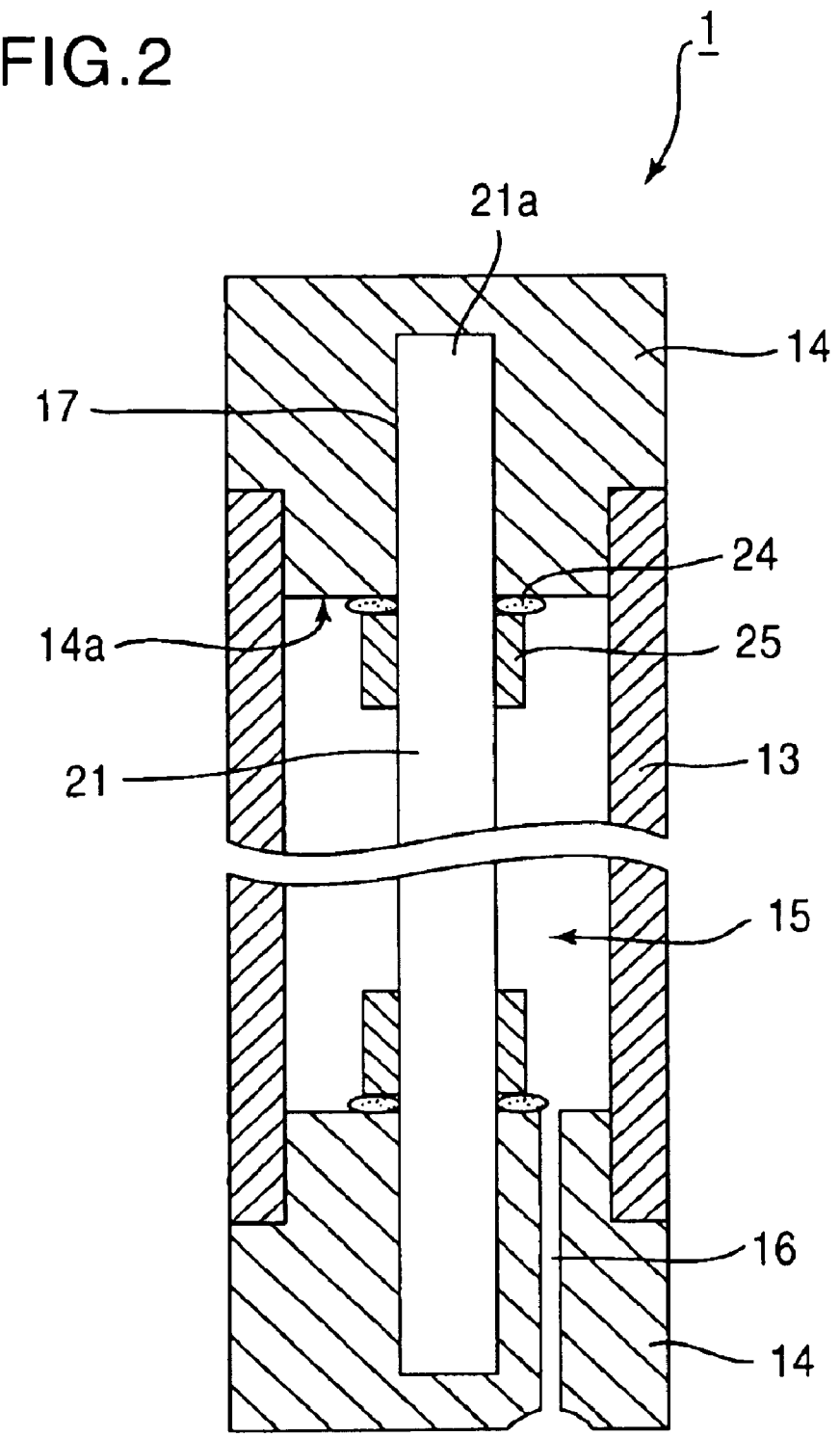
FIG. 2 is a cross sectional view showing the forming metal mold of the resin roll in another embodiment of the invention.

FIG. 2 shows another embodiment.

The core body 21 is attached with cylindrical members 25, and the sealing members 24 are furnished on the core body 21 so as to contact the cylindrical member 25 and contact edge faces 14a at the side of the roller forming space of the core supporting member 14. The cylindrical member 25 is attached to the core body 21 by manners as adhesion, caulking, urging insertion by force-fitting dimension, or inserting formation into the core body 21. In either way, such manners are adopted which are not easily moved by vibration or expansion pressure when forming a formed body 12.

As to the quality of the cylindrical member 25, available are resin materials as polyethylene, polyproplylene, polyamide, polycarbonate or polyimide, such resin materials of said resin materials rendered to be conductive as needed, or metal materials as aluminum, brass, iron, copper or phosphor bronze, and of course such materials should be selected which are not fused and deformed when hot-setting after pouring.

In particular, for urging to insert the cylindrical member to the core body 21, making use of elasticity of the resin, useful are elastic resin materials as polyvinylchloride, silicone, polyurethane, EPDM or NBR, such resin materials of said resin materials rendered to be given conductive as needed.

The above materials are made sheets, and if necessary, a tape coated with an adhesive on the rear side is wound on the sheet to make a sealing member 24. Otherwise, if a thermal shrinkage tube produced with a thermally shrinking resin material is applied to the core body 21, and heated and shrunk, it can be attached to a desired position.

The dimensions of the cylindrical member are preferably thickness of 0.5 to 3 mm and length of 2 to 20 mm, more preferably thickness being 0.5 to 2 mm and length being 2 to 10 mm.

Also as to the attaching position of the cylindrical member 25 and the sealing member 24, as above mentioned, if the distance L2 between ends of the sealing members 24 at both edges is made larger than the distance L1 between ends of the pair of core supporting members 14 under the condition of setting up the forming metal mold, so that the sealing member s 24 are compression-deformed owing to pressure when incorporating the core supporting members 14 to the cylindrical metal mold 13, this manner is more preferable for increasing the sealing effect.

The quality, dimensions and shapes are the same as those of the above mentioned embodiment.

EMBODIMENT 3

Figure 3:
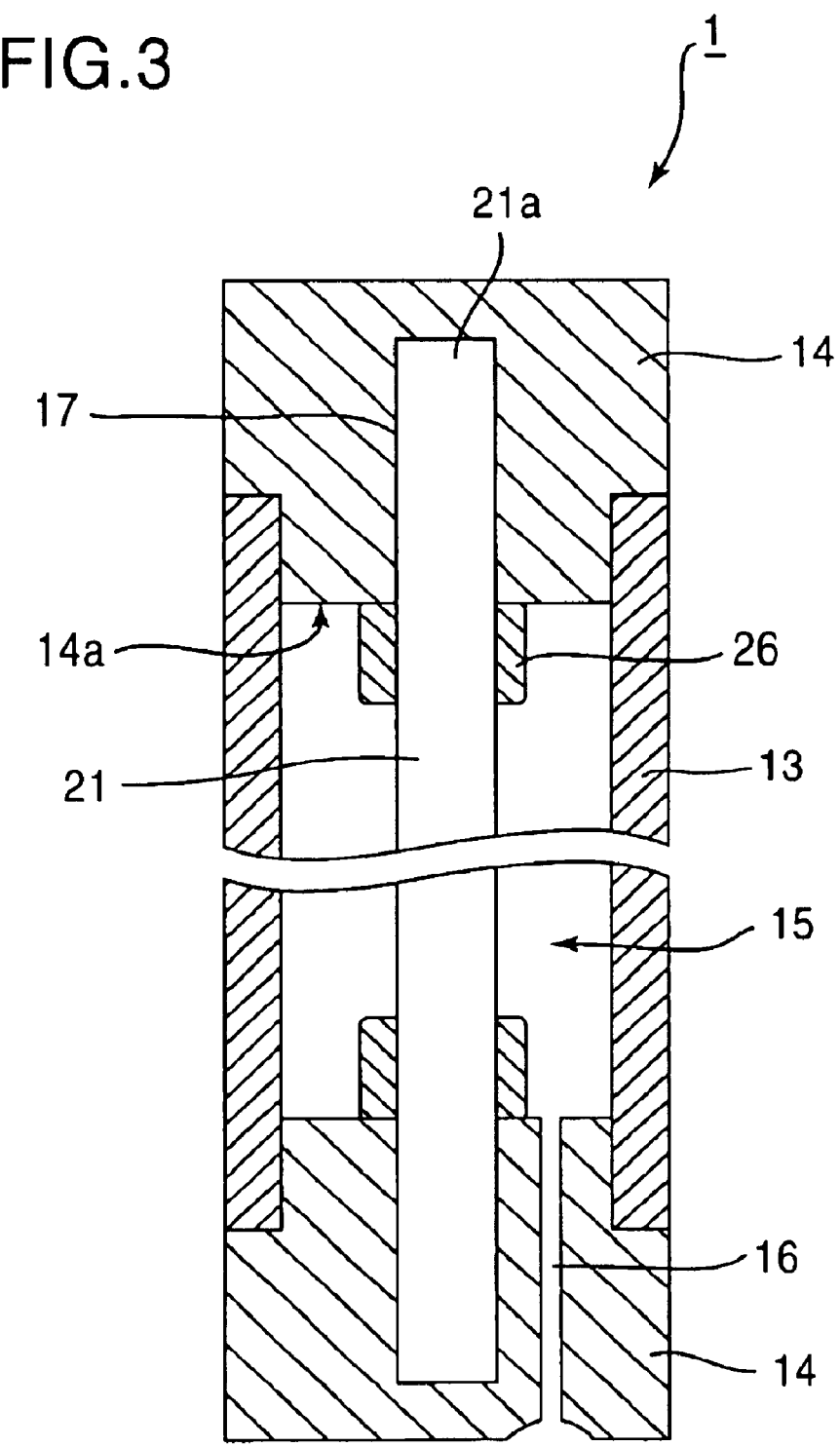
FIG. 3 is a cross sectional view showing the forming metal mold of the resin roll in a further embodiment of the invention.

FIG. 3 shows another embodiment.

Cylindrical sealing members 26 are attached so as to contact to the edge faces 14a at the side of roller forming space of the core supporting members 14 with respect to the core body 21 by manners as adhesion, caulking, or urging insertion by force-fitting dimension, or inserting formation into the core body 21. Especially, in a case of elastic resin materials as synthetic rubbers to be elastically deformed by tension, it is effective to select those of smaller inner diameter than that of the core body 21. In either way, such manners are of course adopted which are not easily moved by vibration or expansion pressure when forming a formed body 12.

As to the attaching position of the cylindrical sealing member 26, if the distance L2 between ends of the cylindrical sealing members 26 at both edges is made larger than the distance L1 between ends of the pair of core supporting members 14 under the condition of setting up the forming metal mold, so that the sealing members 24 are compression-deformed owing to pressure when incorporating the core supporting members 14 to the cylindrical metal mold 13, this manner is more preferable for increasing the sealing effect.

As to the quality of the cylindrical sealing member 26, available are resin materials as polyethylene, polypropylene, polyamide, polycarbonate or polyimide, such resin materials of said resin materials rendered to be conductive as needed, or metal materials as aluminum, brass or iron, and of course such materials should be selected which are not fused and deformed when hot-setting after pouring.

Especially, if expecting such materials effective against compressive deformation by the setting force of the core supporting member 14 and the resin leakage, available are elastic resin materials as polyvinylchloride, silicone, polyurethane, EPDM or NBR, such resin materials of said resin materials rendered to be conductive as needed, or metal materials as copper, brass or phosphor bronze.

The sealing member 26 is manufactured by injecting formation or extruding formation, punching process of a sheet or plate, forging or casting, and shapes have preferably inner diameters closing to the core body 21, thickness of 0.01 to 3 mm and length of 0.5 to 20 mm, more preferably thickness being 0.01 to 2 mm and length being 1 to 5 mm. Cross sectional shapes are circular, semi-circular, oval or square.

The above materials are made sheets, and if necessary, a tape coated with an adhesive on the rear side is wound on the sheet to make a sealing member 26. Otherwise, if a thermal shrinkage tube produced with a thermally shrinking resin material is applied to the core body 21, and heated and shrunk, it can be attached to a desired position.

EMBODIMENT 4

Figure 5:
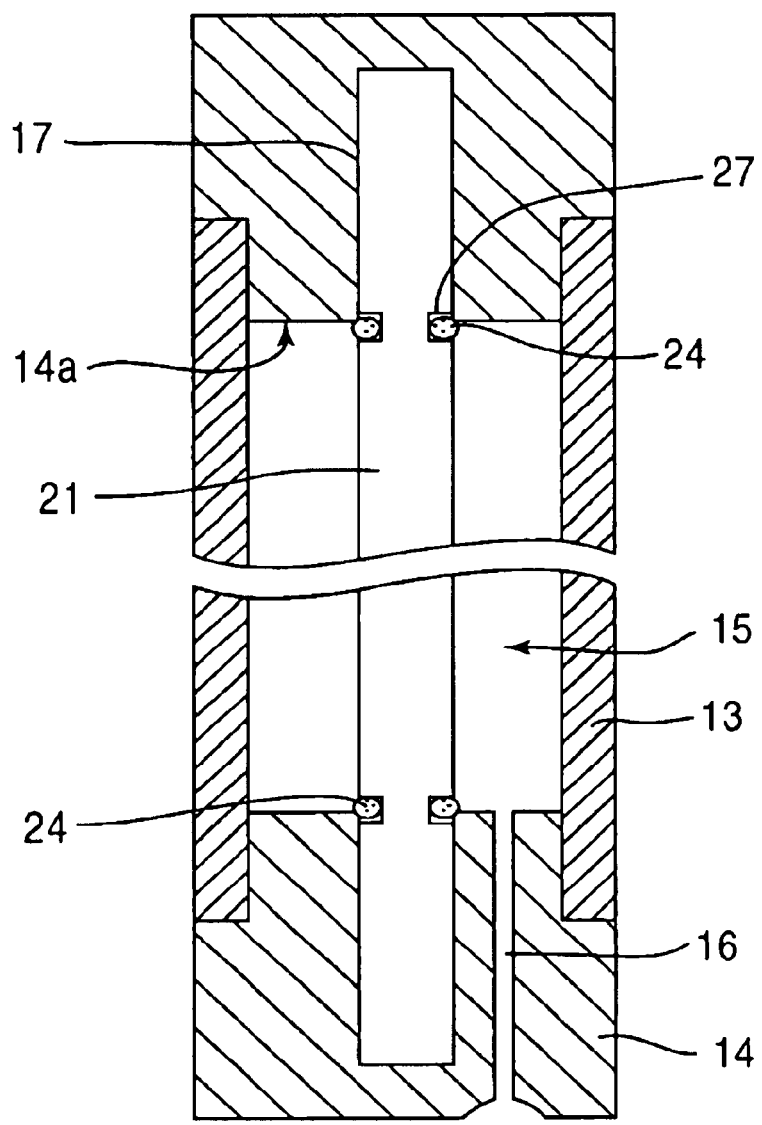
FIG. 5 is a cross sectional view showing the forming metal mold of the resin roll in a still further embodiment of the invention.

FIG. 5 shows another embodiment.

The core body 21 is defined with grooves 27 for attaching the sealing members 24, and the sealing members 24 are attached so as to contact the edge faces 14a of the core supporting members 14. As to the attaching position of the sealing member 24, if the distance L2 between ends of the sealing member s 24 at both edges is made larger than the distance L1 between ends of the pair of core supporting members 14 under the condition of setting up the forming metal mold, so that the sealing members 24 are compression-deformed owing to pressure when incorporating the core supporting members 14 to the cylindrical metal mold 13, this manner is more preferable for increasing the sealing effect.

The dimensions of the sealing member 24 are determined such that a part of the sealing member 24 projects outside of the outer periphery of the core body 21 from the groove when the sealing member 24 is attached into the groove 27.

As to the quality of the sealing member 24, available are resin materials as polyethylene, polyproplylene, polyamide, polycarbonate or polyimide, such resin materials of said resin materials rendered to be conductive as needed, or metal materials as aluminum, brass or iron, and of course such materials should be selected which are not fused and deformed when hot-setting after pouring. Especially, as such materials effective against compressive deformation by the setting force of the core supporting member 14 and the resin leakage, available are elastic resin materials as polyvinylchloride, silicone, polyurethane, EPDM or NBR, such resin materials of said resin materials rendered to be conductive as needed, or metal materials as copper, brass or phosphor bronze. If mass produced O-rings are used, the sealing members are cheaply available to cost down.

The sealing member 24 is manufactured by injecting formation or extruding formation, punching process of a sheet or plate, forging or casting, and shapes have inner diameters closing to the groove 27 of the sealing member, and the outer diameter has preferably a dimension largely protruding 10 to 90% of the thickness of the sealing member from the outer peripheral face. The thickness is preferably 0.1 to 5 mm, the length is 0.1 to 20 mm and the thickness is 1 to 3 mm, more preferably the thickness is 1 to 3 mm and the length is 1 to 20 mm. Cross sectional shapes are circular, semi-circular, oval or square.

The depth of the groove 27 for holding the sealing member 24 to the core body 21 is preferably 10 to 90% of the thickness of the sealing member 24.

Next, explanation will be made to the method of producing the resin roller of the invention by use of the core body 21 and the structure of the outer periphery of the same.

Polysiloxane based hardening agent and the conductivity giving agent (carbon black) are mixed in terminal allylated polyoxypropylene based polymer, and when forming a roller of an outer diameter being $\phi$ 16 mm and a length of a resin-formed body being 250 mm in a liquid resin injecting and pouring machine, it is preferable that a viscosity of the mixed and poured resin is 200 to 5000 poises and a pouring pressure is 0.5 to 15 MPa, though depending on the number of mixing part of the conductivity giving agent.

When the thickness of the resin formed body 12 is 4 mm in the roller of the above mentioned dimensions, the diameter of the resin injecting inlet of the metal mold is preferably 1 to 2 mm. Further, as to the direction of the metal mold when pouring, preferably the lengthwise direction of the metal mold stands vertically for pouring from the lower part of the metal mold.

The metal mold may be heated depending on any arbitrary methods. Specifically, for example, there is a method of heating in a heating oven having heating fans, a method of heating by arranging electric heaters around the metal mold, or a method of heating by arranging induction heating coils around the metal mold.

For the temperature of the metal mold, it is possible to select any temperatures enabling to pour and hot-set the thermosetting liquid resin, and at pouring the resin, desirable are temperatures for easily pouring the resin and not hardening, for example, 20 to 70° C. The heating temperature of the resin is preferably 80 to 200° C., though depending on the amount of a harden-retarding agent to be mixed in the resin.

As roller forming resin materials available to the inventive forming method, resins of heat-removal hardening are employed, for example, silicone, polyurethane, acrylonitrile.butadiene copolymer (NBR), ethylene.propylene.diene.methylen copolymer (EPDM).

The thermosetting liquid resin may be added with other kinds of additives as needed. For example, if a resistance controlling agent as carbon is added, electric resistance of the roller can be controlled.

As the above mentioned thermosetting liquid resin materials, later explained hardening compositions may be used. The roller forming resin composed of reaction hardening substance of the hardening composition has an especially soft structure, and even if the thickness is made thin, it displays enough an elastic effect. Containing oxyalkylene unit in molecule, it has low viscosity before hardening and is easily dealt, and containing saturated hydrocarbon unit, it is low in water absorption rate, and preferably cubic variation and variation of roller resistance are low.

That is, it is preferable that the thermosetting liquid resin material contains, as main components,
(A) polymer containing at least one alkenyl group in molecule and a repeating unit composing a main chain being mainly oxy alkylene unit or saturated hydrocarbon unit,
(B) a hardening agent containing at least two hydrosilyl group in molecule,
(C) catalyst made hydrosilyl, and
(D) conductivity giving agent.

The thermosetting liquid resin is added, if necessary, with materials for adjusting thermosetting reaction such as hardening agent, hardening accelerator, hardening retardant or others. Or, organic or inorganic fillers may be added. Further, some kinds of organic or inorganic pigments, thickener or mold releasing agent may be added.

Indefinite examples of the invention will be explained.

Example A-1

The resin roller of the roller outer diameter being φ 16 mm and the length of a resin formed body 12 being 250 mm was formed by use of the metal mold 1 shown in FIG. 3.

The outer diameter of the core body 21 was 6 mm, and a silicone tube of the inner diameter serving as the sealing member 26 being 4 mm, the outer diameter being 6 mm and the length being 5 mm was urged into and attached to the core body 21, and the attaching position was designed such that the sealing member 26 was compressed by 0.5 mm in the axial direction owing to the setting force of the core supporting member 14.

The inner diameter of the concave part 17 of the core supporting member 14 and the space of the end part 21a of the core body 21 were 15μ.

The used thermosetting liquid resin was 600 poises in the viscosity in the mixed resin shown in the under table.

In the liquid resin injecting and pouring machine, the mixed resin material was poured into the metal mold having the resin injecting inlet 16 of 1.5 mm from the lower portion under the pouring pressure of 4 MPa, the metal mold standing vertically in the lengthwise direction.

The metal mold was arranged within the heating oven provided with the heating fans and was heated by setting the atmospheric temperature within the heating oven to be 140° C. for 20 minutes and releasing from the metal mold, and a formed product was obtained.

As a result, at the ends of the obtained roller, no resin leakage occurred.

TABLE 1

| Components of hardening compositions | Wt parts |
| --- | --- |
| (A) Terminal allylated polyoxypropylene based polymer (Number average molecular weight (Mn) 8000) | 100 |
| (B) Polysiloxane based hardening agent (SiH value per 100 g: 0.36 mol) | 6.6 |
| (C) 10% isopropyl alcohol solution of chloroplatinic acid | 0.06 |
| (D) Carbon black (made by Mitsubishi Co., Ltd. Product name "3030") | 7 |

According to the invention, even if using the core body having the same sizes in the center part of the core body (a part of the resin-formed body) and the outer diameter of the end part thereof, no resin leakage occurred at the rod portion of the resin roller, and good products may be obtained cheaply and stably.

EMBODIMENT 5

Figure 31:
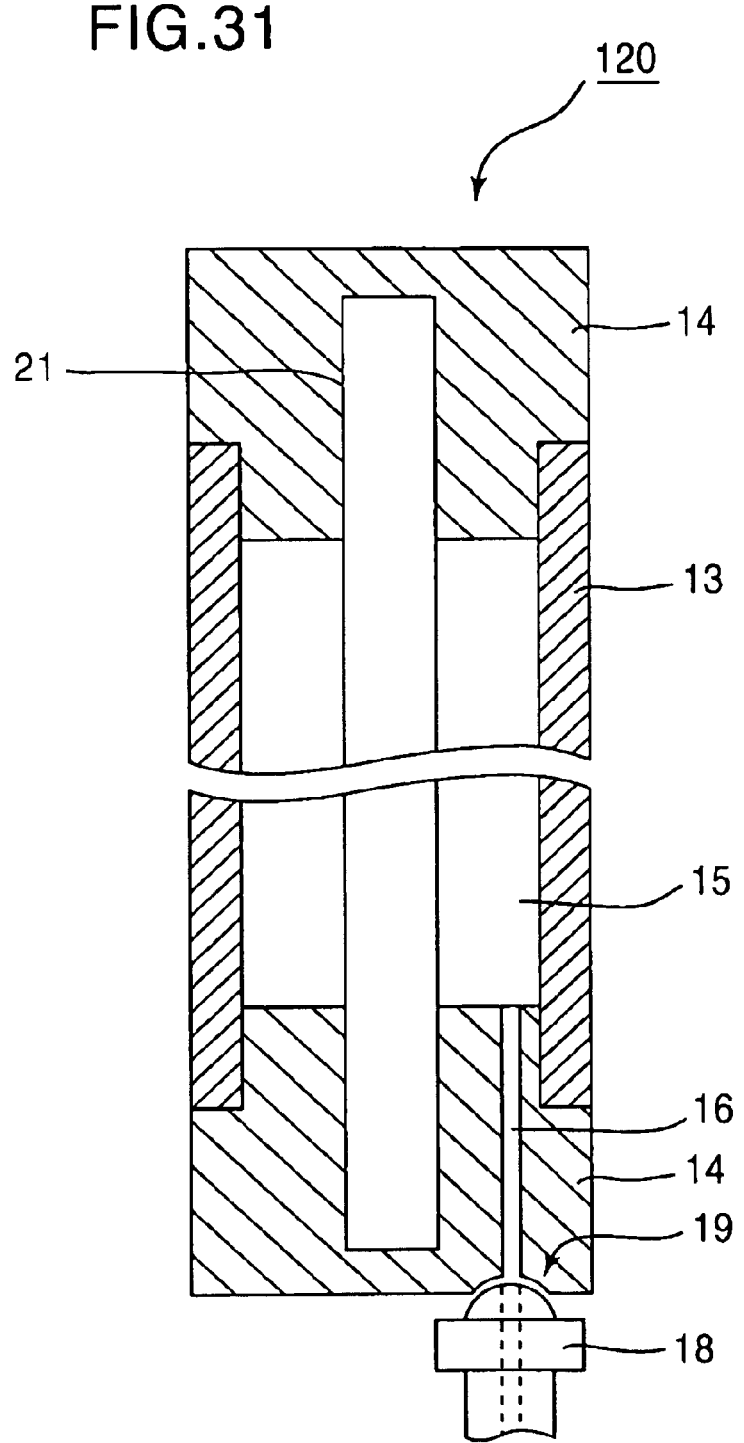
FIG. 31 is a cross sectional view showing a resin pouring state into a forming metal mold.

The resin roller 10a may be produced by use of the same metal mold 120 as having explained with the prior example show in FIG. 31.

In the metal mold 120, the core body 21 is in advance placed and the thermosetting liquid resin is poured into the roller forming space 15 through the resin injecting inlet 16 from the resin injecting nozzle 18.

After completion of filling the resin in the metal mold 120, the whole of the metal mold 120 is heated to hot-set the resin charged in the roller forming space 15. Hot-setting the resin, the core supporting members 14, 14 are removed upward and downward respectively along an axial direction from the cylindrical metal mold 13. Subsequently, the core body 21 is extruded from the cylindrical metal mold 13 to take out a formed product 10b (roller main body) held within the cylindrical metal mold 13. The roller main body 10b is formed by providing the cylindrical resin layer 12a around the core body 21.

As the roller forming resin material usable to the inventive forming method, a known thermosetting liquid resin is used. For example, polyurethane, ethylene.propylene.diene.methylene copolymer (EPDM) or silicone may be used, and it is more preferable to use the thermosetting liquid resin material mixed with polysiloxane based hardening agent.

The thermosetting liquid resin may be added with various kinds of additives as needed. For example, if adding the resistance controlling agent as carbon, the electric resistance of the roller can be controlled.

The thermosetting liquid resin is added, if necessary, with materials for adjusting thermosetting reaction such as hardening agent, hardening accelerator, hardening retardant or others. Or, organic or inorganic fillers may be added. Further, some kinds of organic or inorganic pigments, thickener or mold releasing agent.

Figure 32:
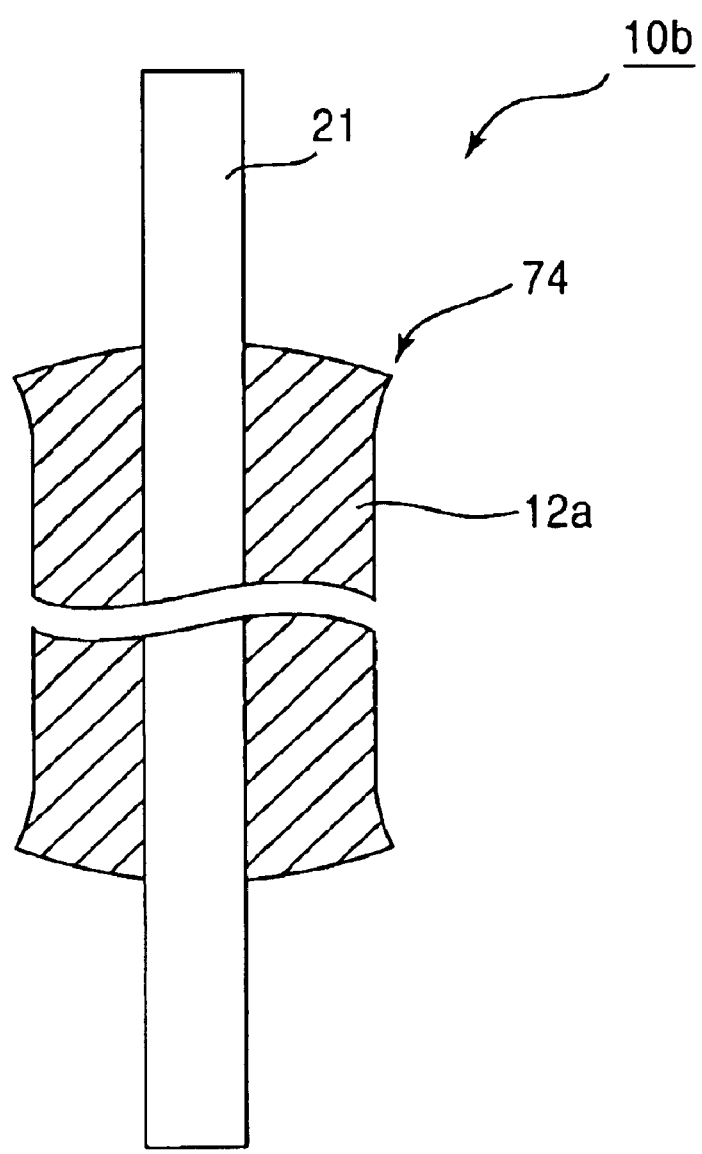
FIG. 32 is a cross sectional view of one example of a roller main body formed by the forming metal mold.

The roller main body 10b produced by the above mentioned forming method has the resin layer 12a swelling parts as seen in FIG. 32 when releasing from the mold. A mechanism of the swelling phenomenon at the edge is explained that the swelling is generated by thermal expansion and shrinkage owing to temperature difference between temperatures at pouring the resin into the metal mold and after releasing from the mold, the amount of shrinkage in the axial direction of the resin layer 12a is larger than that in the peripheral direction, and the resin layer 12a is adhered to the core body 21.

Figure 33:
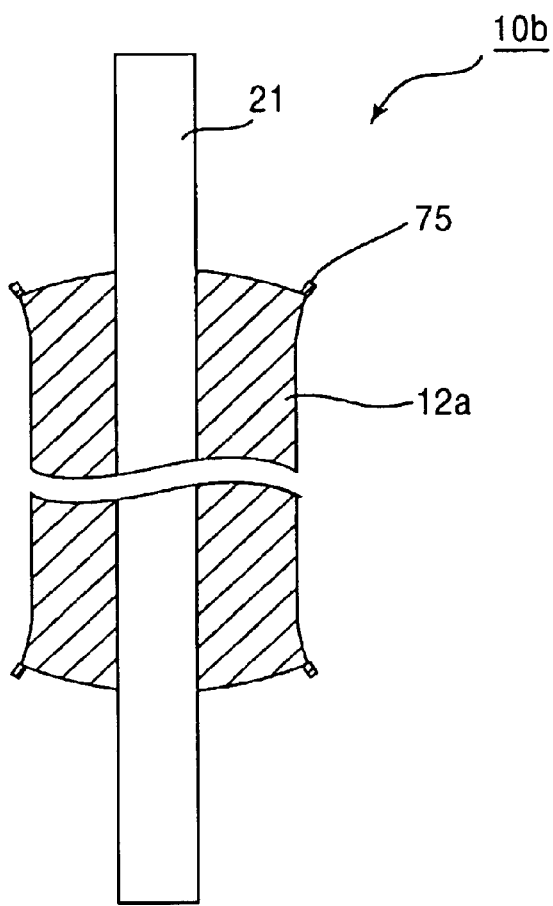
FIG. 33 is a cross sectional view of another example of a roller main body formed by the forming metal mold.
Figure 34:
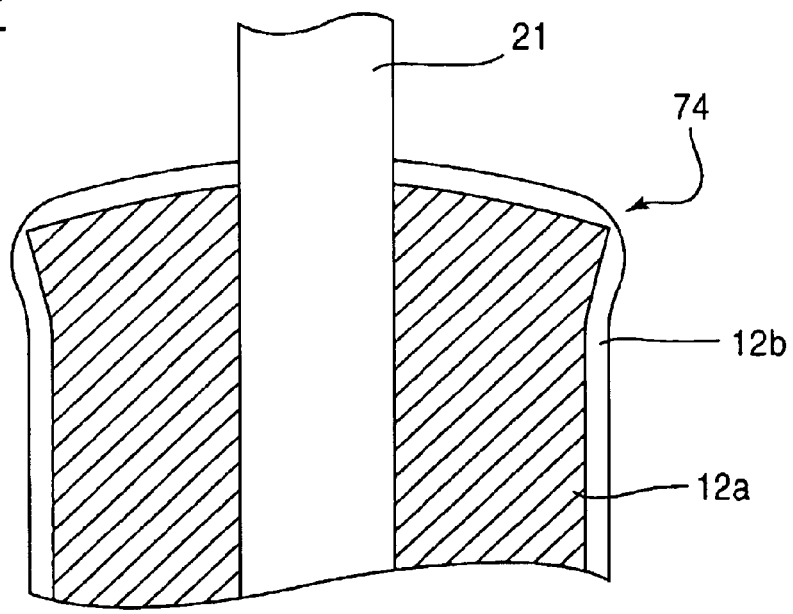
FIG. 34 is a cross sectional view of edge corners of a resin layer and the surface layer of the prior art.
Figure 35:
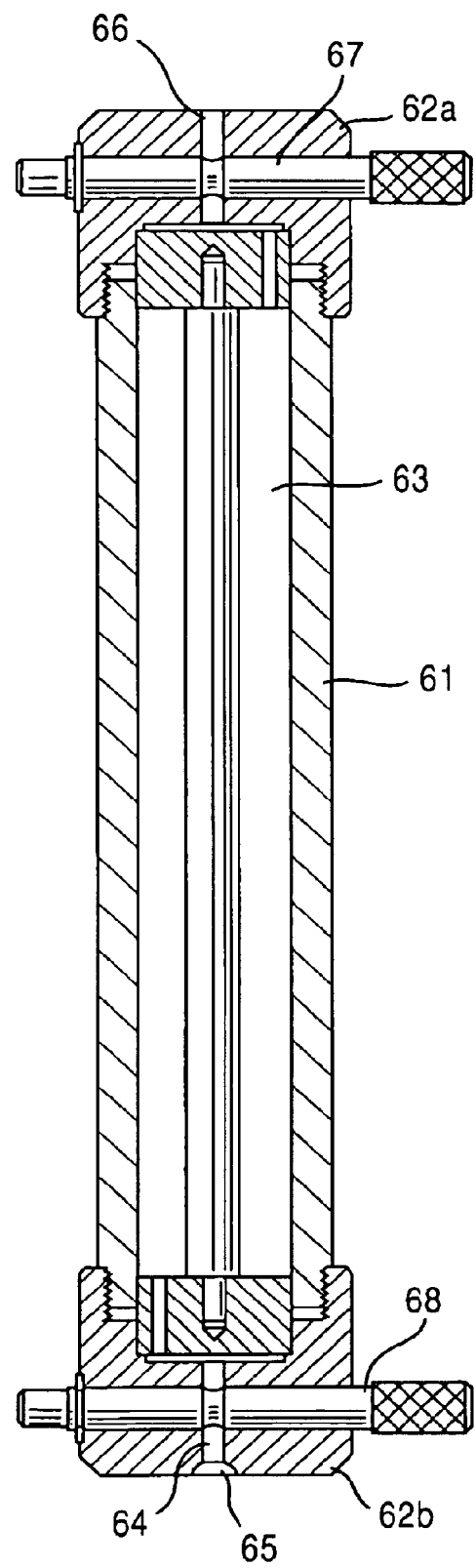
FIG. 35 is a cross sectional view showing the prior art roller producing apparatus.
Figure 36:
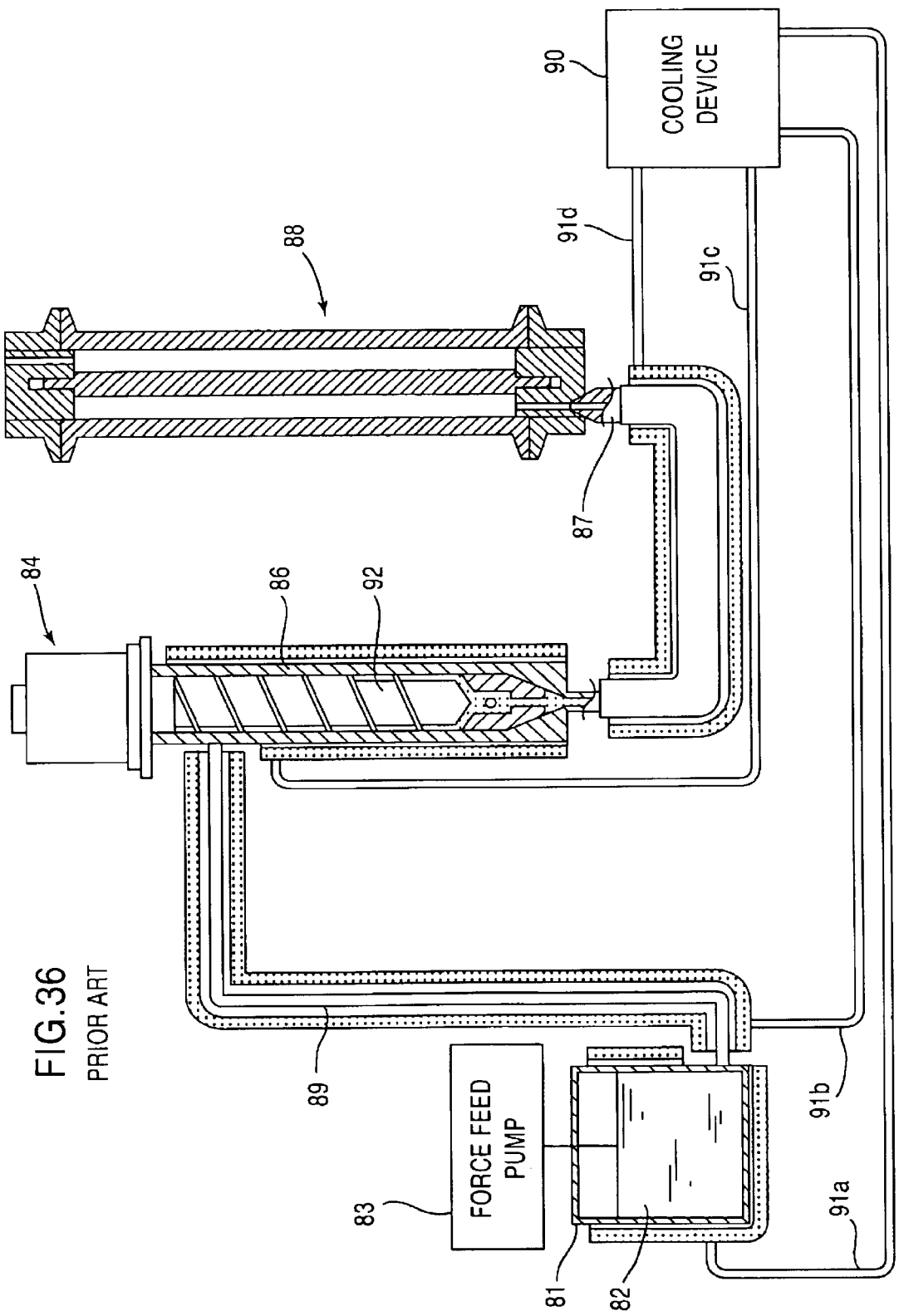
FIG. 36 is a schematic view showing the apparatus structure for explaining the prior art roller producing apparatus.
Figure 37:
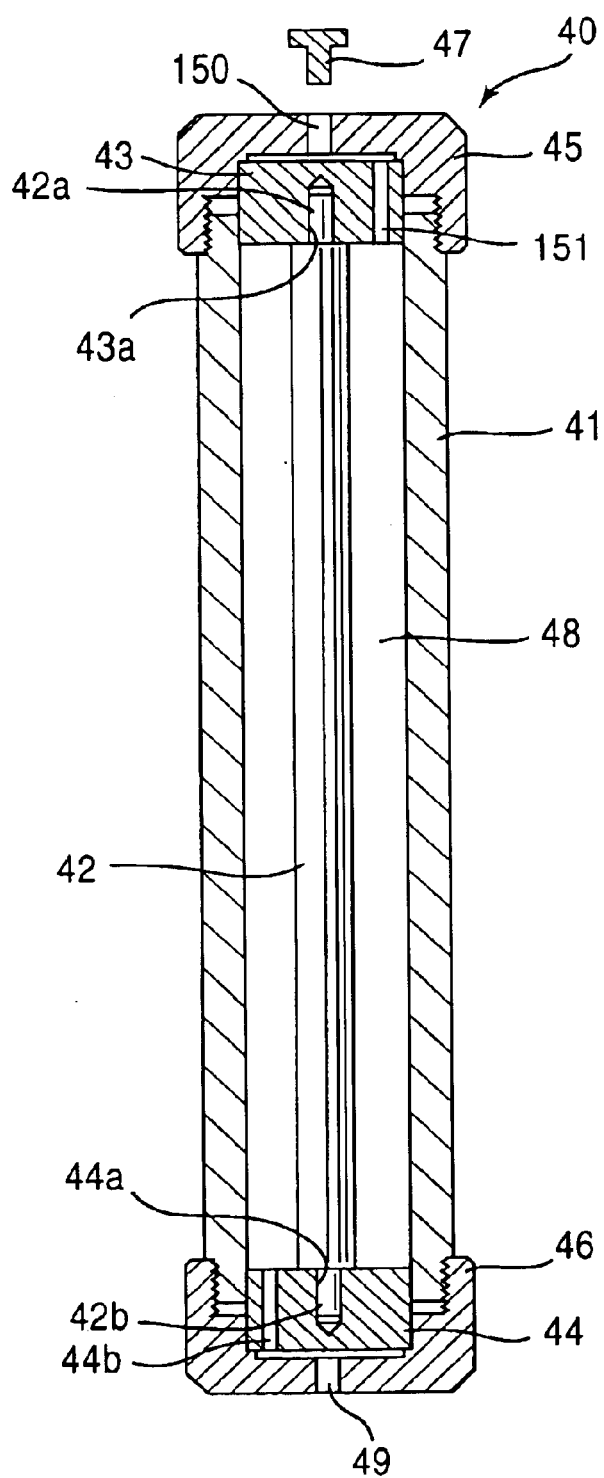
FIG. 37 is a schematically cross sectional view showing another example of the conventional injection forming apparatus.
Figure 38A:
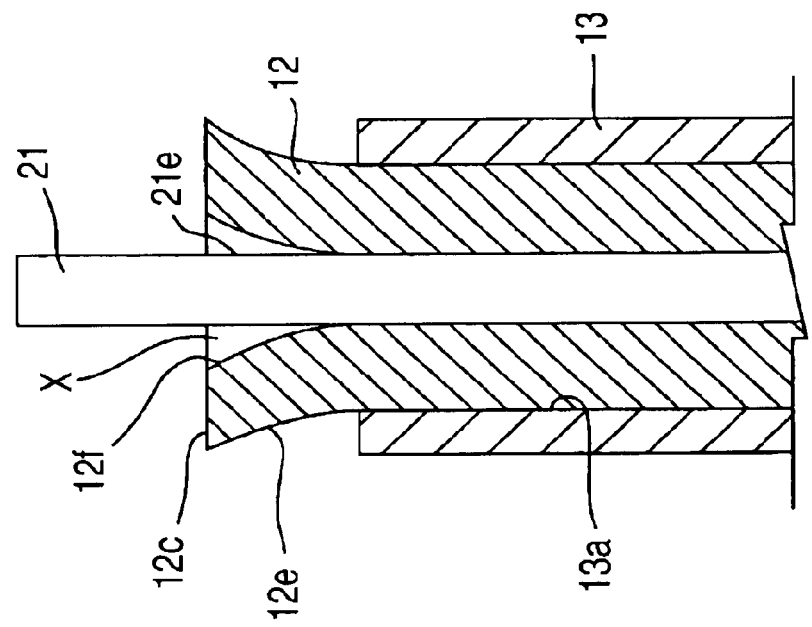
FIG. 38 is cross sectional views showing separating states of the resin body and the core when releasing the formed body from the mold in the resin roller formed body and the forming metal mold in the prior art.
Figure 38B:
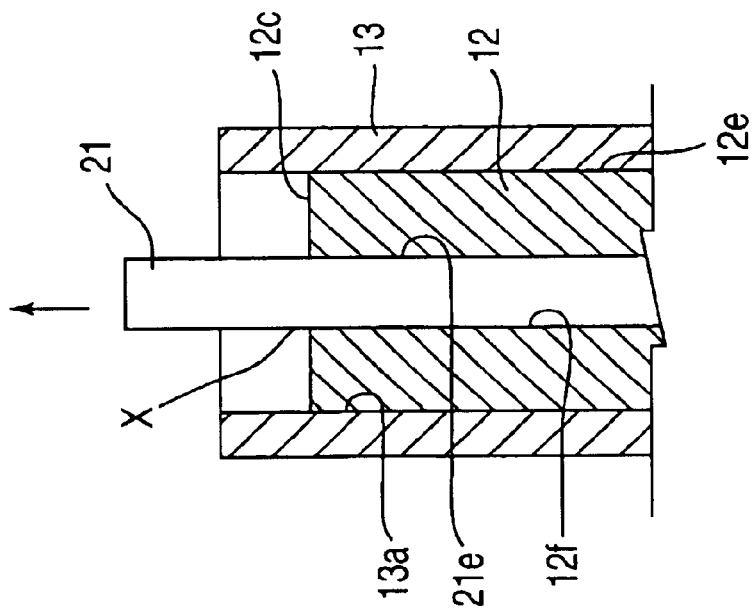

The cylindrical metal mold 13 and the core supporting members 14, 14 have tolerances of respective parts and assembling spaces, and so-called parting lines occur. If the spaces become large owing to such as abrasion in the respective parts when setting up the metal mold, the resin flows into the spaces and burrs 75 are created as shown in FIG. 33.

Corners 74 swelling in the roller main body by dimensional shrinkage or burrs are processed to round by the chamfering.

Figure 7:
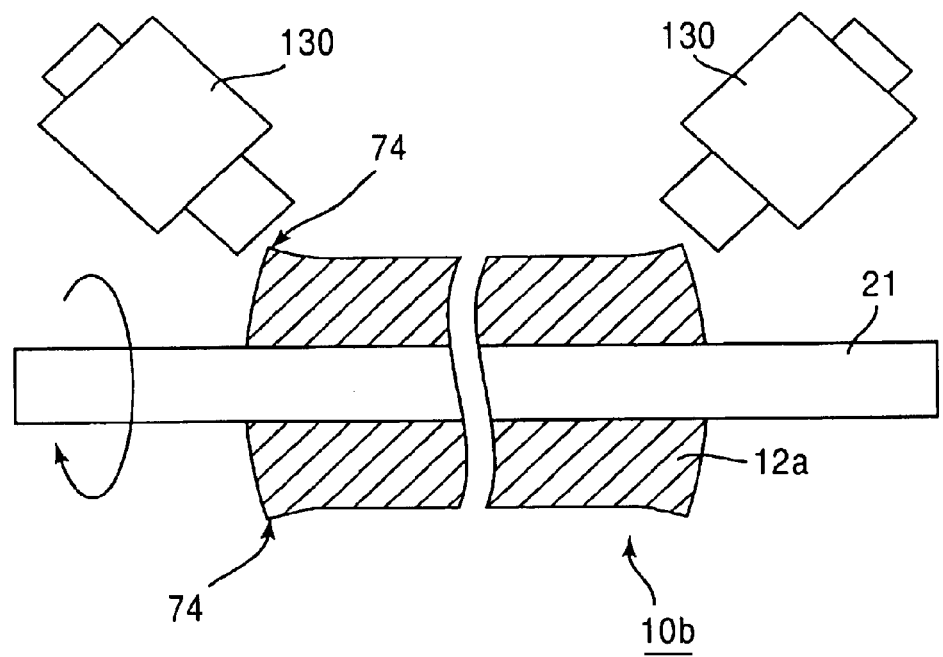
FIG. 7 is a view showing one example of chamfering swelling corners in edge parts of the resin layer in a yet still embodiment.
Figure 8:
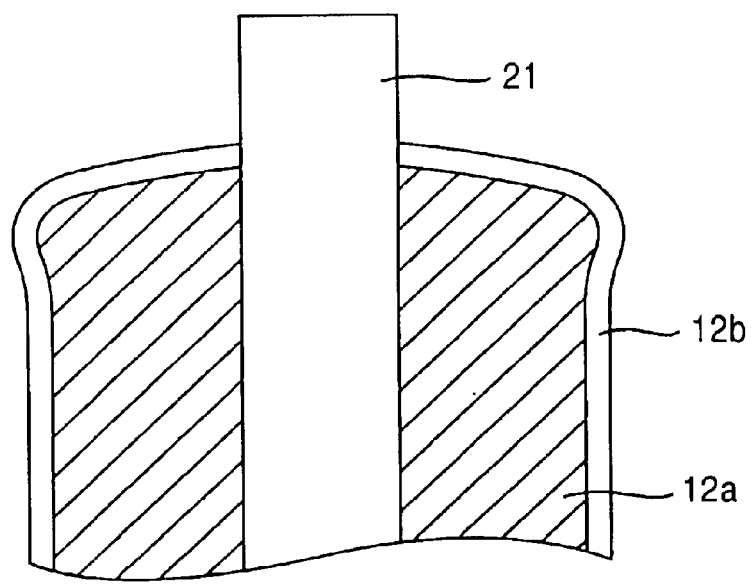
FIG. 8 is cross sectional views of the resin layer and the surface layer in this embodiment.

As to the process of the edges or corners, the machining or polishing processes by known cutting edges or grinding stones, and it is more preferable that previously heated metal-made heating members 130 are, as shown in FIG. 7, contacted or approached to the corners 74 at the edges of the roller main body 10b, and either of the heating member 130 or the roller main body 10a is rotated to thermally decompose and remove parts of the resin layer 12a, otherwise a hot blast or a laser heating thermally decompose and remove parts of the resin layer 12a.

The surface temperature of the heating member 130 is set to be higher than thermally decomposing temperatures of selected resins, and in case the resin layer 12a is formed with the thermosetting liquid resin mixed with polysiloxane based hardening agent in poly urethane or terminal allylated polyoxypropylene based polymer, it is preferable that the surface temperature of the heating member 130 is set to be 200° C. or higher, in case the resin layer 12a is formed with EPDM, 250° C. or higher is preferable, and in case of silicone, 350° C. or higher is preferable. For shortening the treating time, the above mentioned respective temperatures should be desirably heightened around 50° C. higher than said temperatures.

As to the process of the corner 74 at the edge of the resin layer 12a, such a method may be also adopted which coats a solvent to parts to be processed at the edge of the resin layer 12a for dissolve to remove parts of the resin layer 12a.

Practically, preferable is a method that a solvent enabling to dissolve the selected resin material is caused to soak into the resin layer 12a of the roller main body 10b, and either of the cloth, felt or the roller main body 10b is rotated to contact the corner 74 at the edge of the resin layer 12a and dissolve to remove the resin.

As to selection of solvents, in case the resin layer 12a is formed with the thermosetting liquid resin mixed with polysiloxane based hardening agent in poly urethane or terminal allylated polyoxypropylene based polymer, available are keton based solvent (for example, acetone, MEK) or hydrocarbon solvent (for example, toluene, xylene) or ether based solvent (for example, diethyl ether), if the resin layer 12a is formed with EPDM, hydrocarbon solvent (for example, toluene, xylene) is usable, and if the resin layer 12a is formed with silicone, acid or alkaline (for example, hydrochloric acid, caustic soda) may be used. Using these solvents, the corner 74 at the edge of the resin layer 12a can be dissolved to remove.

Shapes of processed corner 74 at the edge of the resin layer 12a are desirably chamfered or circular-arc processed (rounding process). It is preferable that the processed dimensions in both of the axial and diameter directions are larger 1 to 40 times of a swelling amount of the edge part having a larger diameter than the center part of the formed roller main body 10b. Herein, the swelling amount of the edge part is meant by a dimension until the opposite face of the swelling part of the edge parts on the basis of the extending face of the center position of the resin layer 12a of the roller main body. For example, if the swelling amount is 100µ, it is sufficient that the edge part of the resin layer 12a is 100 µm to 4 mm chamfered or circular-arc processed from the edge face of the resin layer 12a in the axial direction and is 100 µm to 4 mm chamfered or circular-arc processed from the reference face in the diameter direction.

If the processed dimension of the corner 74 at the edge part of the resin layer 12a is smaller than the above mentioned ranges, an effect of contributing to a long life of the surface layer 12b is small, and if exceeding said ranges, the length in the axial direction necessary to developing of the resin roller is short, and consequently, the length of the resin roller 10a in the axial direction should be large, and in turn an apparatus is large scaled.

In a case of the resin layer 12a having the low rubber hardness, if contacting to the cutting edge or the grinding stone in the machining or polishing processes, the surface of the resin layer 12a becomes concave or chatter appears in the surface, and the surface is difficult to be machined or polished.

Thus, in case such a method is selected that the corner 74 is heated by chamfering or rounding to thermally dissolve the resin from the corner 74, or the solvent is coated to the corner 74 to dissolve the resin therefrom, if using the thermosetting liquid resin of the formed rubber hardness being 25° or lower (JIS-A), the process is effective and desirable.

After releasing the roller main body 10b having the core body 21 and the resin layer 12a from the metal mold 120, and chamfering or rounding the corner 74 swelling larger in the diameter than the center part of the resin layer 12a of the roller main body 10b by shrinking of the dimension or occurrence of burrs, the surface layer 12b is coated and hardened around the resin layer 12a of the roller main body 10b.

No especial limitation is made to materials forming the surface layer 12b, but from viewpoint of causing the developing agent to well minus-charge, nylon based (polyamide group) or polyurethane based materials are preferable, and fluoro rubber is desirable from viewpoint of causing the developing agent to well plus-charge.

No especial limitation is also made to coating methods of the surface layer 12b, and ordinary are a method of covering a tube on the surface layer 12b by the thermal shrinkage, or a method of applying the solution enabling to form the surface layer 12b by means of dipping, spraying or coater in response to viscosity and drying it.

Indefinite examples of the invention will be explained.

Example B-1

As the thermosetting liquid resin material, a resin raw material was used where polysiloxane based hardening agent and the conductivity giving agent (carbon black) were mixed in terminal allylated polyoxypropylene based polymer shown in Table 1.

This resin raw material was used to form a roller min body 10b of an outer diameter being ϕ 16 mm and a length of a resin layer 12a being 250 mm in the liquid resin injecting and pouring machine by use of the metal mold 120 shown in FIG. 31.

A viscosity of the mixed and poured resin was 600 poises, and a pouring pressure was 2 MPa. The diameter of the resin injecting inlet provided in the core supporting member 14 of the metal mold 120 was 1.5 mm, and the metal mold 120 was directed, standing vertically in the lengthwise direction, and the mixed resin material was poured into the metal mold from the lower portion.

The metal mold 120 was arranged within the heating oven provided with the heating fans and was heated by setting the atmospheric temperature within the heating oven to be 140° C. for 20 minutes, and releasing from the metal mold 120, a formed product (roller main body) was obtained.

As a result, it was observed that the corner 74 at the edge part of the resin layer 12a of the roller main body 10b swelled 100µ in comparison with the outer diameter of the center part of the resin layer 12a.

The roller main body was attached at both end shafts to a rotary machining disc, and soldering irons (30 w) heated at around 300° C. were contacted to the corners 74 for 5 minutes, and the roller main body was rotated to fuse and remove the resin of the corner.

As a result, the roller main body was obtained, which was smoothly rounded 1 mm from the edge part in the axial direction and 1 mm from the surface in the diameter direction.

The solid content of the mixture shown in Table 2 was diluted to 5% with a mixed solvent of DMK (N,N-dimethyl formamide): MEK (methyl ethyl ketone)=1:1 (weight ratio), and was still left for one hour to make a solution, and the resin for forming the surface layer was carried out dipping around the resin layer of the roller main body and dried to form the surface layer.

The thus obtained resin roller was installed to contact φ 30 mm sensitive drum at a 2 mm width, and when the resin roller was continuously rotated at rotation number of 240 rpm to perform an endurance test, the surface layer did not peel until 16 hours.

Comparative Example B-1

The roller main body formed in Example B-1 was not chamfered nor rounded at the corners, the surface layer of which was coated and dried similarly to the above procedure, and the resin roller was obtained.

The obtained resin roller was subjected to the endurance test under the same conditions as above, and after 3.5 hours the surface layer of the corner started to peel, and after 4 hours of the test, the peeling of the surface layer spread toward the center part from the edge parts.

TABLE 2

| Components of the composition of the surface layer | Wt. parts |
|---|---|
| Polycarbonate urethane | 100 |
| Acrylic fine particles | 30 |

According to the invention, the resin layer is formed by pouring the thermosetting liquid resin into the forming metal mold and hot-setting it, and the resin layer is chamfered or rounded at the corners of the edge parts, followed by forming the surface layer on the surface of the resin layer, and therefore, the film of the surface layer can be made a desired thickness over the full face of the roller, and the surface layer is restrained from exfoliation or abrasion from the resin layer, so that the durability of the resin roller is increased, and consequently, the inventive resin roller can be served for a long period of time without exchanging many kinds of rollers employed in electrophotographic system such as laser printers, copiers, facsimile devices using the resin rollers.

EMBODIMENT 6

Figure 9:
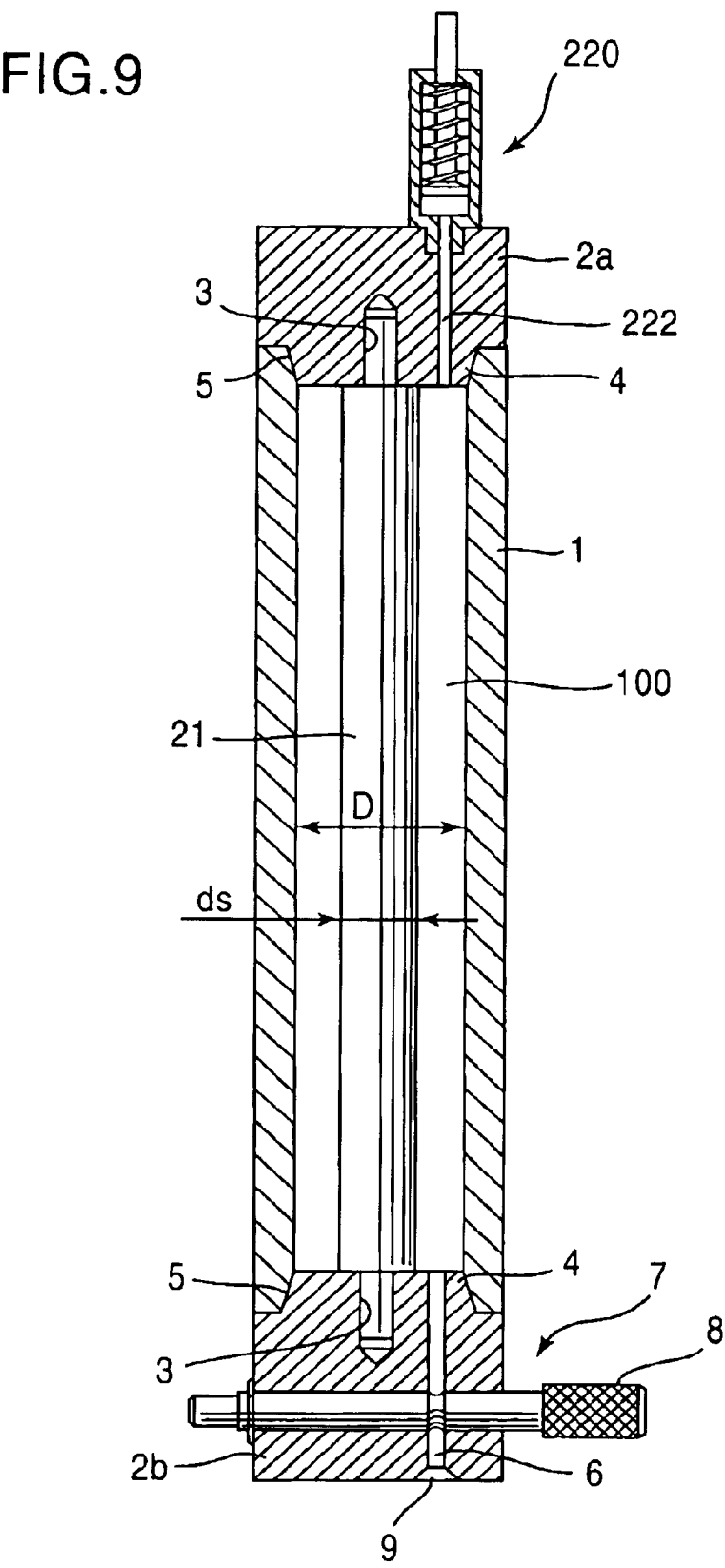
FIG. 9 is a cross sectional view showing an apparatus of producing the roller in another embodiment.

The roller producing apparatus is, as shown in FIG. 9, mainly composed of the cylindrical metal mold 1 and the upper and lower core supporting members 2a, 2b, and the upper core supporting member 2a is equipped with a mold inner pressure adjusting mechanism 220 for adjusting the inner pressure of the metal mold.

The cylindrical metal mold 1 is inserted with the core body 21, and the core body 21 is inserted at both ends in axis receiving holes 3 formed in the core supporting member 2a, 2b fitted in both upper and lower opening parts of the cylindrical metal mold 1, whereby the core body 21 is supported at the center position of the cylindrical metal mold 1.

The cylindrical metal mold 1 is shaped in seamless pipe, and the inside face is preferably performed with fluorine resin coating or electroless plating from the viewpoint of releasing from the mold.

On the other hand, the upper and lower core supporting members 2a, 2b are defined with convex parts 4 for fitting inward the cylindrical metal mold 1 to form a concave-convex fitting with the cylindrical metal mold 1, a so-called faucet structure. The outer peripheral faces 5 of the core supporting members 2a, 2b for fitting the inner peripheral face of the cylindrical metal mold 1 may be tapered. By being tapered, the core supporting members 2a, 2b are easily detachably attached to the cylindrical metal mold 1, and the axis receiving holes 3 can be securely positioned at the center position in the axial direction of the cylindrical metal mold 1.

Preferably, the cylindrical metal mold 1 and the outer diameters of the core supporting members 2a, 2b have the same size. The core supporting members 2a, 2b and the cylindrical metal mold 1 may be tightened by screwing or clamping, though not shown.

The lower core supporting member 2b is provided with a pouring hole 6 for pouring the liquid resin, and for this hole, a closure mechanism 7 is provided to check counterflow of an expanded resin in the metal mold at hot-setting. The exemplified closure mechanism 7 is crossed in the pouring hole 6 with a pin B having a reduced diameter part on the way in the lengthwise direction, and by moving the pin 8 back and forth, a releasing condition of positioning the reduced diameter part in the pouring hole 6 is switched with another closing condition. In addition, the pouring hole 6 communicates with a nozzle touch part 9 formed by recessing in semi-sphere in the lower face of the core supporting member 2b, and if pressing the pouring hole 6 to a nozzle (not shown) having a front end of the semi-sphere corresponding to the nozzle touch part 9, an excellent sealing performance is displayed and the liquid resin can be supplied without leakage.

Figure 10:
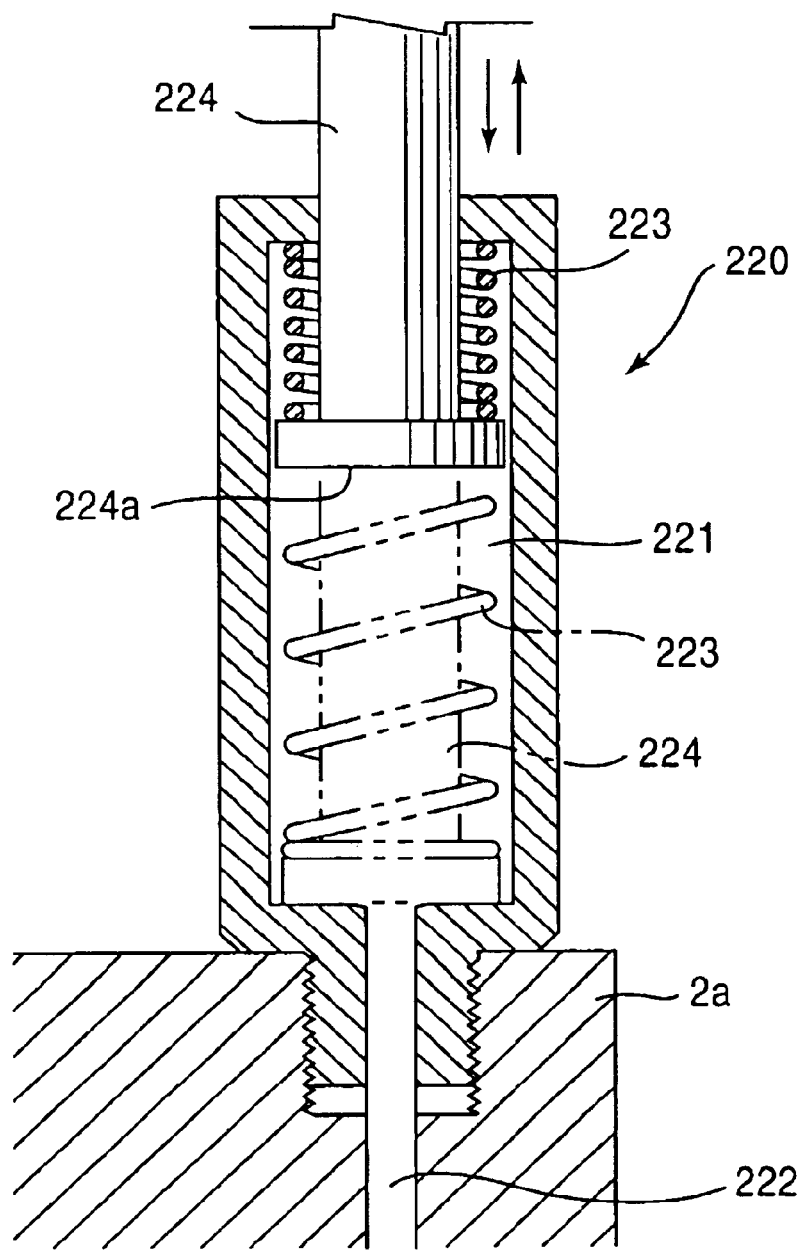
FIG. 10 is an enlarged cross sectional view of an inner pressure adjusting mechanism of this embodiment.

FIG. 10 shows in detail the mold inner pressure adjusting mechanism 220 provided in the upper core supporting member 2a for adjusting inner pressure of the roller forming space 10.

The mold inner pressure adjusting mechanism 220 as shown in FIG. 10 has a spare room 221 of variable volume whose inner space communicates with the roller forming space 100 via a narrow hole 222.

The volume in the spare room 221 is varied to adjust the inner pressure in the roller forming space 100, and the adjustment is carried out, aiming at maintenance of constant values of the inner pressure as passing a time of hot-setting, so as not to exceed the inner pressure when hot-setting the thermosetting liquid resin. Structures enabling such adjustment are variously assumed, and a representative one may be exemplified as shown in that the spare room 221 is provided inside with a plunger vertically moving under an air tight condition, and the plunger 224 is pressed downward by a spring 223. Preferably, the mold inner pressure adjusting mechanism 220 is provided at the upper side of the metal mold in relation with attachment.

The mold inner pressure can be adjusted by selecting spring constant of the mold inner pressure adjusting mechanism 220. Practically, when the mold inner pressure is 0 kg/cm$^2$, the volume in the spare room is 0, and as the mold inner pressure rises, the spring mechanism is compressed, and the volume in the spare room increases by the amount of compression. A state of the mold inner pressure being 0 kg/cm² means such a state that the liquid resin is not fully charged in the roller forming space 100, and under this state, the liquid resin does not go into the spare room 221, and an edge face 224 of the plunger is placed at the undermost part as shown with an two-dotted imaginary line, and the volume of the spare room 221 is 0. By the way, there is furnished an instrument for discharging an air compressed in company with the resin pouring into the roller forming space 100, though not shown.

When completing the charge of the liquid resin into the roller forming space 100 and accomplishing fullness of the liquid resin into the roller forming space 100, an operation starts to hot-set the liquid resin, and when hot-setting, the liquid resin is expanded and flows into the spare room 221 through the narrow hole 222. Preferably, the volume in the spare room when the spring is fully compressed is set to be 5% or more of the roller forming space 100. It is desirable to set the spring constant such that the mold inner pressure is 100 kg/cm² or lower when the spring mechanism is fully compressed, and more desirable is to set 60 kg/cm² or lower. If the mold inner pressure exceeds 100 kg/cm² when hot-setting, the resin leaks into the parting line between the cylindrical metal mold 1 and the core supporting members 2a, 2b to generate burrs. The diameter of the narrow hole 222 communicating the roller forming space 100 with the spare room 221 is desirably set to be φ 1 mm to φ 3 mm for cleaning easiness. The outer diameter d of the roller is practically expressed with the following formula, though depending on the amount of the resin flowing into the spare room 221.

$$d = (4 \times (V - V1)/(\pi \times L))^{1/2}$$

herein;
V: Volume of the forming space
V1: Amount of the resin flowing into the spare room
L: Length of the part of the roller elastic layer.

An inventor has found that if the outer diameter of the roller is expressed by introducing an parameter of an cross sectional shrinkage percentage α, the inner pressure at hot-setting can be evaluated in relation with the cross sectional shrinkage percentage α, and values of the cross sectional shrinkage percentage α when easily releasing from the mold and creating no burr, fall within an almost fixed range even if the roller sizes or thickness of the elastic layer are different, and if the inner pressure when hot-setting is fixed, this α is also fixed accordingly. The cross sectional shrinkage percentage α is expressed with the under formula.

$$\alpha = (D^2 - d^2)/(D^2 - d_s^2)$$

herein, the symbols mean as follows.
D: Inner diameter
d: Outer diameter of the roller
ds: Outer diameter of the core body (Core diameter).

As a result of study, it was found that the cross sectional shrinkage percentage a of easily releasing from the mold by a bit cooling and creating no burr is 0.02 to 0.06. The outer diameter d of the roller is a value when measuring at a room temperature.

If the cross sectional shrinkage percentage a is smaller than 0.02, the releasing from the mold is easily inferior and burrs are outstanding on the circumference of the elastic layer. On the other hand, if the cross sectional shrinkage percentage a is larger than 0.06, voids easily occur inside and on the surface of the elastic layer, and variations of the outer diameter are easy to grow in the axial direction.

Further, it has been found that the mold inner pressure at hot-setting for a to fall in the range of 0.02 to 0.06 is 100 kg/cm² or lower.

As the value of the preferable cross sectional shrinkage percentage a is apparent, it is possible to design the metal mold for obtaining rollers of easily releasing from the mold without creating burrs. For example, when the inner diameter D of the cylindrical metal mold is φ16 mm and the core diameter is φ10 mm, the outer diameter d of the cross sectional shrinkage percentage a being 0.02 is φ15.90 mm. Further, the outer diameter d of the cross sectional shrinkage percentage α being 0.06 is φ15.70 mm. In short, the roller outer diameter for good forming ranges φ15.70 mm to φ15.90 mm.

The invention has been explained, referring to one embodiment, and of course, the invention may be applied to another apparatus of a structure which holds the roller forming space between both ends of the cylindrical metal mold inserted inside with the core body for disposing the core supporting members.

Explanation will be made to experiments carried out for confirming effects of the invention.

Example C-1

The roller producing apparatus shown in FIG. 9 was used. The cylindrical metal mold was treated on the inside with the electroless plating and the inner diameter was φ 16.00 mm. The outer diameter of the core body was φ 10 mm, a maximum volume of the spare room was 1.6 ml, and the spring mechanism was absent (corresponding to the spring constant 0). The thermosetting liquid resin (silicone group) was poured at 20° C. from the lower pouring hole, and after filling the resin in the forming space, the closure mechanism was closed. At that time, the mold inner pressure adjusting mechanism was checked with a stopper not to move together with increasing of the mold inner pressure at pouring. When completing the pouring, the mold inner pressure was 0. Subsequently, the resin was hot-set 140° C.×20 min in a hot blast oven, cooled and released from the mold. Thus, the elastic rollers were produced. The rollers were evaluated. Testing number were 10 pieces, average outer diameters of the rollers were φ 15.77 mm and variations of the outer diameter was 15 μm. Results were as follows. The evaluations of the resin leakage were performed by evaluating the burr occurrence in the parting line being the fitting part between the cylindrical metal mold and the upper and lower core supporting members and by evaluating the resin leakage from the closure mechanism part provided on the way of the pouring hole 6 (called as "lower closure mechanism part"). A method of releasing from the mold was to secure the cylindrical metal mold under a condition of taking off the upper and lower core supporting members, and push the shaft of the formed body at the front end thereof by the rod, and the pushing load at that time was measured by a load cell. Results were as follows.

Mold releasing load: 15 kg (No scratch at releasing)
Burr condition: No at the parting line part
Resin leakage: No at the lower closure mechanism part
Roller average outer diameter: φ 15.77 mm
Variation of the outer diameter: 15 μm

Example C-2

The spring mechanism was set such that the maximum value of the mold inner pressure was 60 kg/cm². The shape of the spare room was φ 10 mm×maximum length of 20 mm, and the spring mechanism had the spring constant of (π/4)× 12×60=47 kg/20 mm. Other conditions were the same as those of Example C-1. Results were as follows.

Mold releasing load: 15 kg (No scratch at releasing)
Burr condition: No at the parting line part
Resin leakage: No at the lower closure mechanism part
Roller average outer diameter: ϕ 15.84 mm
Variation of the outer diameter: 20 μm Example C-3

The spring mechanism was set such that the maximum value of the mold inner pressure was 100 kg/cm². Other conditions were the same as those of Examples C-1 and C-2. Results were as follows.
Mold releasing load: 40 kg (No scratch at releasing)
Burr condition: No at the parting line part
Resin leakage: No at the lower closure mechanism part
Roller average outer diameter: ϕ 15.88 mm
Variation of the outer diameter: 18 μm Comparative Example C-1

The spring mechanism was set such that the maximum value of the mold inner pressure was 150 kg/cm². Other conditions were the same as those of Examples C-1 and C-2. Results were as follows.
Mold releasing load: 100 kg (Rubbed scratch on surface)
Burr condition: Present at the parting line part
Resin leakage: Present at the lower closure mechanism part
Roller average outer diameter: ϕ 5.93 mm
Variation of the outer diameter: 18 μm Comparative Example C-2

The inner pressure adjusting mechanism provided at the upper core supporting member was taken off, and the resin was hot-set under the condition of opening the narrow hole communicating the spare room with the roller forming space. Other conditions were the same as those of the above Examples. Results were as follows.
Mold releasing load: 18 kg (Rubbed scratch on surface)
Burr condition: Present at the parting line part
Resin leakage: Present at the lower closure mechanism part
External appearance: Void occurring
Roller average outer diameter: 015.68 mm
Variation of the outer diameter: 50 μm Comparative Example C-3

The inner pressure adjusting mechanism provided at the upper core supporting member was taken off, and the resin was hot-set under the condition of plug-stopping the narrow hole communicating the spare room with the roller forming space. Other conditions were the same as those of the above Examples. Results were as follows.
Mold releasing load: 140 kg (Rubbed scratch on surface)
Burr condition: Present at the parting line part
Resin leakage: Present at the lower closure mechanism part
Roller average outer diameter: ϕ 15.96 mm
Variation of the outer diameter: 18 μm Example C-4

The roller of the center diameter of the core body being ϕ 12 mm was used. Other conditions were the same as those of Example C-2. Results were as follows.
Mold releasing load: 40 kg (No scratch)
Burr condition: No at the parting line part
Resin leakage: No at the lower closure mechanism part
Roller average outer diameter: ϕ 15.00 mm
Variation of the outer diameter: 18 μm Comparative Example C-4

The roller of the center diameter of the core body being ϕ 12 mm was used. Other conditions were the same as those of Example C-2. Results were as follows.
Mold releasing load: 100 kg (Rubbed scratch)
Burr condition: No at the parting line part
Resin leakage: No at the lower closure mechanism part
Roller average outer diameter: ϕ 15.00 mm
Variation of the outer diameter: 14 μm From the above mentioned results, the following is seen.

If adjusting the mold inner pressure to be 100 kg/cm² or lower, it is possible to avoid almost perfectly the burr occurrence at the parting line part or the resin leakage from the lower closure mechanism part. The product can be released from the mold at low load without causing scratches at releasing.

On the other hand, if the mold inner pressure exceeds 100 kg/cm², burrs occur and the resin leaks from the lower closure mechanism part. Besides, the mold releasing load is large, and badness appears by releasing the mold as scratches remain. This face is applicable to even if the elastic layers are different in thickness, and it has been found that if the elastic layer is smaller than 1 mm, the mold releasing load is large, even if the mold inner pressure is lower than 100 kg/cm², and scratches at releasing the mold remain. From these occasions, for carrying out the roll formation of easily releasing from the mold without creating scratches and burrs, it has been confirmed that the mold inner pressure at hot-setting is adjusted to be 100 kg/cm² or lower, and the inner diameter D and the outer diameter d of the cylindrical metal mold are selected such that the thickness of the elastic layer is 1 mm or more.

In the invention equipping the core supporting member with the mold inner pressure adjusting mechanism, as the mold inner pressure at hot-setting can be adjusted, various defects caused by excessive inner pressure can be prevented. In particular, if hot-setting by adjusting the mold inner pressure to be 100 kg/cm² or lower, the resin leakage can be avoided at the parting line part between the cylindrical metal mold and the core supporting member or the lower closure mechanism part, and products without burrs, so that it is possible to largely reduce a secondary process as the burr removal or the adhered resin removal from the mold after producing rollers. Further, since products can be released from the metal mold at low load, it is not necessary to coat the mold releasing agent to the inside the cylindrical metal mold, and no scratches occur by releasing from the mold. Besides, as the mold inner pressure is 100 kg/cm² or lower, pressure proof required to the metal mold may be low, and such a metal mold having thin thickness and weight light structure can be used, and a cooling for a long time is not necessary for heightening the property of releasing from the mold, so that productivity is increased.

EMBODIMENT 7

FIG. 11 is a schematically structured view for explaining the roller producing method using the thermosetting liquid resin and the producing apparatus of the invention. The exemplified roller producing apparatus 101 is equipped with a container 102A storing the thermosetting liquid resin containing a catalyst (called as "A liquid" hereafter), a container 102B storing the thermosetting liquid resin containing a cross linking agent (called as "B liquid" hereafter), an injecting device 103 having a measuring mechanism for measuring these thermosetting liquid resins, a mixing mechanism 104 for mixing both thermosetting liquid resins, a roller forming metal mold filled with the mixed resin into an inside forming space 106a via a resin injecting 105, and transferring pipes 107A, 107B connecting between the containers and devices for passing the liquid resin. Herein, the respective liquid resins in the containers 102A, 102B are added with a conductivity giving agent, and the containers 102A, 102B are furnished with force feed pumps 108A, 108B for forcing to feed the respective liquid resins to the transferring pipes 107A, 107B. The injecting device 103 is also equipped with temperature adjusting means 109A, 109A, . . . 109B, 109B . . . for adjusting the thermosetting liquid resin to be at desired temperatures. There is not provided a cooling mechanism for cooling the liquid resin as the prior art.

Sequence for producing the elastic roller of the invention by means of the above structure of the apparatus will be explained in detail.

At first, as the thermosetting liquid resin, the A liquid added with the catalyst and the conductivity giving agent in a base polymer (main agent) and the B liquid added with the cross linking agent and the conductivity giving agent in a base polymer (main agent) are prepared, measured respectively and stored in the container 102A and the container 102B. For these containers 102A, 102B, pale cans on the market are standardized, cheap, much available, and convenient. The liquid A and the liquid B are de-foamed in vacuum, agitated, mixed and stored. As an agitation de-foaming mechanism, generally the containers 102A, 102B are attached to a turn table and rotated to agitate with agitating vanes while reducing pressure by a vacuum pump.

The thus prepared A liquid and B liquid are forcibly sent to the injection device 103 through the transferring pipes 107A, 107B as a flexible hose, and measured to be desired weight by respective cylinders 111A, 111B. Next, the measured liquid resins in the cylinders go forward through screws 112A, 112B and are jetted, pass through the resin injecting 106b of the metal mold 106 from the injecting nozzle 105 as being mixed by the mixer 104, and are filled into the cavity composing the roller forming space 106a. The mixing mechanism 104 makes no especial limitation if enabling to stand and mix against the jetting pressure of the liquid resin, and ordinarily, either of a dynamic mixer and a static mixer is served. The static mixer has a structure provided with the mixing vanes having a plurality of spirally twisted continuous elements at the inside space of the mixing mechanism, divides a fluid running in the inside space into two parts by means of the mixing vanes, and jets it out. The dynamic mixer has a mixing rotor rotating screws or gears in the inside space of the mixing mechanism, mixes uniformly the fluid running in the inside space by means of the mixing rotor, and jets it out.

In the range from the raw material containers 102A, 102B to the injecting device 103, as the liquid resin is divided in the A liquid and the B liquid, the cross linking reaction does not occur, so that a cooling procedure as the conventional technical knowledge for cooling the thermosetting liquid resin is unnecessary. Both liquids are mixed in the mixing mechanism 104, and since at the same time as mixing, the mixed resin is continuously jetted at high pressure into the forming space 106s of the roller forming metal mold 106, the liquid resin is scarcely adhered and solidified to the inside wall faces of the mixing mechanism 104 or the pouring nozzle 105. That is, the liquid resin in the mixing mechanism 104 is periodically replaced by continuously forming, so that the liquid resin does not stay in the mixing mechanism for a long period of time and is hardly solidified by the cross linking reaction. Thus, the cooling procedure necessary in the prior art is unnecessary, thereby enabling to accomplish a low cost of a facility.

For avoiding the cross linking reaction of the mixed liquid in the range from the mixing mechanism 104 to the pouring nozzle 105, temperatures of the liquid resin at injecting is set to be 20 to 70° C., preferably 20 to 60° C. Therefore, the heaters 109A, 109A, . . . 109B, 109B . . . are arranged around the cylinders 111A, 111B. If heating the liquid resin exceedingly 60° C., the cross linking reaction gradually progresses, the resin component is solidified and accumulated on the wall in the mixing mechanism, and the mixing efficiency goes down and the quality is much probably varied.

In addition, the viscosity of the base polymer of the liquid resin is adjusted, or the liquid resin before pouring is heated by the temperature adjusting means for preferably adjusting the viscosity of the liquid resin at injecting to be 5000 poises or lower. If pouring the liquid resin of the viscosity exceeding 5000 poises, the pressure effecting to the metal mold becomes high and the structure of the metal mold should be thick, and for decreasing said pressure, the pouring time of the liquid resin should be extended, and further at pouring, an air within the cavity is easily involved into the pouring and the number of pouring holes must be increased.

As is seen, in the invention, the liquid resin is not adhered nor solidified to the transferring pipes 107A, 107B, the cylinders 111A, 111B, the mixing mechanism 104 and the pouring nozzle 105, so that the frequency and necessity of dissembling to clean the apparatus are extremely decreased. As the liquid resin of low viscosity can be injected at temperatures near a room temperature, it is not necessary to make the thick structure of the roller forming metal mold 106, and when hot-setting the liquid resin injected to the forming space 106a, the heating load is not increased and the hardening reaction is sufficient with a short time, so that a producing cycle is remarkably heightened. Practically, a main maintenance is enough to only the mixing mechanism, and such merits appear that the frequency and labor therefor are considerably reduced.

Besides, in the invention, being different from the liquid resin of the existing one liquid, there is little risk of increasing viscosity by the cross linking reaction of the liquid resin in the container.

Next, the base polymers to be used to the A liquid and the B liquid are components hardening by making hydrosilyl with the cross linking agent. Specifically, since the base polymer has at least one alkenyl group in molecule, the hydrosilyl reaction occurs and becomes a high molecular condition and is hardened, and a repeating unit composing a main chain is polymer mainly comprising oxy alkylene unit or saturated hydrocarbon unit, for example, a silicone based addition reacting typed liquid resin is a typical example thereof. The number of alkenyl group in the base polymer should be at least one for the hydrosilyl reaction with the cross linking reaction, and from the viewpoint of obtaining good rubber elasticity, in a case of molecule in a straight chain, two alkenyl groups are placed at both terminals of molecule, and in a case of molecule having branches, it is desirable that two or more alkenyl groups are placed at both terminals of molecule.

In a case that the repeating unit composing the main chain is polymer mainly comprising oxy alkylene unit or saturated hydrocarbon unit, if a small amount of the conductivity giving agent is added, volume resistivity of 104 to 1012 Ωcm favorable to the roller is available.

Herein, oxyalkylene based polymer is meant by such polymer containing 30 wt % or more oxyalkylene unit among units composing the main chain, preferably 50 wt % or more, and as a starting material when making polymer for composing a remainder excepting oxyalkylene unit, compound containing two or more of active hydrogen, for example, ethylene glycol, bisphenol based compound, glycerine, trimethylol propane, pentaerythritol are taken up.

On the other hand, if the repeating unit composing the main chain in said base polymers is polymer comprising saturated hydrocarbon unit, it has a low water absorption rate and is preferable for obtaining rollers small in environmental variation of electric resistance. This polymer is also a component of making hydrosilyl reaction with the cross linking agent similarly to the above mentioned oxyalkylene based polymer and becoming hardened, and a component becoming high molecule by causing hydrosilyl reaction owing to alkenyl group existing in molecule and hardened. Actually exemplified are isobutylene based polymer, hydroisobutykene based polymer, or hydrobutadiene. These polymers may contain the repeating units of other components such as copolymer, and it is important for not spoiling the characteristics of obtaining the rollers having a low water absorption rate and being small in environmental variation of electric resistance to contain saturated hydrocarbon unit 50 wt % or more, preferably 70 wt % or more.

The components contained in the cross linking agent are sufficient with compounds having at least two hydrosilyl group in molecule, and if the number of hydrosilyl group contained in molecule is too much, hydrosilyl group easily much remains in hardened substances to cause voids or cracks, and so it is preferable to adjust the number to be 50 or less, more preferably 2 to 30 from the viewpoint of controlling rubber elasticity of the hardened substances and making storing stability favorable. In the invention, having one of hydrosilyl group is meant by having one of H to be combined with Si. Therefore, in a case of $SiH_2$, hydrokysillyl is two, but if H to be combined with Si is combined with different Si, such combination is preferable from viewpoint of hardenability and the rubber elasticity.

The molecular amount of the cross linking agent is preferably adjusted to be 30,000 or less in number average molecular amount (Mn) from the viewpoint of making workability of product rollers good, more preferably 300 to 15,000 in Mn from the viewpoint of reactivity or compatibility with said base polymer.

As to the cross linking agent, considering that cohesive force is larger than that of the cross linking agent, it is important in the compatibility to have modification containing phenyl group, and in an easy availability, styrene modification is suited, and in a storing stability, α-methyl styrene is suited.

The above catalyst is enough if it can be used as a hydro sillyl catalyst, and is not especially limited. As to the using amount of the catalyst, 10-8 to 10-1 mol, further 10-8 to 10-6 mol per 1 mol of the alkenyl group in base polymer (main agent) component are preferable from the viewpoint of avoiding check of hardening by catalyst poisoning and good balancing between appropriate pot life and low cost. As these catalysts, for example, enumerated are platinum simplex, catalyst causing simplex as alumina to carry platinum, chloro platinic acid (including complex as alcohol), complex of platinum, metallic chlorides of rhodium, ruthenium, iron, aluminum, titanium. Among them, in the point of catalytic activity, preferable are chloro platinic acid, platinum olfin complex, platinum vinyl siloxane complex. The catalyst may be used sole or co-used two kinds or more.

If using conductive composition added with conductivity giving agent in the above mentioned resin compositions, such rollers are produced which are suited as rollers functioning for electrophotography. As the conductivity giving agent, carbon black is good. The conductivity giving agent is in advance mixed with base polymer by means of a roll mixer, and the mixture is added respectively to the A liquid and the B liquid such that the cross linking reaction moderately when both liquids are measured 1:1. Practically, in each solution, preferably the conductivity giving agent is 1 to 35 wt % added to base polymer, and added at the same amount to the A liquid and the B liquid to provide viscosity at substantially the same level. This is why if both liquids are considerably different in the viscosity, the mixing efficiency goes down and the crossing linking reaction is less to advance. For example, if adding the conductivity giving agent to only the A liquid or the B liquid, the adding amount is about 40 wt % to largely bring up the viscosity of one side liquid, so that the mixing efficiency is remarkably lowered.

To the above mentioned resin composition, a filler, a preservation stabilizing agent, a plasticizer, an ultraviolet absorbing agent, a lubricant and a pigment may be added appropriately.

The thermosetting liquid resin injected into the roller forming metal mold 106 is heated to generate the cross-linking reaction, hardened and is formed to agree with the shape of the roller forming space 106a into such as cylindrical form. At both ends in the axial direction of the roller main part as the product, the supporting shafts are formed for attaching to bearings of the electrophotographic apparatus. The supporting shaft is formed by penetrating or disposing the shaft body composed of a stainless steel or an iron in an axis of the cylindrical roller, otherwise forcing, adhering or pinning the shaft body in an attaching hole formed in the axes of both ends of the main body.

As mentioned above, according to the roller producing method and the apparatus thereof using the thermosetting liquid resin of the invention, the roller forming metal mold is prepared, the thermosetting liquid resin containing the cross linking agent and the thermosetting liquid resin containing the catalyst are separately stored in the respective containers, measured to be predetermined amounts, injected into the roller forming space while both thermosetting liquid resins are being mixed in the mixing mechanism, and hot-set to form the main body, and therefore, (1) until being injected into the roller forming space, the thermosetting liquid resin is not caused with the cross linking reaction, and since the liquid resin is not adhered nor solidified to the inside walls of the transferring pipes and the cylinders, and the pouring nozzle 105, the frequency and necessity of disassembling to clean the apparatus are extremely decreased, and (2) since the cooling procedure of the liquid resin is not required until the injection, and the liquid resin of low viscosity can be injected at temperatures near a room temperature, it is not necessary to make the thick structure of the roller forming metal mold 106, and when hot-setting, the heating load is not increased and the hardening reaction is sufficient with a short time, so that a producing cycle is remarkably heightened and the production cycle is markedly improved, and the cost-down is possible by unnecessary facility of the cooling mechanism.

By the temperature adjusting instrument, the temperature of the thermosetting liquid resin at injection is adjusted to be 20 to 70° C., thereby enabling to securely prevent the liquid resin from solidification.

EMBODIMENT 8

Figure 12A:
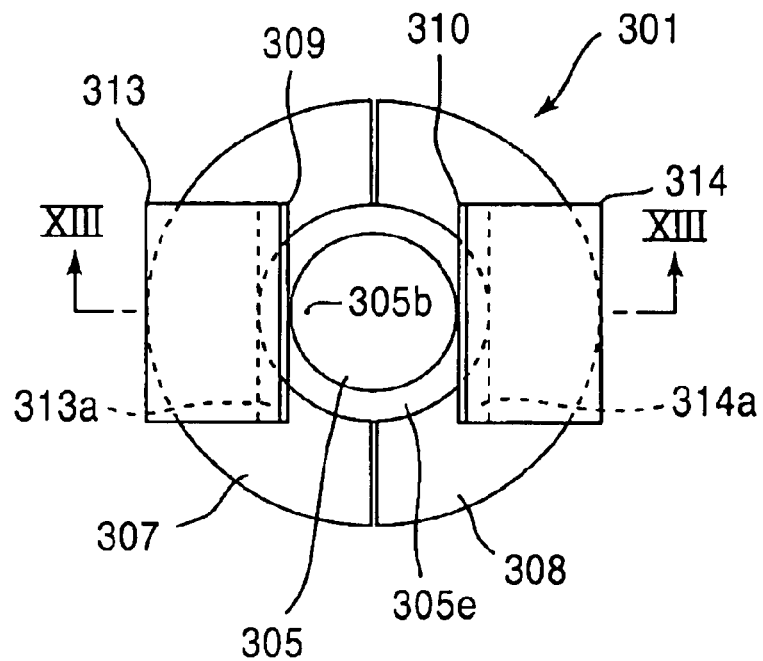
FIG. 12 is schematic views showing the apparatus of injection forming the roller of another embodiment according to the invention, in which A is a plan view of this apparatus and B is a bottom view thereof.
Figure 12B:
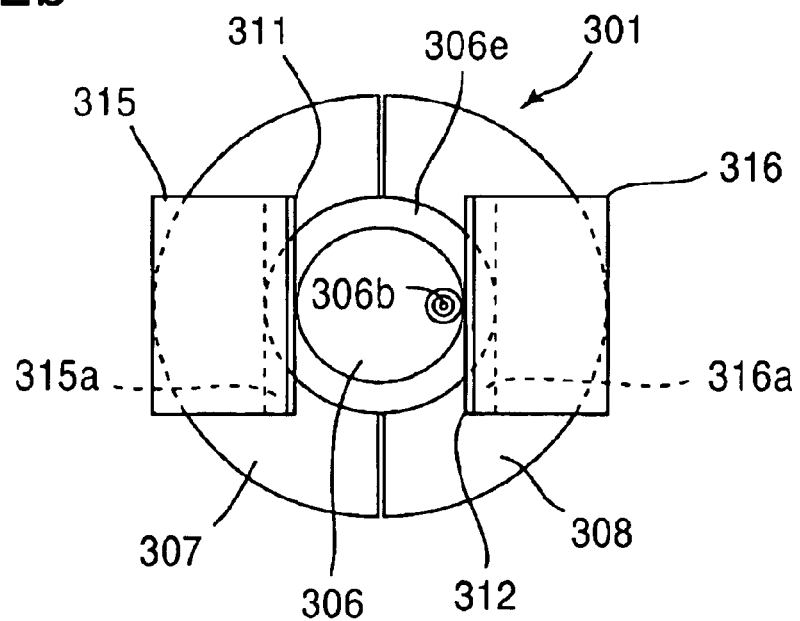
Figure 13:
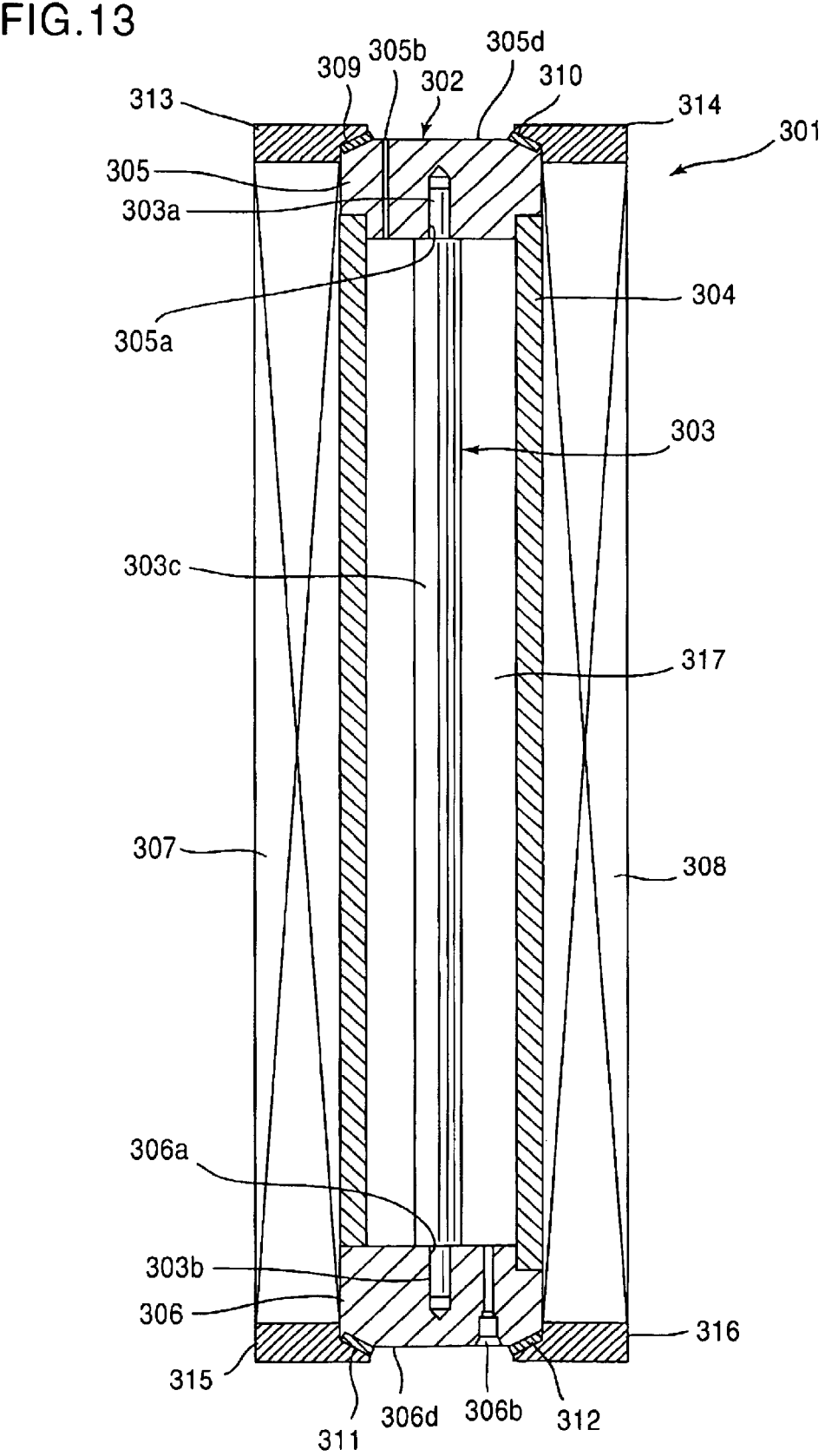
FIG. 13 is a schematically cross sectional view showing the side view of the apparatus of injection forming the roller of this embodiment.

With reference to FIGS. 12 to 14, explanation will be made to the embodiment of the injection forming apparatus according to the invention. FIG. 12A is a plan view of the apparatus of the invention and B is a bottom view thereof. FIG. 13 is a schematic view showing the side view of the apparatus (the cross sectional view A—A of FIG. 12A) FIG. 14 is enlarged cross sectional views of elementary parts of the present apparatus.

The injection forming apparatus 301 of this embodiment is composed of the cylindrical metal mold 304 inserted inside with an alloy-made core body 303, the injection forming metal mold 302 composed of the core supporting members 305, 306 fitted inside to both edge parts in the axial direction of the cylindrical metal mold 304 as holding both edges 303a, 303b of the inside inserted core body 303, and the heating mechanisms 307, 308 disposed around the injection forming metal mold 302 and holding said metal mold 302 at both sides in the diameter direction. Further, the inside of the cylindrical metal mold 304, the core main part 303c and the core supporting members 305, 306 form the roller forming space 317 for introducing the resin material.

Both ends 303a, 303b of the core body 303 are set and held in core supporting holes 305a, 305b formed in the core supporting members 30, 306. In this embodiment, the core body 303 has steps between both ends 303a, 303b to be fitted in the core supporting holes 305a, 306a and the core main body 303c, but is not limited thereto, and a straight type without steps is enough.

Figure 14A:
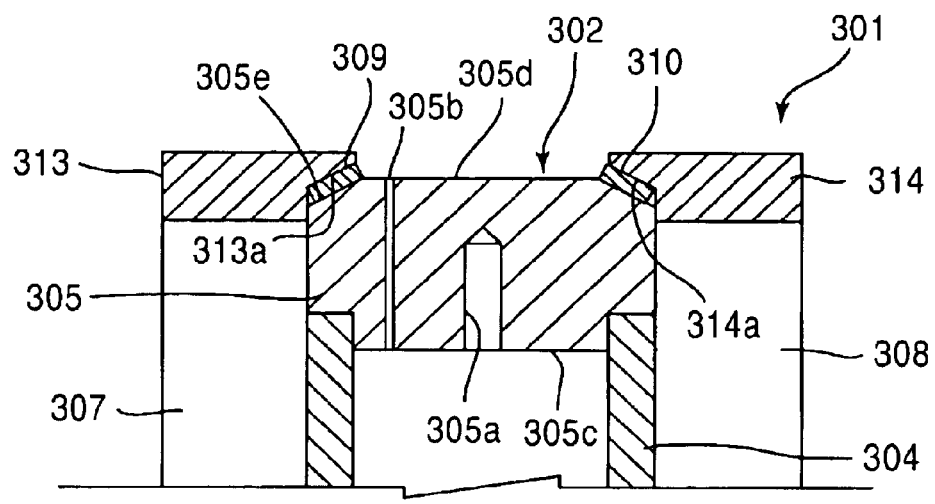
FIG. 14 is enlarged cross sectional views of elementary parts of the apparatus of injection forming the roller of this embodiment.
Figure 14B:
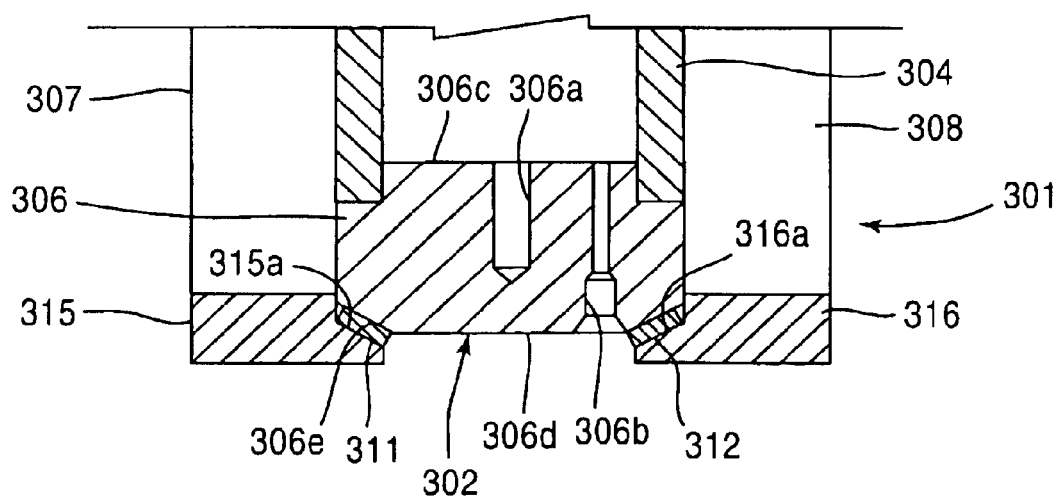

The cylindrical metal mold 304 is shaped in seamless pipe, and the inside face is preferably performed with fluorine resin coating or electroless plating from the viewpoint of releasing products from the mold. The upper and lower core supporting members 305, 306 have almost the same outer diameter as that of the cylindrical metal mold 304, and the lower core supporting member 306 is formed with a resin injecting inlet 306b for filling the resin material in the roller forming space 317, while the upper core supporting member 305 is formed with a gas venting hole 305b for releasing gas pressure effected by the filled resin. As shown in FIG. 14A, at the lower end of the core supporting member 305, a fitting projection 305c is formed for fitting inside the cylindrical metal mold 304, and as shown in FIG. 14B, also at the upper end of the core supporting member 306, a fitting projection 306c is formed for fitting inside the cylindrical metal mold 304, a so-called faucet structure is adopted. At outer circumferences of the respective edges 305d, 306d of the upper and lower core supporting members 305, 306, for tightening the upper and lower core supporting members 305, 306 to the cylindrical metal mold 304 with sufficient force, 1st oblique faces 305e, 306e are defined in ring shape which are determined in angle to be within ranges of 5 to 30°, more preferably 5 to 20° with respect to the axially vertical direction of the metal mold.

The heating mechanism 307, 308 are divided into left and right two parts, and are inside equipped with heat generators such as cartridge heaters, hand heaters, high frequency induction heaters and heating medium circulators, and the inner wall faces thereof are contacted to the outer face of the cylindrical metal mold 304 for heat transfer to the cylindrical metal mold 304. Preferably, the radius of curvature of the inner wall faces of the cylindrical metal mold 304 is set to be half or somewhat larger than this half of the outer diameter 304, and a material quality of the inner wall face preferably has substantially the same thermal expansion coefficient as that of the cylindrical metal mold 304. At both ends in the axial direction of the heating mechanisms 307, 308, pawl members 313, 314, 315, 316 are provided in a manner of holding the edges 305d, 306d at the outer circumferences of the core supporting members 305, 306 between left and right both sides, and these pawl members 313, 314, 315, 316 are formed inside with band-shaped 2nd oblique faces 313a, 314a, 315a, 316a. Besides, the respective 2nd oblique faces 313a, 314a, 315a, 316a are pasted with band-shaped heat resistant elastic members 309, 310, 311, 312, and 2nd oblique faces are forced to contact these heat resistant elastic members to press the 1st oblique faces 305e, 306e. The pawl members 313, 314, 315, 316 may be secured to the heating mechanism main bodies by means of welding or bolt tightening, or moving mechanisms (not shown) may be provided for sliding the pawl members solely in the diameter direction.

A sequence for producing the roller by use of the above mentioned injection forming apparatus will be explained in detail. At first, the core body 303 is inserted inside the cylindrical metal mold 304, both ends 303a, 303b are fitted into the core body holding holes 305a, 306a defined in the core supporting members 305, 306, and these core supporting members 305, 306 are inserted in both end parts of the cylindrical metal mold 304 so as to form the roller forming space 317 inside of the injection forming metal mold 302. Under this condition, the heating mechanisms 307, 308 are moved from left and right both sides in a manner of holding the injection forming metal mold 302 therebetween, to cause the 2nd oblique faces 313a, 314a, 315a, 316a formed in the pawl members 313, 314, 315, 316 to contact the heat resistant elastic members 309, 310, 311, 312 so as to press the 1st oblique 305e, 306e, so that the core supporting members 305, 306 are secured to the cylindrical metal mold 304. By securing the heating mechanisms 307, 308, the upper and lower core supporting members 305, 306 are firmly held at both edge faces 305d, 306d, and the injection forming metal mold 302 is tightened and held. For firmly tightening the cylindrical metal mold 304 to the core supporting members 305, 306, a tightening load of about 20 kgf or higher is ordinarily necessary, and the invention can easily accomplish it.

Next, the lower core supporting member 306 is provided at the resin injecting inlet 306 with the resin injecting nozzle (not shown) for injecting and filling the resin material in the roller forming space 317. The gas pressure then generated inside is released by opening the gas venting hole 305b. After completing to charge the resin material, the gas venting hole 305b is closed as needed, and subsequently the roller forming space 317 is heated around 60 to 150° C. by the heat generators furnished in the heating mechanisms 307, 308 for hot-setting the resin material. The inner diameter of the gas venting hole 305b is preferably adjusted to be 0.5 to 3.0 mm. Being less than 0.5 mm, the resin leaks due to an inner high pressure to probably create burrs in products, while being more than 3.0 mm, the resin invades in the gas venting hole and widens an adhering area in the inner wall of the metal mold, so that it is difficult to release products from the mold.

The injection forming metal mold 302 is cooled and released under a condition where the heating mechanisms 307, 308 are moved left and right in the diameter direction and is opened. Then, the core supporting members 305, 306 are taken out, and after releasing the roller as a product of the invention, the above mentioned sequence is again repeated to produce new products.

At hot-setting, since the cylindrical metal mold 304 and the upper and lower core supporting members 305, 306 are thermally expanded, surface pressure becomes gradually higher between the 1st oblique faces 305e, 306e formed in the upper and lower core supporting members 305, 306 and the 2dn oblique faces 313a, 314a, 415a 316 formed in the respective pawl members 313, 314, 315, 316, and the tightening load becomes larger between the cylindrical metal mold 304 and the upper and lower core supporting members 305, 306, but in this embodiment, since the heat resistant elastic members 309, 310, 311, 312 are interposed between the 1st oblique faces 305e, 306e and the 2nd oblique faces 313a, 314a, 415a 316, an increasing part of the tightening load generated by the thermal expansion is absorbed thereby, so that excessive load is not added to the core body 303, deformation as buckling is prevented, and the air tightness is heightened in the roller forming space, and the roller formability is prevented from spoiling. The thickness of the heat resistant elastic members 309, 310, 311, 312 is suitably 0.5 to 5.0 mm, and as the material quality having moderate elasticity at said heating temperature of 60 to 150° C., silicone or fluoro-rubber are suited.

As the resin materials of the products, it is possible to use the mixture of one or two kinds or more of the thermosetting liquid resin such as epoxy resin, phenol resin, urea resin, melamine resin, fran resin, unsaturated polyester resin, and polyimide resin, or silicone based thermosetting liquid resin.

Figure 15:
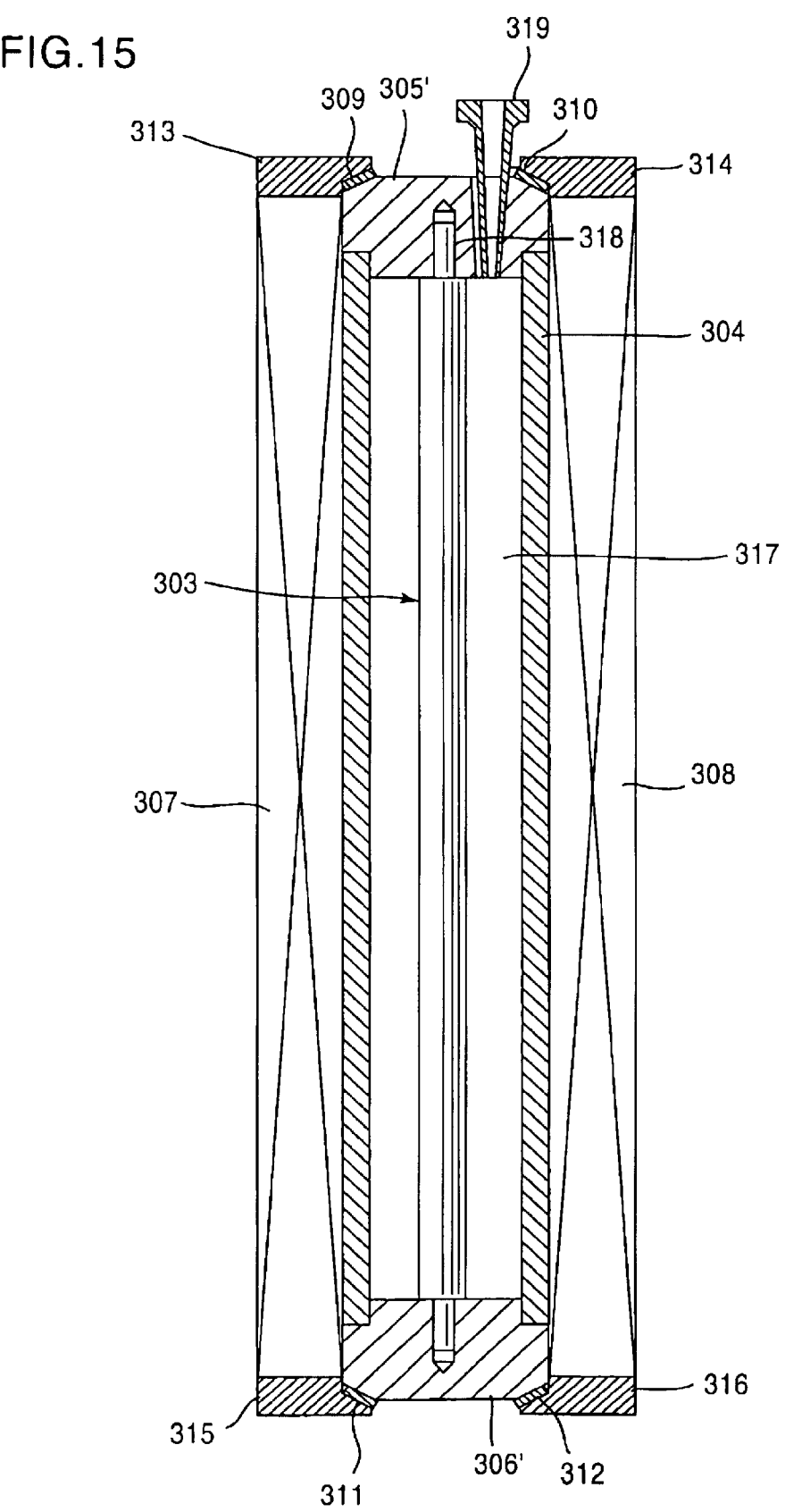
FIG. 15 is a schematically cross sectional view showing a modified example of this embodiment.

In the above embodiment, the resin injecting inlet 306b is defined in the lower core supporting member 306, and the gas venting hole 305 is defined in the upper core supporting member 305, and instead therefor, as schematically shown in FIG. 15, it is sufficient to form a penetrating hole 318 in an upper core supporting member 305' which serves as the resin injecting inlet and the gas venting hole. Namely, when the resin injecting nozzle 319 is inserted in the penetrating hole 318, the resin material is injected and filled in the roller forming space 317 under a condition of providing a space for venting the gas between the resin injecting nozzle 319 and the penetrating hole 318. If adopting such a structure, the solidified resin material is less to clog the resin injecting inlet, so that a merit is obtained which makes the maintenance work of the forming device easier.

EMBODIMENT 9

Explanation will be made another embodiment of the injection forming apparatus according to he invention.

Figure 16A:
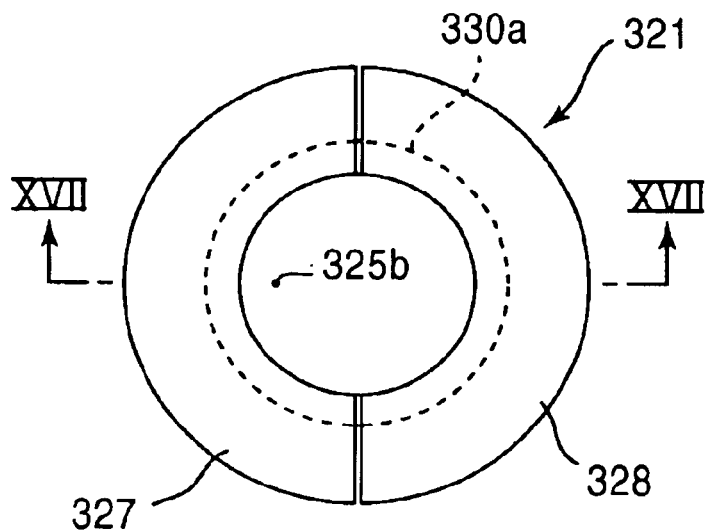
FIG. 16 is schematic views showing the apparatus of injection forming the roller of another embodiment according to the invention, in which A is a plan view of this apparatus and B is a bottom view thereof.
Figure 16B:
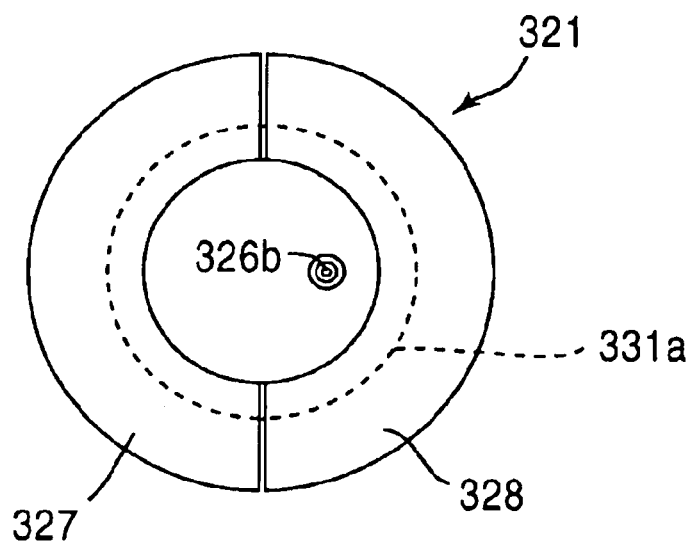
Figure 17:
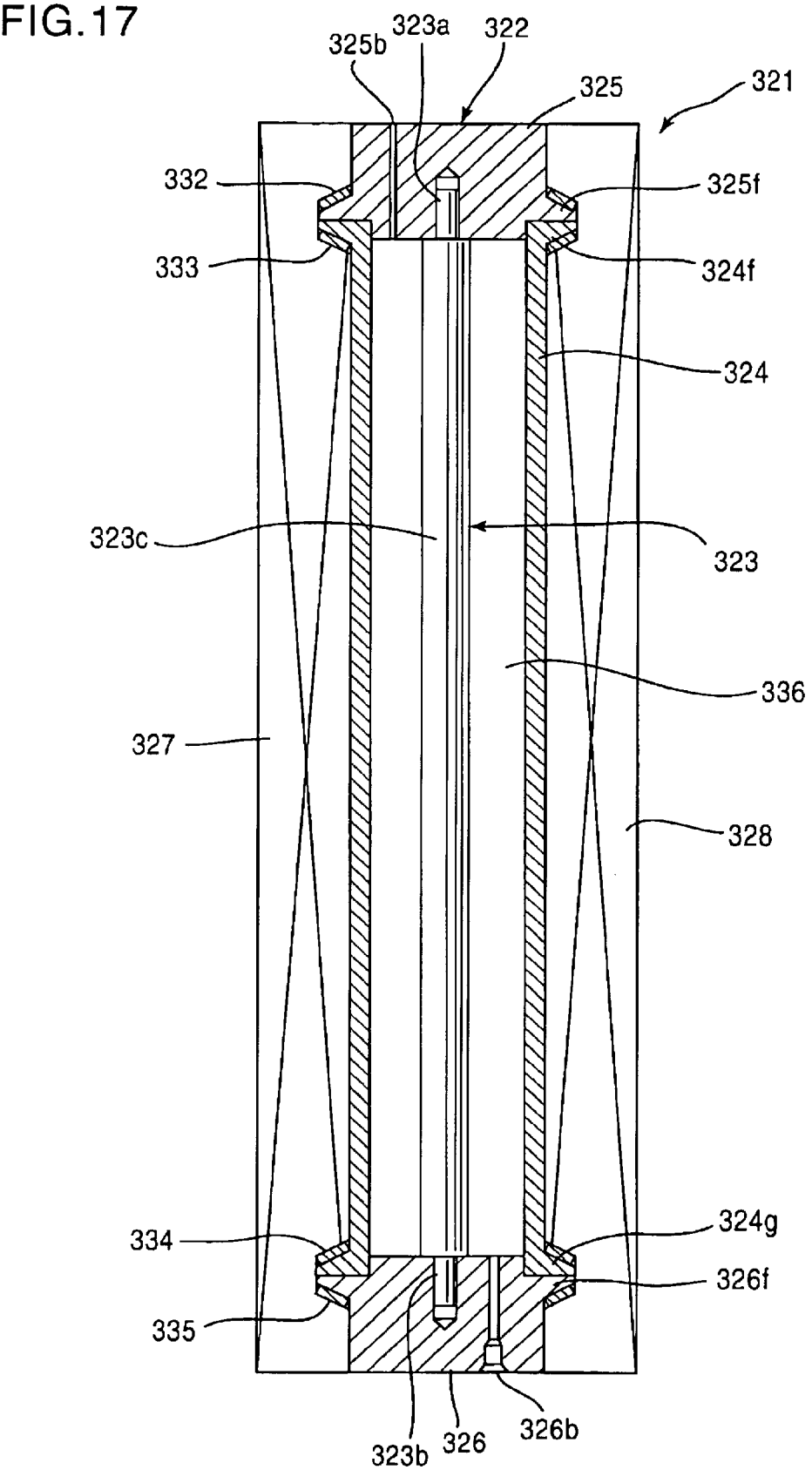
FIG. 17 is a schematically cross sectional view showing the side view of the apparatus of injection forming the roller of this embodiment.
Figure 18A:
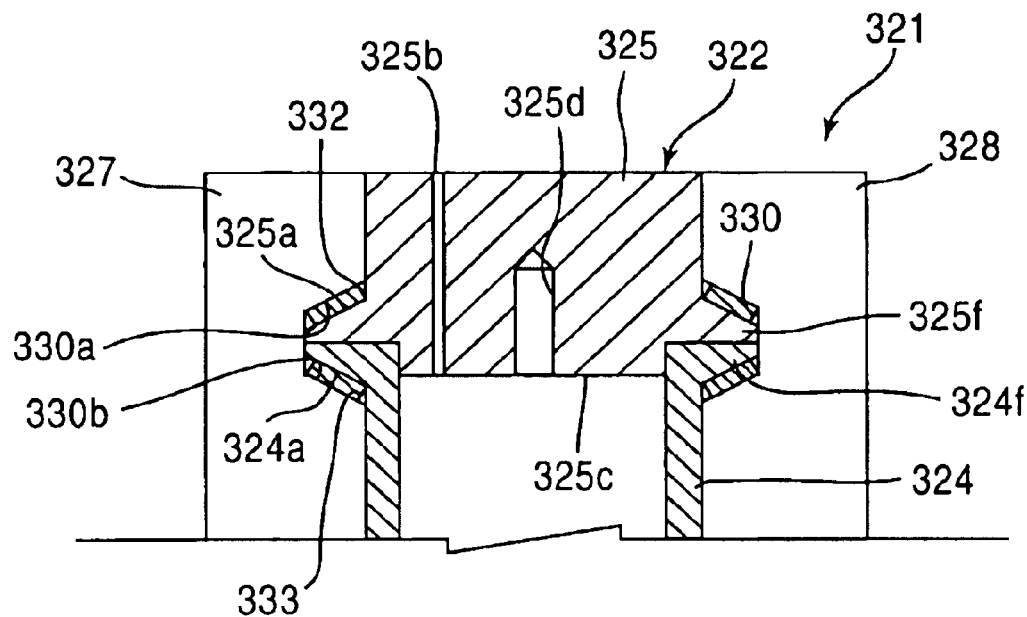
FIG. 18 is enlarged cross sectional views of elementary parts of the apparatus of injection forming the roller of this embodiment.
Figure 18B:
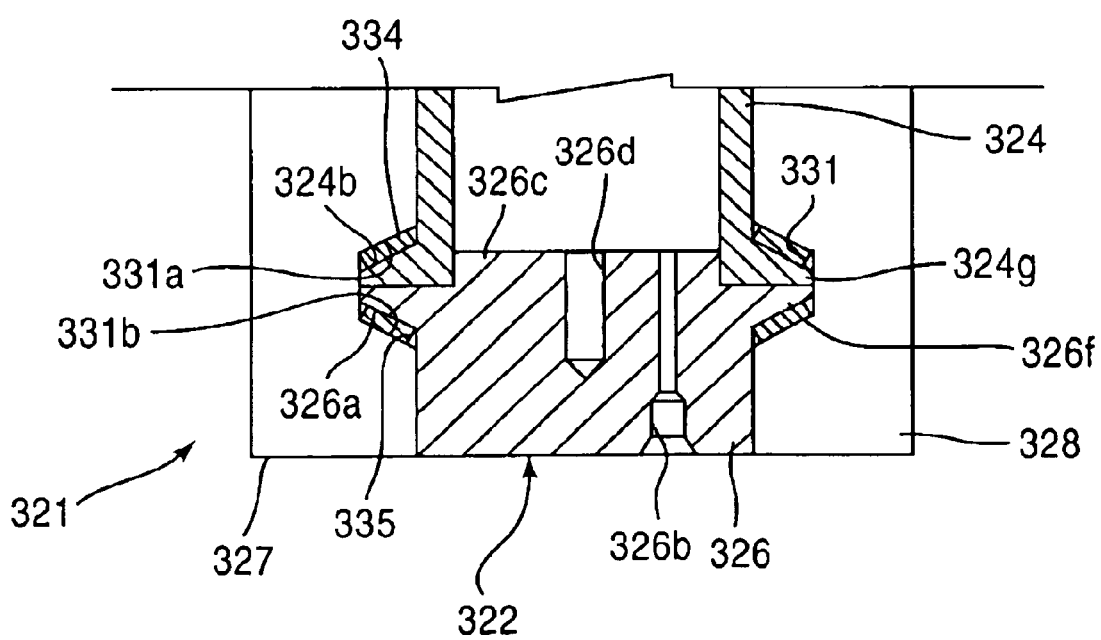

FIGS. 16 to 18 are schematically structured views showing this embodiment. FIG. 16A is a plan view of this apparatus and FIG. 16B is a bottom view thereof. FIG. 17 is a schematically cross sectional view showing the side view of the apparatus (B—B cross sectional view of FIG. 16A). FIG. 18 is enlarged cross sectional views of elementary parts of the apparatus.

The injection forming apparatus 321 of this embodiment is composed of the cylindrical metal mold 324 inserted inside with a core body 323, the injection forming metal mold 322 composed of the core supporting members 325, 326 fitted inside to both edge parts in the axial direction of the cylindrical metal mold 324 as holding both edges 323a, 323b of the inside inserted core body 323, and the heating mechanisms 327, 328 disposed around the injection forming metal mold 322 and holding said metal mold 322 at both sides in the diameter direction.

At the lower end of the core supporting member 325 and the upper end of the core supporting member 326, fitting projections 325c, 326c are formed for fitting into both ends of the cylindrical metal mold 324 similarly to the above embodiment 8, and the faucet structure is adopted. At the upper and lower core supporting members 325, 326, 1st brims 325f, 326f are expanded on the outer circumferences respectively opposite to the cylindrical metal mold 324, while also at both ends of the cylindrical metal mold 324, 2nd brims 324f, 324g are expanded in opposition to the 1st brims 325f, 326f. As shown in the enlarged cross sectional views in FIG. 18, at the rear faces of the 1st brims 325f, 326f and the 2nd brims 324f, 324g, 1st oblique faces 325a, 326a and 324a, 324b are formed which tilt at predetermined angles with respect to the axially vertical direction. These tilting angles are preferably determined to be 5 to 30°, especially 5 to 20° for tightening the upper and lower core supporting members 325, 326 to the cylindrical metal mold 324 with enough force.

On the other hand, the heating mechanisms 327, 328 are formed in the inner wall faces with tapered grooves 330, 331 in concave shape for engaging the 1st brims 325f, 326f and the 2nd brims 324f, 324g in opposition under a closing condition. In the upper and lower inner faces of these grooves 330, 331, 2nd oblique faces 330a, 330b, 331a, 331b are formed in half ring shape, and are pasted with half ring shaped heat resistant elastic members 332, 333, 334, 335. The 2nd oblique faces 330a, 330b, 331a, 331b are urged to press upward and downward on the heat resistant elastic members 332, 333, 334, 335 so as to press the 1st oblique faces 325a, 324a and 326a, 324b and tighten the core supporting members 325, 326 and the cylindrical metal mold 324. Other composing members are almost the same as those of the embodiment 8, excepting the pawl members and the 1st oblique face, and detailed explanation will be omitted.

A sequence for producing the roller by use of the above mentioned injection forming apparatus will be explained in detail. At first, the core body 303 is inserted inside the cylindrical metal mold 324, both ends 323a, 323b are fitted into the core body holding holes 325a, 326a defined in the core supporting members 325, 326, and these core supporting members 325, 326 are inserted in both end parts of the cylindrical metal mold 324 and the injection forming metal mold 322 is closed so as to form the roller forming space 336. Under this condition, the heating mechanisms 327, 328 are moved from left and right both sides in the vertical direction in a manner of holding the injection forming metal mold 322 therebetween, so that the brim parts 330, 331 are engaged with the 1st brim parts 325f, 326f and the 2nd brim parts 234f, 324g, and the 2nd oblique faces 330a, 330b, 331a, 331b are forced to press upward and downward the heat resistant elastic members 332, 333, 334, 335 to press the 1st oblique faces 325a, 326a, 324a, 234b. By tightening the heating mechanism, the core supporting members 325, 326 and the cylindrical metal mold 324 are tightened and maintained.

By the same sequence as that of the embodiment 8, the roller forming space 336 is injected and filled with the resin material, the injection forming metal mold 322 is cooled, the heating mechanisms 327, 328 are moved respectively left and right in the axial direction to make an opening condition, and the injection forming metal mold 322 is released. Subsequently, the core supporting members 325, 326 are taken out, and after releasing the roller as a product of the invention, the above mentioned sequence is again repeated to produce new products.

In the above embodiments 8 and 9, the 1st oblique face and the 2nd oblique face corresponding thereto are provided to both ends of the metal mold, and in the invention, these faces may be provided to one ends.

In the above embodiments 8 and 9, the injection forming metal mold is a vertical type but the invention does not limit thereto, a lateral type or a combination of a lateral type and a vertical type are sufficient.

As mentioned above, according to the injection forming metal mold of the roller for the electrophotography, the core supporting member to be fitted in both ends of the cylindrical metal mold has the 1st obliquity tilting at a fixed angle with respect to an axial and vertical directions in the outer wall face, and the heating mechanism has an inner wall face contacting to hold the injection forming metal mold under a condition of closing the heating mechanism and having the 2nd obliquity pressing the 1st obliquity to the inner wall face, whereby the injection forming metal mold is tightened and held, so that the structure of the metal mold is simplified, and it is possible to largely automatize a series of procedure from setting up of the injection forming metal mold to the pouring, hot-setting, disassembling of the metal mold and releasing of the product from the mold, which have been difficult in the prior art.

Further, the heat resistant elastic member is interposed between the 1st oblique face and the 2nd oblique face, so that the increasing part of the tightening load generated by the thermal expansion of the metal mold at hot-setting is absorbed by the heat resistant elastic member, and stable tightening force of the metal mold can be provided, and the roller formability can be heightened.

EMBODIMENT 10

Figure 22A:
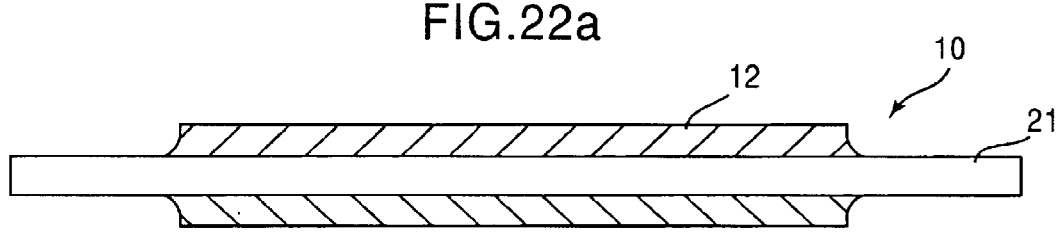
FIGS. 22A to 22C are cross sectional views of the resin rollers showing examples of the core bodies to be employed to the invention.
Figure 22B:
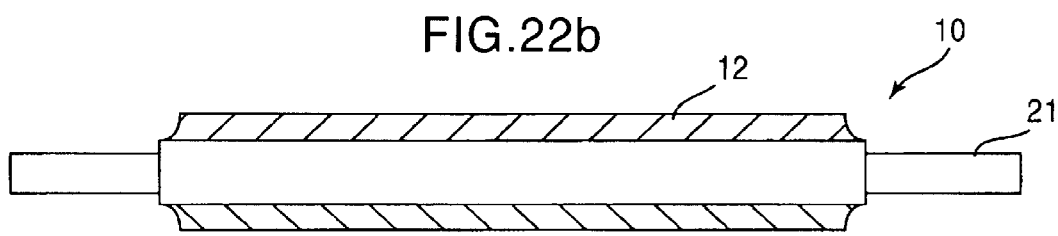
Figure 22C:
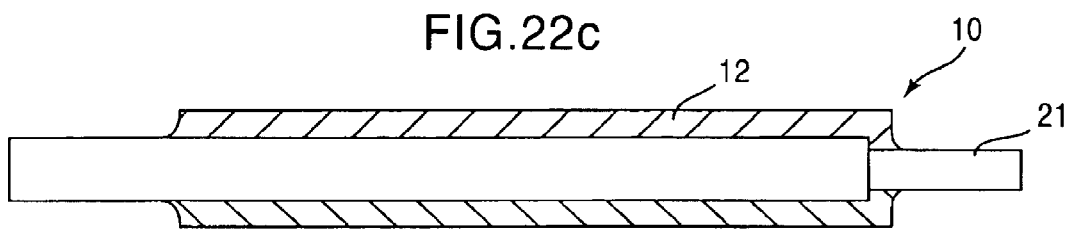

Another embodiment of the invention will be explained, referring to the drawings. As shown in FIG. 19A, the forming metal mold 400 has the cylindrical metal mold 13 and a pair of core supporting members 14a, 14b disposed at both ends of the cylindrical metal mold 13, and the cylindrical metal mold 13 and the pair of core supporting members 14a, 14b define the roller forming space 15. One of the core supporting members 14b is provided with the resin injecting inlet 16. In the inside of the cylindrical metal mold 13, the core body 21 of the resin roller to be formed is held at both ends in the core supporting holes 17a, 17b formed in both core supporting members 14a, 14b. The core bodies 21 of the resin roller are, for example, as shown in FIGS. 22A to 22C. As materials of the core body 21, known arbitrary ones, for example, metallic materials or resin materials rendered to be conductive are applicable. As to sizes of the resin roller, not different from those of the existing resin rollers, generally, the diameter is 10 to 30 mm and the length is 200 to 400 mm.

The cylindrical metal mold 13 and the core supporting members 14a, 14b are composed of known arbitrary materials for thermosetting liquid resin, preferably pre-hardened steel, quenched steel, non-magnetic steel, carbon tool steel, or corrosion resistant steel (stainless steel). In the invention, ring like concave grooves 430 are in advance formed at the opening edges of the core supporting holes 17a, 17b of the core supporting members 14a, 14b for inserting the core body 21 therein, such that the core supporting members 14a, 14b are, as the embodiment shown in FIG. 19, formed as the resin-formed edge faces stand in arc along the core body 21 when forming, said ring like concave grooves 430 reducing the diameter in arc toward an inner part of the core supporting holes 21 of larger diameter than the outer diameter of the core supporting holes 21 supported by said core supporting members 14a, 14b.

For forming the resin roller by means of the resin roller forming injection forming 400, the core body 21 is inserted at both ends in the core supporting holes 17a, 17a of the pair of core supporting members 14a, 14b, and under a condition of previously holding the core body 21 between both core supporting members 14a, 14b, the resin material is poured and filled from the resin injecting inlet 16 into the roller forming space 15 formed by the cylindrical metal mold 13 and the core supporting members 14a, 14b of the cylindrical metal mold 13. The resin poured and filled in the roller forming space 15 is also filled in the ring like grooves 430, 430 formed in the core supporting members 14a, 14b following the periphery of the core body 21 at the axial both edge faces of the forming space 15. After pouring and filling the resin material, by hot-setting the resin in the roller forming space 15, the resin-formed body 12 is formed cylindrically around the core body 12. The edge face 12c of the cylindrical resin-formed body 12 is formed as standing in the shapes of the ring like concave grooves 430 of the core supporting members 14, and standing parts 440 are formed following the core body 21. After completion of solidifying the resin, the core supporting members 14a, 14b are taken out upward and downward from the cylindrical metal mold 13 in the axial direction. Subsequently, the formed product held within the cylindrical metal mold 13 is removed upward or downward in the axial direction by doing as pushing the core 21 with respect to the cylindrical metal mold 13. FIG. 19B shows the formed product of the resin roller 10 taken out.

As the embodiment shown in FIG. 19, with respect to the shape of the standing part 440 reducing the diameter in are following the end part of the core body 21, the radius of curvature R of the arc in the outer face of the standing part reducing the diameter is preferably formed to be 0.2 to 3 mm, and it is more preferable that the radius of curvature R of the arc is formed to be 0.5 to 2 mm, though depending on tolerance when the resin roller 10 is incorporated in an actual electro-photography. The standing size L in the axial direction of the core body 21 from the edge face 12c of the resin-formed body is preferably 0.5 to 5 mm, more preferably 1 to 3 mm.

EMBODIMENT 11

FIG. 20A shows a forming metal mold of another embodiment, and FIG. 20B shows a shape of the formed product of the resin roller 10 by use of this forming metal mold 400. This forming metal mold 400 is formed with ring like concave grooves 430, 430 in the core supporting members 14a, 14b in such shapes that the standing parts 440 of the resin-formed body 12 linearly reduce the diameter as going toward the ends of the core body 21. With respect to the shape of the standing part 440 when forming the standing part to linearly reduce the diameter toward the end part of the core 21 as the edge face 12c of the resin-formed body follows the core body 21, the standing size L in the axial direction of the core body 21 from the edge face 12c of the resin-formed body is preferably 0.3 to 3 mm, more preferably 1 to 2 mm, though depending on tolerance when the resin roller is incorporated in an actual electrophotographic apparatus. The standing angle θ is preferably 5 to 60° on the basis of the axial direction in the surface of the core body 21.

EMBODIMENT 12

FIG. 21A shows a further embodiment, in which a forming metal mold is to form stepwise standing parts 440 of the edge parts 12c of the resin-formed body, and FIG. 21B shows the shape of the formed body of the resin roller obtained by the forming metal mold 400. As to the shape of the stepwise standing part 440, the standing size L in the axial direction of the core body 21 from the edge face 12c of the resin-formed body is preferably 0.3 to 3 mm, more preferably 1 to 2 mm, though depending on tolerance when the resin roller is incorporated in an actual electrophotographic apparatus. The interface between the stepwise standing part 440 and the edge face 12c of the resin-formed body reduce the diameter in arc. As to the thickness of the stepwise standing part 440, one step is enough as shown, and also two steps or more are enough gradually reducing the diameter. The sizes are as mentioned above.

EMBODIMENT 13

Figure 23A:
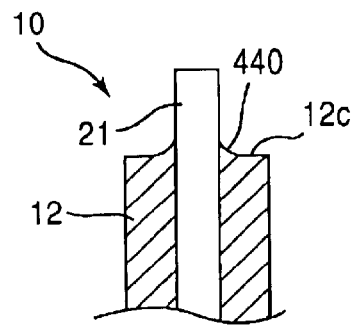
FIGS. 23A to 23G are cross sectional views showing examples of the standing states at edge faces of the formed bodies in the resin rollers of the invention.
Figure 23B:
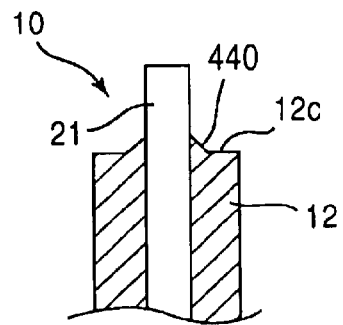
Figure 23C:
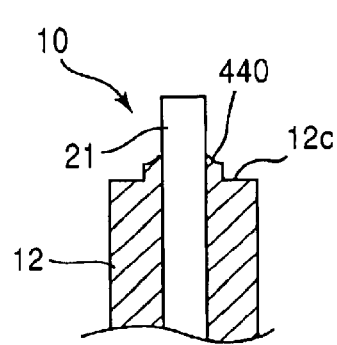
Figure 23D:
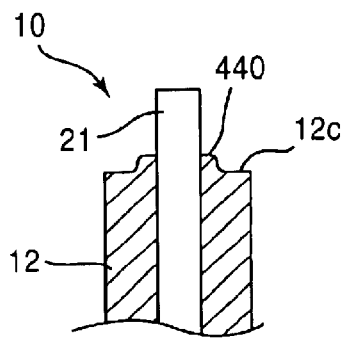
Figure 23E:
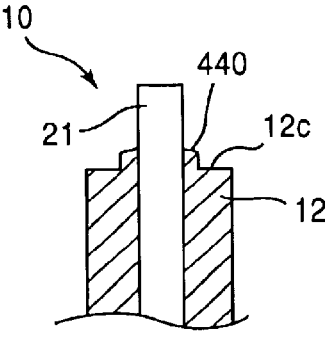
Figure 23F:
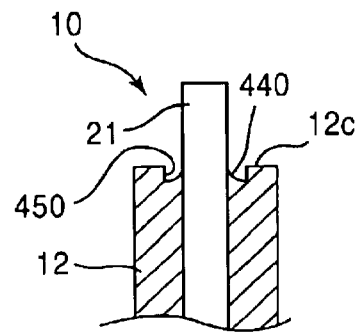
Figure 23G:
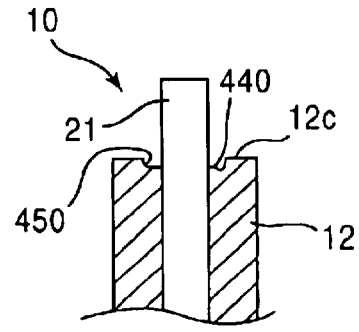
Figure 24:
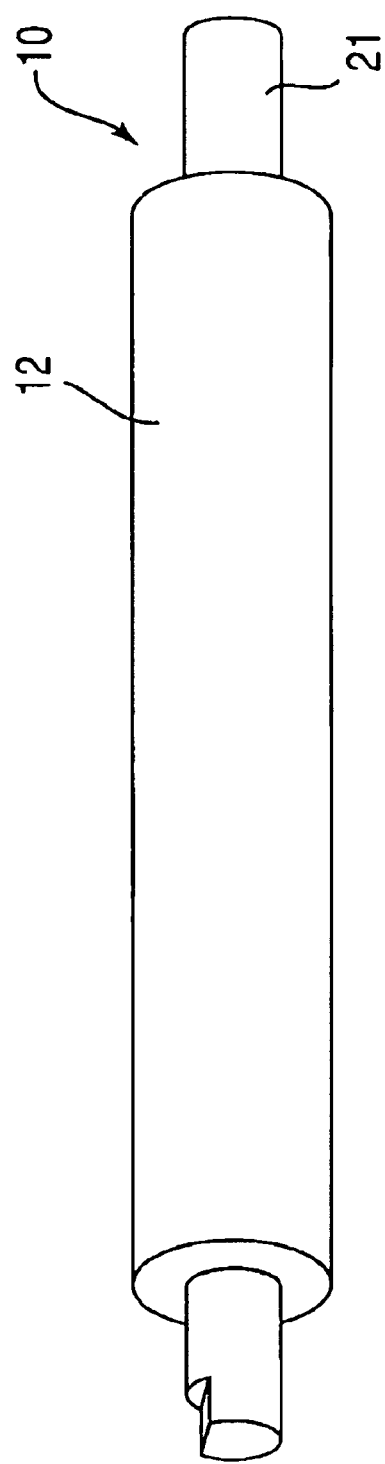
FIG. 24 is a perspective view of an ordinary resin roller.
Figure 25:
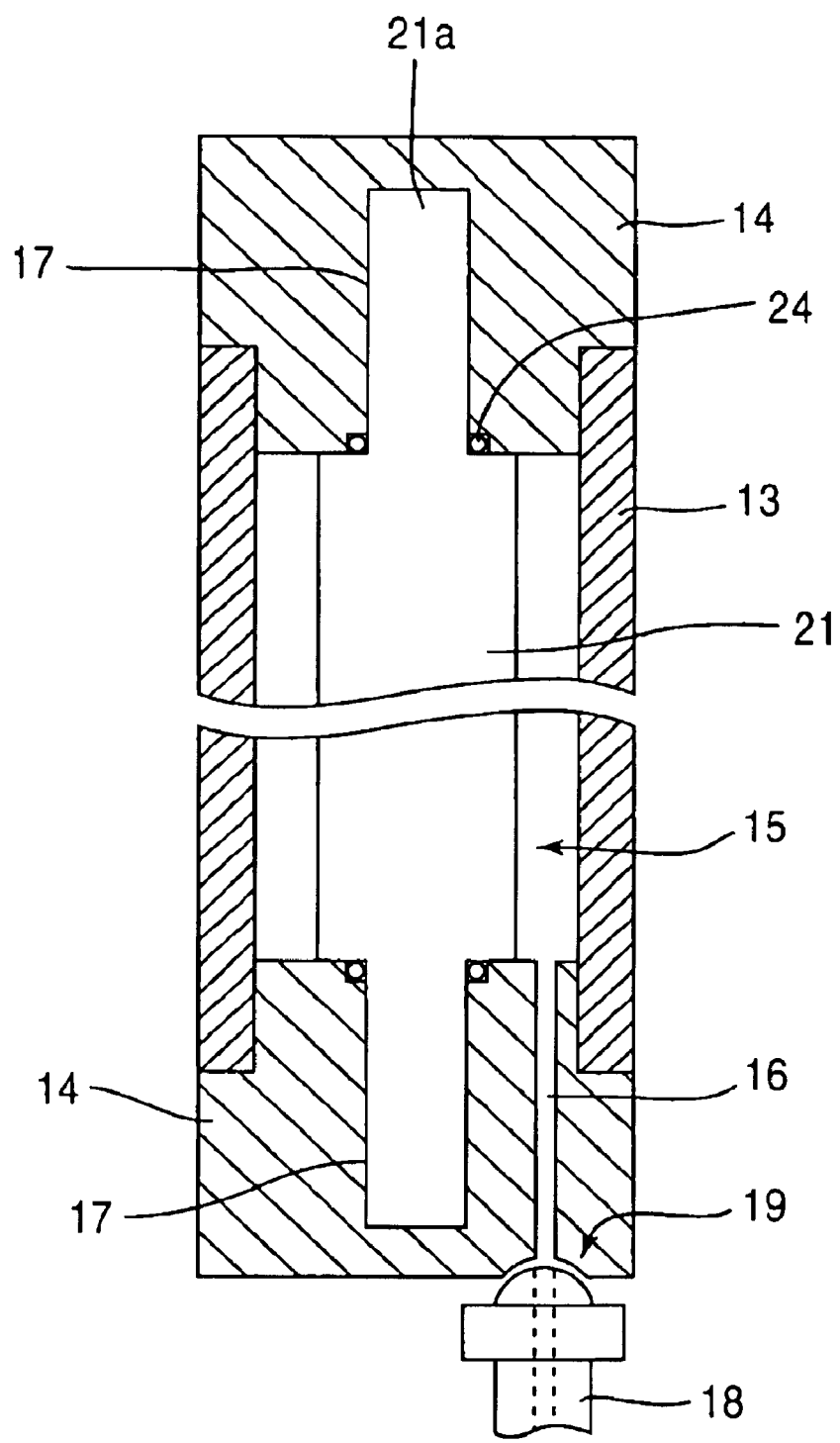
FIG. 25 is a cross sectional view showing a state of resin injecting in the core body and the forming metal mold in the prior art.
Figure 27:
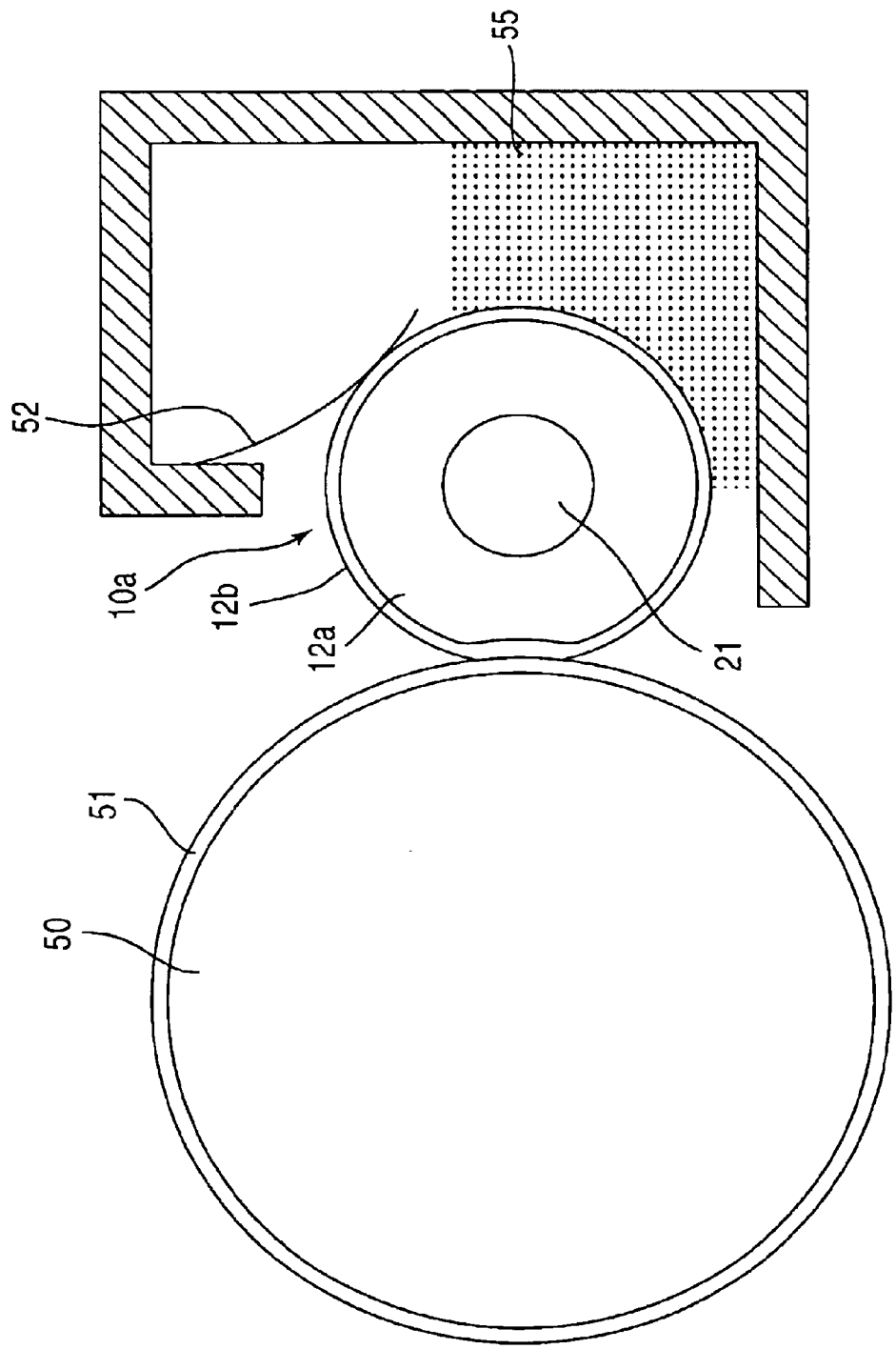
FIG. 27 is a cross sectional view of elementary parts of the electrophotographic apparatus.
Figure 28:
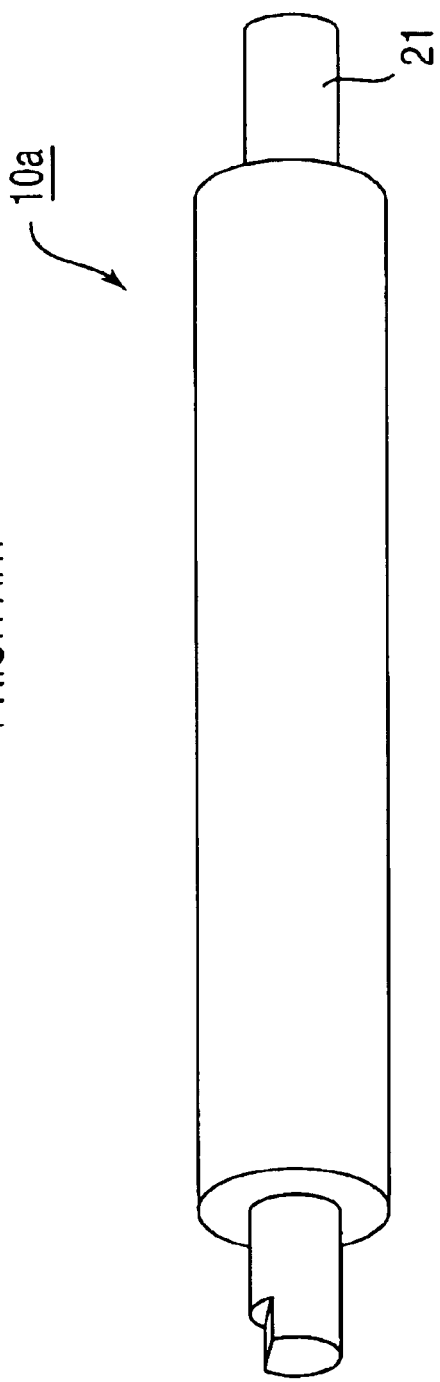
FIG. 28 is a perspective view of a conventional resin roller.
Figure 29:
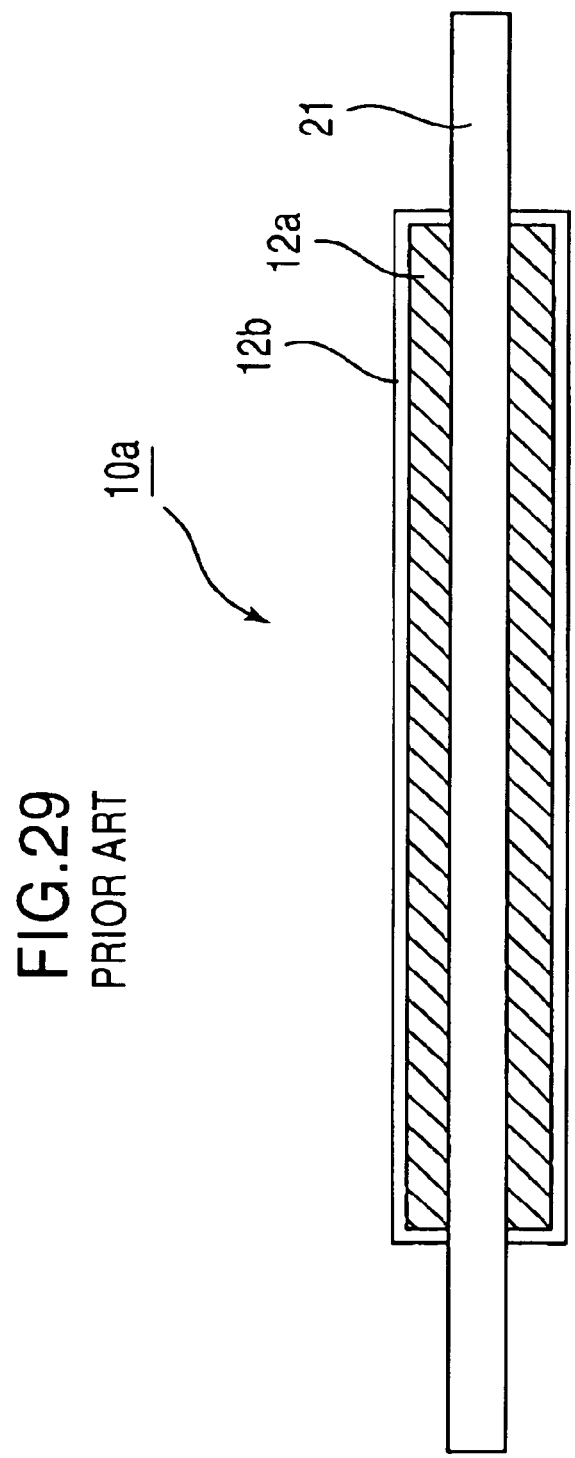
FIG. 29 is a cross sectional view of a conventional resin roller.
Figure 30:
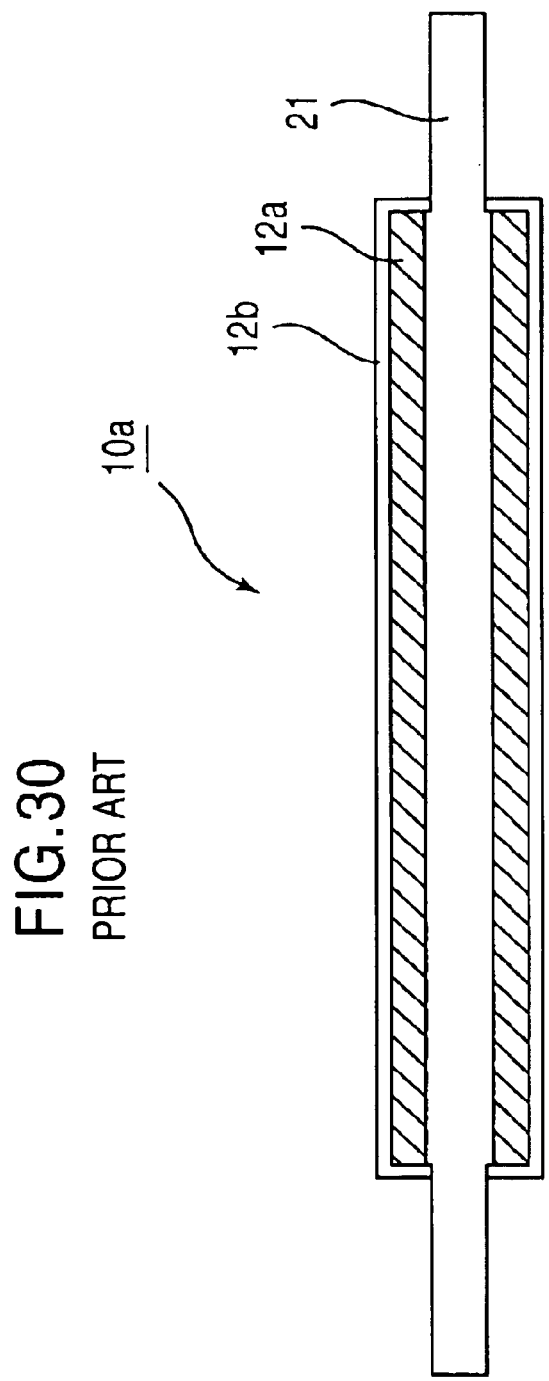
FIG. 30 is a cross sectional view of a conventional resin roller.

Further, as other embodiments, standing parts 440 shown in FIGS. 23A to 23G can be adopted depending on conditions in processing the core supporting members or allowed shapes in actual machines. For example, if not permitting the stand of the formed resin from the edge part 12c of the resin-formed body to the edge part of the core body 21 in dependence on sizes of the electrophotographic apparatus, it is possible, for example, as shown in FIGS. 23F and 23G, to design in ring like concave shape the circumference of the core body 21 of the edge face 12c of the resin-formed body, and form the standing part 440 in the concave part 450. The sizes of the standing parts 440 shown in FIGS. 23A to 23G are the same as those of the embodiments shown in FIGS. 19 to 21.

One example of the actually forming method of the inventive resin roller will be explained. For example, polysiloxane based hardening agent and the conductivity giving agent (carbon black) are mixed in terminal allylated polyoxypropylene based polymer, and when the roller is formed of the outer diameter being φ 16 mm and the length of the resin-formed body being 250 mm in the liquid resin injecting and pouring machine, the viscosity of the mixed and poured resin is 200 to 5000 poises through depending on the number of mixing parts of the conductivity giving agent, and the pouring pressure is 0.5 to 15 MPa. When, for example, the thickness of the resin-formed body is 4 mm in the roller of the above sizes, the diameter of the resin injecting inlet is 1 to 2 mm. The metal mold stands vertically in the lengthwise direction, and preferably the resin is poured from the lower part of the metal mold.

The metal mold is heated by the existing arbitrary methods. For example, there are a heating method within the heating oven furnished with heating fans, a method of heating by arranging electric heaters around the metal mold, or a method of arranging the induction heating coils around the metal mold. For temperatures of the metal mold, optional temperatures can be selected, enabling to pour the thermosetting liquid resin and hot-set the resin, and when pouring the resin, temperatures easily pouring the resin and not solidifying it are preferable, for example, 20 to 70° C. Further, the resin heating temperature is desirably around 80 to 200° C., though depending on the amount of hardening retardant.

As roller forming resin materials available to the inventive forming method, resins of heat-removal hardening are employed, for example, silicone, polyurethane, acrylonitrile.butadiene copolymer (NBR), ethylene.propylene.diene.methylen copolymer (EPDM). The thermosetting liquid resin may be added with other kinds of additives as needed. For example, if a resistance controlling agent as carbon is added, electric resistance of the roller can be controlled.

One of the preferable embodiments of the invention is to use the thermosetting liquid resin containing, as main components, (A) polymer containing at least one alkenyl group in molecule and a repeating unit composing a main chain being mainly oxy alkylene unit or saturated hydrocarbon unit, (B) a hardening agent containing at least two hydrosilyl group in molecule, (C) catalyst made hydrosilyl, and (D) conductivity giving agent. Since the forming resin comprising the reaction hardened substance of the hardening composition has especially soft structure, it displays enough elastic effect even if the thickness is thin. When containing oxy alkylene unit, the resin is low in viscosity before hardening and easily handled, and on the other hand, when containing saturated hydrocarbon unit, the resin has the low absorption coefficient, and is desirable because the volume and the roller resistance are less to change.

The thermosetting liquid resin is added, if necessary, with materials for adjusting thermosetting reaction such as hardening agent, hardening accelerator, hardening retardant or others. Or, organic or inorganic fillers may be added. Further, some kinds of organic or inorganic pigments, thickener or mold releasing agent may be added.

In the following, explanation will be made to embodiments of the invention, but the embodiments do not limit the invention.

The resin roller 10 of the roller outer diameter being φ 16 mm and the length of a resin formed body 12 being 250 mm as shown in FIG. 19B was formed by use of the metal mold 400 shown in FIG. 19A. The core supporting members 14a, 14b of the forming metal mold 400 are defined with the ring-like concave grooves 430, 430 such that the outer diameter d of the core body 21 is 8 mm, the shape of the standing part 440 at the edge face 12c of the resin-formed body has the radius of curvature R being 2 mm, and the standing size L of the core body 21 toward the axial direction is 2.5 mm.

The used thermosetting liquid resin was 600 poises in the viscosity in the mixed resin shown in the table 1.

In the liquid resin injecting and pouring machine, the mixed resin material was poured into the metal mold having the resin injecting inlet 16 of 1.5 mm from the lower portion under the pouring pressure of 4 MPa, the metal mold standing vertically in the lengthwise direction. The metal mold was arranged within the heating oven provided with the heating fans and was heated by setting the atmospheric temperature within the heating oven to be 140° C. for 20 minutes and releasing from the metal mold as exerting the leasing load of 20 kg in the axial direction from the metal mold, and a formed product was obtained. As a result, at the ends of the obtained roller, no resin leakage occurred.

In the resin roll and the forming metal mold of the invention, the edge face of the resin-formed body stands along the core body, and since force concentrating in the standing portion when releasing the mold after forming is dispersed, the resin-formed body and the core body do not separate, and good products are available cheaply and stably.

INDUSTRIAL APPLICABILITY

The resin roller, the resin roller producing apparatus and the method of producing the same are suited to developing roller, charging roller, transcribing roller and others.

What is claimed is:

1. A method for producing a roller for an electrophotographic apparatus composed of a main body formed with a hardening type liquid resin and support rods for supporting both edges of the main body, characterized by preparing a roller forming metal mold provided with a space for forming a roller main body as well as provided with a resin injecting inlet for filling the roller forming space with a hardening type liquid resin, storing separately a hardening type liquid resin containing a cross linking agent and a hardening type liquid resin containing a catalyst, respectively measuring set amounts thereof, mixing both hardening liquid resins, and injecting the mixture of the liquid resins into the forming space from a resin pouring inlet so as to effect a hardening reaction for forming the roller main body.

2. The method for producing rollers with the hardening type liquid resin as set forth in claim 1, wherein temperature of the hardening type liquid resin at injecting is adjusted to be within a range of 20 to 70° C.

3. The method for producing rollers with the hardening type liquid resin as set forth in claim 1 or 2, wherein viscosity of the hardening type liquid resin at injecting is adjusted to be 5000 poise.

4. The method for producing rollers with a hardening type liquid resin as set forth in claim 1 or 2, wherein the hardening type liquid resin containing the cross linking agent and the other hardening type liquid resin containing the catalyst are respectively combined with the same amount of conductivity giving agent.

5. The method for producing rollers with the hardening type liquid resin as set forth in claim 1 or 2, wherein the composition of the hardening type liquid resin has a polymer containing at least one alkenyl group per polymer chain and a main chain composed of repeating units being mainly oxy alkylene units or saturated hydrocarbon units, and the cross linking agent has at least two hydrosilyl groups per molecule.

* * * * *